US012605648B2

(12) United States Patent
Ghosh

(10) Patent No.: US 12,605,648 B2
(45) Date of Patent: Apr. 21, 2026

(54) PROCESS AND COMPOSITION FOR PRODUCTION OF ORGANIC SUBMICROMETRIC PARTICLES FROM WHOLE BIOLOGICAL MATTER

(71) Applicant: PIVIDL BIOSCIENCE INC., Moncton (CA)

(72) Inventor: Anirban Ghosh, Dieppe (CA)

(73) Assignee: Pividl Bioscience Inc., Moncton (CA)

( * ) Notice: Subject to any disclaimer, the term of this patent is extended or adjusted under 35 U.S.C. 154(b) by 454 days.

(21) Appl. No.: 18/034,460

(22) PCT Filed: Oct. 28, 2021

(86) PCT No.: PCT/CA2021/051521
§ 371 (c)(1),
(2) Date: Apr. 28, 2023

(87) PCT Pub. No.: WO2022/087737
PCT Pub. Date: May 5, 2022

(65) Prior Publication Data
US 2024/0350941 A1 Oct. 24, 2024

Related U.S. Application Data

(60) Provisional application No. 63/106,499, filed on Oct. 28, 2020.

(51) Int. Cl.
| | |
|---|---|
| *B01D 11/02* | (2006.01) |
| *A01N 1/02* | (2006.01) |
| *A01N 1/162* | (2025.01) |
| *B01D 61/14* | (2006.01) |

(52) U.S. Cl.
CPC .......... *B01D 11/0288* (2013.01); *A01N 1/162* (2025.01); *B01D 61/145* (2013.01); *B01D 61/147* (2013.01)

(58) Field of Classification Search
None
See application file for complete search history.

(56) References Cited

U.S. PATENT DOCUMENTS

| | | |
|---|---|---|
| 2016/0256490 A1 | 9/2016 | Weston et al. |
| 2021/0030688 A1 | 2/2021 | Ganey et al. |

FOREIGN PATENT DOCUMENTS

| | | | | |
|---|---|---|---|---|
| AU | 2005257067 A1 | 1/2006 | | |
| CN | 110548051 A | * 12/2019 | .............. | A61P 17/18 |
| EP | 2450032 B1 | 9/2018 | | |
| WO | WO-2006001033 A2 | * 1/2006 | ........... | B22F 1/0545 |
| WO | WO2020180311 A1 | 9/2020 | | |

OTHER PUBLICATIONS

Jiao Jiao et al—A pilot-scale homogenization-assisted negative pressure cavitation extraction of Astragaluspolysaccharides—International Journal Biological Macromolecules, Elsevier BV, NL, vol. 67, Mar. 21, 2014 (Mar. 21, 2014), pp. 189-194, XP029024524.
Zhang D Y et al—Negative pressure cavitation extraction and antioxidant activity of genistein and genistin from the roots of pigeon pea (*Cajanus cajan* (L.) Millsp.), Separation and Purification Technology, Elsevier Science, Amsterdam, NL, vol. 74, No. 2, Aug. 17, 2010 (Aug. 17, 2010), pp. 261-270, XP027174738.
Extended European Search Report of application No. 21884221.9, European Patent Office, Apr. 11, 2024.
International Search Report of PCT/CA2021/051521; Kristoffer Wilde; Dec. 14, 2021.
Islam et al. "A Review on Macroscale and Microscale Cell Lysis Methods", Micromachines, vol. 8, No. 83, 2017, pp. 1-27.
Zhao et al. "Pretreatments for the Efficient Extraction of Bioactive Compounds from Plant-Based Biomaterials", Critical Reviews in Food Science and Nutrition, vol. 54, No. 10, Oct. 1, 2014 (Oct. 1, 2014), pp. 1283-1297.
Zhang et al. "Plant derived edible nanoparticles as a new therapeutic approach against diseases", Tissue Barriers, vol. 4, No. 2, Nov. 2, 2016 (Nov. 2, 2016), pp. 1-9.
Zhang et al. "Edible ginger-derived nanoparticles: A novel therapeutic approach for the prevention and treatment of inflammatory bowel disease and colitis-associated cancer", Biomaterials, vol. 101, Sep. 2016 (Sep. 1, 2016), pp. 321-340.

* cited by examiner

*Primary Examiner* — Nghi V Nguyen
(74) *Attorney, Agent, or Firm* — DECODE Legal Inc.; Mathieu Miron

(57) ABSTRACT

The present disclosure relates to a process and composition thereof to produce stable biological organic submicrometric nanoparticles using whole biologically grown matter as principal source. More specifically, a process and composition thereof to obtain biological supramolecular assemblies using freeze-thaw: drying and negative-pressure combinations and compositions thereof for the purpose of production of the biological organic particles.

23 Claims, 27 Drawing Sheets

[1] Biological matter

[2] Moisture saturation

[3] Freeze-Thaw

[4] Drying with heating

[5] Full contact with first solvent

[6] Negative pressure and release

[7] Collect clear solution

[8] Nanoparticle formation (second solvent or ratio change)

Sample A

Sample A

Sample B

PROCESS AND COMPOSITION FOR PRODUCTION OF ORGANIC SUBMICROMETRIC PARTICLES FROM WHOLE BIOLOGICAL MATTER

CROSS-REFERENCE TO RELATED APPLICATIONS

This application is a U.S. National Phase application under 35 U.S.C. § 371 of PCT/CA2021/051521, filed Oct. 28, 2021, which claims priority from and the benefit of U.S. Provisional Patent Application No. 63/106,499 filed on Oct. 28, 2020, the specifications of which are hereby incorporated by reference in their entireties.

BACKGROUND

(a) Field

The subject matter disclosed generally relates to processes for production of biological submicrometric particles from bulk multicellular biological material, and compositions obtained therefrom. More specifically, the subject matter disclosed relates to processes for production of biological submicrometric particles using freeze-thaw, drying and negative pressure-solvent extractions cycles.

(b) Related Prior Art

Subcellular structures of submicrometric sizes are very prominent in most cells when examined under high-resolution microscopes, Presence of these submicrometric structural entities are ubiquitous and default phenomenon of any living beings (Wang P et al., New Phytol. 2019 September; 223 (4):1756-1761). Essential molecules for human use from plants and other organisms are stored as subcellular micrometric structures, mostly as compartmentalized supramolecular assemblies or as mixed bundles of different molecules assembled by nature, like oils, antioxidants, terpenoids, alkaloids and a plethora of metabolites. The rapid dynamics of subcellular sub-micron vesicular or nano-structural reorganization are demonstrated in plants, especially in response to infection, environmental stress and mechanical injuries. For example, in plants, fungal infection induces exosome-like vesicles formation and transport to the site of infection (Cai Q et al., Science 2018 Jun. 8; 360 (6393): 1126-1129). Naturally plant and other organisms contain nano-entities, for example, fresh-press "juice" from fruits or roots contain significant mounts exosome-like-nanoparticles (Ju S. et al., Mol Ther. 2013 July; 21 (7):1345-57).

Molecules of plants and other organisms essential for human nutritional and medicinal properties are tightly subcellularly bound either as vesicles or compact submicrometric structures. For bioavailability, those biological materials need to be digested and absorbed to provide nutritional and health benefits. Current literature suggests that bioavailability of any matters or compounds into human and animal cells is most efficiently achieved when they are delivered as nanometric carrier structures. For example, drug loaded nanoparticles for cancer treatment or nano-emulsions in medicine, cosmeceuticals and food industry (Sharma et al., Scientifica (Cairo). 2016:8525679). It also appears that human bioavailability of medicinal ingredients from plants (e.g. curcumin) is best achieved when delivered in nanoparticle carrier (e.g. liposomes (Sinjari B, et al., Front Physiol. 2019 Jun. 11; 10:633.)).

Nanostructures of nature are most suitable to be bioavailable because humans evolved using plants and other organisms as nutrition and medicine. Thus, by default evolutionary process, these natural organic or biological nanostructures are thought to be safe, tolerated, non-toxic, non-immunogenic and already manufactured by food and medicinal plants or organisms in their cells. Thus, the research and development of natural biological organic nanoparticle-based products shows potential in multiple industries, to better human and environmental health.

Inorganic nanoparticles are well-known in the art and they enter into our biological system through properties of rapid cellular absorption and movements inside our body. Absorbed nanoparticles induce a spectrum of intracellular disruptions, such as endoplasmic reticulum and oxidative stresses. Most inorganic nanoparticles are not biodegradable and thus increase bioaccumulation and environmental contamination enhancing chances of continuously entering into our food chain. For examples, micro- and nanoparticles of plastic are known to contaminate food, water, soil and ecosystem (Toussaint B, et al., Food Addit Contam Part A Chem Anal Control Expo Risk Assess. 2019 May; 36 (5):639-673). Critically, there is a general lack of regulatory obligations to disclose presence of nanoparticles in food and daily-need products used by people (Fytianos G, et al,m Nanomaterials (easel) 2020 May 20; 10 (5):979). This makes it difficult for consumers to acknowledge and choose synthetic nanoparticle-free products.

Thus, there is a need for alternatives to synthetic nanoparticles. For example, it may be preferable to harness biological nanoparticles from natural biological matter, which are thought to be safe, to avoid the shortcomings of synthetic nanoparticles and make biological submicrometric particles as nanocarriers for preparation of compositions having more acceptable biological compatibility.

SUMMARY

According to an embodiment, there is provided a process for the production of biological submicrometric particles from a bulk multicellular biological material comprising the steps of:

- (a) mild homogenization of the bulk multicellular biological material from a biological entity, comprising a water content of from about 75% to about 100% saturation capacity of the bulk multicellular biological material, comprising freeze-thaw of the bulk multicellular biological material, comprising at least two cycles of (a-i) and (a-ii),
- (a-i) freezing the bulk multicellular biological material to a temperature of from about −4° C. to about −40° C. for a time sufficient to freeze the bulk multicellular biological material; and
- (a-ii) thawing the bulk multicellular biological material to a temperature of from about 10° C. to about 50° C. for a time sufficient to thaw the bulk multicellular biological material;
- to obtain a mildly homogenized bulk multicellular biological material,
- (b) drying of the mildly homogenized bulk multicellular biological material at a temperature of from about 30° C. to 300° C. for a time sufficient to obtain a dried mildly homogenized bulk multicellular biological material comprising a water content of 4% or less of the dry weight of the bulk multicellular biological material.
- (c) contacting the dried mildly homogenized bulk multicellular biological material with a first solvent, to obtain a solvent contacted dried mildly homogenized bulk multicellular biological material, (d) negative pressure-solvent extraction of the solvent contacted dried mildly homogenized bulk multicellular biological material comprising at least 2 cycles of (d-i) and (d-ii):

(d-i) negative pressure treatment of the solvent contacted dried mildly homogenized bulk multicellular biological material; and (d-ii) return to atmospheric pressure of the solvent contacted dried mildly homogenized bulk multicellular biological material;

for a time sufficient to permeate the first solvent through, and further homogenize the solvent contacted dried mildly homogenized bulk multicellular biological material, and (e) separation of the solvent contacted dried mildly homogenized bulk multicellular biological material from the first solvent, to obtain a solution of supramolecular assemblies and molecular mixes.

The process may further comprise step (a') before step (a):

(a') incubation of the bulk multicellular biological material in an aqueous solution for saturation to a water content of from about 75% to about 100% saturation capacity of the bulk multicellular biological material.

The process may further comprise step (f):

(f) filtration of the solution of supramolecular assemblies and molecular mixes, wherein filtration is microfiltration, ultrafiltration, or combinations thereof, for removal of a remaining fragment of the dried mildly homogenized bulk multicellular biological material and provide a cleared solution of supramolecular assemblies and molecular mixes in the first solvent.

The process may further comprise step (g):

(g) self-aggregation of the supramolecular assemblies and molecular mixes in the first solvent to obtain aggregated biological submicrometric particles of a size population having a dispersity ≤0.3 by mixing the cleared solution of the supramolecular assemblies and molecular mixes with a second solvent, different than the first solvent.

The process may further comprise step (h):

(h) collection of the aggregated biological submicrometric particles of a size population having a dispersity ≤0.3, to obtain concentrated aggregated biological submicrometric particles of a size population having a dispersity ≤0.3.

In step (a-i), the freezing may be to a temperature of the bulk biomass of from about −8° C. to about −10° C., or from about −10° C. to about −20° C., or from about −20° C. to about −30° C., or from about −30° C. to about −40° C.

The time sufficient to freeze the multicellular biological material may be from about 10 minutes to about 24 hours.

The time sufficient to freeze the multicellular biological material may be from about 10 minutes to about 4 hours, or from about 10 minutes to about 3 hours, or from about 10 minutes to about 2 hours, or from about 10 minutes to about 1 hour.

The time sufficient to freeze the multicellular biological material may be at least 10 minutes.

In step (a-ii), the thawing may be to a temperature of the bulk biomass from about 25° C. to about 40° C.

The time sufficient to thaw the multicellular biological material may be from about 5 minutes to 4 hours.

The time sufficient to thaw the multicellular biological material may be from about 5 minutes to 1 hours, or from about 5 minutes to about 30 minutes, or from about 5 minutes to about 20 minutes, or from about 5 minutes to about 10 minutes.

The time sufficient to thaw the multicellular biological material may be at least 10 minutes.

The mild homogenization may comprise from about 2 to about 20 cycles of (a-i) and (a-ii).

In step (b) drying of the mildly homogenized multicellular biological material may be at a temperature of from about 90° C. to 150° C.

A time sufficient to obtain a dried mildly homogenized multicellular biological material may be from about 5 minutes to about 1 hour, or from about 5 minutes to about 30 minutes, or from about 5 minutes to about 25 minutes, or from about 5 minutes to about 20 minutes, or from about 5 minutes to about 15 minutes, or from about 5 minutes to about 10 minutes.

Filtration may be with a filter having pore size of from about 0.1 μm to about 1 μm, or from about 0.1 μm to about 0.8 μm, or from about 0.1 μm to about 0.5 μm, or about 0.1 μm to about 0.45 μm, or about 0.1 μm to about 0.2 μm.

Filtration may be with a filter configured for filtration of particles having $10^3$-$10^6$ Da.

The aggregation may be performed by mechanical turbulence of the first solvent or the second solvent, by mixing the solution of supramolecular assemblies in the first solvent with a second solvent to a ratio of from about 1:3 to 1:100.

Mechanical turbulence may be induced by circular flow, directional low or combinations thereof.

The first solvent may be a combination of two or more solvents.

The combination of two or more solvents may comprise miscible solvents only.

In the combination of two or more solvents, the ratio may be 1:3.

The first solvent or the second solvent may be at a pH of from about 2.5 to about 10.5.

The first solvent or the second solvent may be at a pH of from about 6.0 to about 8.0.

The first solvent may be water, acetic acid, hexene, ethanol, isopropanol, citric acid, ethyl acetate, glycerol, glycerol acetates, glycol, acetone, benzyl alcohol, 1,3-butylene glycol, 1,3-butylene glycol, glyceryl triacetate, glyceryl tributyrate, hexane, methyl ethyl ketone, methylene chloride, monoglycerides and diglycerides, monoglyceride citrate, triethyl citrate or combinations thereof.

The second solvent may be water, acetic acid, hexene, ethanol, isopropanol, citric acid, ethyl acetate, glycerol, glycerol acetates, propylene glycol, acetone, benzyl alcohol, 1,3-butylene glycol, 1,3-butylene glycol, glyceryl triacetate, glyceryl tributyrate, hexane, methyl ethyl ketone, methylene chloride, monoglycerides and diglycerides, monoglyceride citrate, triethyl citrate and combinations thereof.

The second solvent may be distilled water.

The first solvent or the second solvent may be buffered with a physiologically compatible salt, a buffering agent and mixture thereof.

The first solvent or the second solvent may further comprise an additive molecule.

The additive molecule may be a polymeric molecule.

The polymeric molecule may be a polysaccharide, a protein, a biocompatible polymer, or a combination thereof.

The additive molecule may be a polymeric molecule of at least 1 kDa.

The polysaccharide may be a cellulose, a chitin, a starch, a glycogen, a glycosaminoglycans, a chitosan, an alginate, a fucoidan, a carrageenan, an amylose, an amylopectin, a glucan, a mannans, chemical derivatives thereof and combinations thereof.

The protein may be a casein, an albumin, a globulin, an edestin, a glycoprotein, a lipoprotein, and derivatives thereof and combinations thereof.

The biocompatible polymer may be a polyethylene glycol (PEG) or derivatives thereof.

The chemical derivatives may be methylation, ethylation, butylation, propylation, silylation, acylation, acetylation, alkylation, esterification, thiolation, hydroxylation, animation, amidation derivatives of the polysaccharides, proteins, or biocompatible polymers.

The negative pressure treatment may be at from about −1.38 kPa to about −206.84 kPa (−0.2 psi to about −30 psi).

The negative pressure treatment may be at from about −1.38 kPa to about −68.95 kPa (−0.2 psi to about −10 psi), or from about −3.45 kPa to about −13.79 kPa (−0.5 psi to about −2 psi), or from about 13.79 kPa to about −27.58 kPa (−2 psi to about −4 psi), or from about −27.58 kPa to about −68.95 kPa (−4 psi to about −10 psi), or from about −68.95 kPa to about −206.84 kPa (−10 psi to about −30 psi).

The negative pressure treatment may be for about 0.5 second to about 5 seconds.

The negative pressure treatment may be for about 0.5 second.

The return to atmospheric pressure may be for about 0.01 second to about 1 seconds.

The return to atmospheric pressure may be for about 0.01 second.

In step (d), the time sufficient to permeate the first solvent through may be from about 3 to about 200 cycles of (d-i) and (d-ii).

Step (d) may be performed at a temperature of about −20° C. to about 70° C.

Step (d) may be performed at a temperature of about −4° C. to about 30° C.

In step (b) drying of the mildly homogenized multicellular biological material may be performed in a container in presence of continuous circular gas flow or a directional gas flow.

The gas may be $N_2$.

The aqueous solution may be distilled water.

According to another embodiment, there is provided a composition comprising the biological submicrometric particles produced by the of the present invention, and a suitable carrier.

The suitable carrier may be a pharmaceutically acceptable carrier.

The following terms are defined below.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "formulation" as used herein is intended to encompass a product comprising the specified ingredients in the specified amounts, as well as any product which results, directly or indirectly, from combination of the specified ingredients in the specified amounts. Further the formulation refers to the mixture wherein the substances in the mixture do not react with each other but have desirable properties as a mixture. Such term in relation to pharmaceutical composition is intended to encompass any composition made by admixing the formulation of the present invention and a pharmaceutically acceptable carrier. By "pharmaceutically acceptable" or "acceptable" it is meant the carrier, diluent or excipient must be compatible with the other ingredients of the formulation and not deleterious to the recipient thereof.

The "particle" as used herein means minute portions of matter obtained from a bulk multicellular biological material. The particles according to the invention are of submicrometric size. As used herein, the particles produced are intended to be particles comprising material enclosed therein, and do not encompass any types of hollow vesicles or entities.

The terms "submicrometric" or "submicron", as used herein, are intended to mean particles of size bellow one micrometer (<1 μm) of average diameter. As used herein, the "submicrometric" or "submicron" particles produced are intended to be particles comprising material enclosed therein, and do not encompass any types of vesicles or hollow entities.

The term "nanoparticle", as used herein refers to particle sizes, and more specifically to particles having sizes ranging from about 1 to about 1000 nanometer (nm). As used herein, the nanoparticles produced are intended to be nanoparticles comprising material enclosed therein, and do not encompass any types of empty vesicles or hollow entities.

The term "dispersity", used herein refers to the measure of the heterogeneity of sizes of molecules or particles in a mixture, particularly in a mixture of nanoparticles of the present invention. In embodiments, the dispersity as used herein refers to the value Đ which may be calculated with the equation (1) where $M_w$ is the weight-average molar mass and $M_n$ is the number-average molar mass:

$$Đ = M_w/M_n \tag{1}$$

The dispersity Đ was formerly referred to as the polydispersity index (PDI). According to embodiments of the present invention, the dispersity of the size of the particles generated by the process of the present invention is a Đ value equal to or of less than 0.3 (≤0.3). For example, the Đ value may be from about 0.05 to about 0.3, or from about 0.1 to about 0.3, or from about 0.15 to about 0.3, or from about 0.2 to about 0.3, or from about 0.25 to about 0.3, or from about 0.05 to about 0.25, or from about 0.1 to about 0.25, or from about 0.15 to about 0.25, or from about 0.2 to about 0.25, or from about 0.05 to about 0.2, or from about 0.1 to about 0.2, or from about 0.15 to about 0.2, or from about 0.05 to about 0.15, or from about 0.1 to about 0.15, or from about 0.05 to about 0.1, or at least about 0.05, 0.1, 0.15. 0.2, 0.25, or 0.3.

As used here in the term "production" means a process for manufacturing or generating the submicrometric particles of the present invention.

As used herein, the terms "molecular mixes" is intended to mean the parts of the biological materials obtained from the bulk multicellular biological material from the processes of the present invention. The molecular mixes are intended to be the complexes of molecules are held together by noncovalent bonds, suspended or dissolved in the first solvent which act as suspended or dissolved molecules that are eventually induced to grow as submicrometric particles having a dispersity ≤0.3, and from about 0.05 to about 0.3, by aggregation with/onto the supramolecular assemblies.

As used herein, the terms "supramolecular assembly" or "supramolecular assemblies" are intended to mean aggregates, arrangements, complexes of biological materials obtained from the bulk multicellular biological material, from the processes of the present invention. As used herein, supramolecular assembly is intended to mean that the complexes of molecules are held together by noncovalent bonds in the bulk multicellular biological material, which act as ready-supply of nucleation seed materials that are induced to grow as sub micrometric particles having a dispersity 0.3, and from about 0.05 to about 0.3.

The terms "bulk biological material" and "bulk multicellular biological material" and "biomass" are intended to mean parts and portions of material obtained from a biological entity that was biologically grown. The biological entity is a multicellular entity. In embodiments, the biological material or multicellular biological material may be from any biological origin such as plants, animals, and even human. In some aspects of the invention the biological matter includes, but is not limited to cultured plant cells, tissues or plants, for example, but not limited to, callus culture, bioreactor grown or cultured cell-mass or tissue or artificially conditioned cultured plants. In some embodiment, the bulk biological matter includes masses and aggregations of unicellular organisms including but not limited to masses and aggregations of yeasts, fungus, mycorrhizae and other lower phylogenetic organisms.

For example, when the biological material is from plants such as therapeutic plants, edible-plants, medicinal plants, pharmaceutically important plants, cosmetically important plants, or parts thereof. In some embodiment, the bulk biological matter may include macroalgae (for example seaweeds) and microalgae (for example phytoplankton) used for human nutrition and functional food or medicinal or food-additives or agricultural purpose. Embodiments it may be the whole plant, or parts of a plant (e.g., the flowers, leaves, stems, branches, fruits, fruit skin, seeds, meristem, pulp, and roots), combinations of parts of plants from the same part or from different parts.

For example, when the biological material is from animals, it may be from the whole animal, or parts of animals, such has the different tissues (e.g., bone tissue, epithelial tissue, cartilage tissue, adipose tissue, nervous tissue, muscle tissue, and connective tissue, and excluding blood cells) or organs tissues (e.g., muscles, bones, stomach, liver, intestine, pancreas, heart, blood vessels, muzzle, windpipe, lungs, kidneys, bladder, brain, nerves spinal cord, eyes, ears, nose, skin, testes, penis ovaries, uterus, vagina, vulva, udder, lymph nodes, and spleen), combinations of parts of plants from the same part or from different parts.

In some embodiments, the biological matter may include insect and other invertebrates or parts thereof.

In some embodiments, the bulk biological matter includes multiplicity of individual biological matter or their parts thereof mixed.

In other aspects of the invention the biological material includes, but is not limited to, preserved biological mass or their parts thereof as frozen, lyophilized, or dried conditions prior to the process of the invention.

According to embodiments, the bulk multicellular biological material may be separated into fragments of the bulk multicellular biological material, for example, fragments or smaller parts of plant flowers, leaves, stems, branches, fruits, seeds, and roots, or fragments of tissues or organs. For example, plant roots or fruits may be cut into smaller pieces.

In embodiments, the bulk multicellular biological material may be comprised of cells masses and aggregations of cells of unicellular biological material, such as single cells grown in cell or tissue culture and precipitates of the unicellular biological material.

In embodiments, the bulk multicellular biological material should not be considered to comprised of biological material, such as cells, or whole tissues or organs that have been disaggregated by means known in the art.

The term "tissue" is intended to mean any of the distinct types of material of which animals or plants are made, consisting of specialized cells and their products.

The term "organ" is intended to mean a part of an organism that is typically self-contained and has a specific vital function, such as the heart or liver in humans.

The term "solvent" is Intended to means a liquid that has the ability to dissolve, suspend, or extract other materials, without chemical change to the material or solvent. Examples of solvent include but are not limited to food additive solvents like water, acetic acid, hexene, ethanol, isopropanol, citric acid, ethyl acetate, glycerol, glycerol acetates, propylene glycol, acetone, benzyl alcohol, 1,3-butylene glycol, 1,3-butylene glycol, glyceryl triacetate, glyceryl tributyrate, hexane, methyl ethyl ketone, methylene chloride, monoglycerides and diglycerides, monoglyceride citrate, triethyl citrate and combinations thereof. According to an embodiment, a first solvent may be used to contact the dried mildly homogenized bulk multicellular biological material, and a second solvent may be used to initiate production/self-aggregation of stable submicrometric nanoparticles of homogeneous size.

terms "negative pressure" or "negative air pressure" are intended to refer to conditions whereby the air pressure is lower in one place in comparison to another. According to the present invention's embodiments, the negative air pressure refers to the pressure inside the container containing the solvent contacted dried mildly homogenized bulk multicellular biological material, where the air pressure inside this container is lower than the pressure outside the container, causing air to flow into the container when the seal is released. The negative pressure treatment effected on the solvent contacted dried mildly homogenized bulk multicellular biological material may be from about −1.38 kPa to about −206.84 kPa (−0.2 psi to about −30 psi), or from about −1.38 kPa to about −68.95 kPa (−0.2 psi to about −10 psi), or from about −3.45 kPa to about −13.79 kPa (−0.5 psi to about −2 psi), or from about 13.79 kPa to about −27.58 kPa (−2 psi to about −4 psi), or from about −27.58 kPa to about −68.95 kPa (−4 psi to about −10 psi), or from about −68.95 kPa to about −206.84 kPa (−10 psi to about −30 psi).

The term "vacuum", as used herein is synonymous with "negative pressure" or "negative air pressure". As described herein, the term means that vacuum condition is created by removing gaseous phase inside the container, on top of the first solvent contacted dried mildly homogenized bulk multicellular biological material, using a suction devise attached to the container, for example.

The term "release" is intended to mean that the pressure inside the container is returned to atmospheric pressure and that no negative pressure remains in the container.

The terms "contact", "contacting" or "contacted" are intended to refer to the action of physically touching. For example, with respect to the present invention, the biological material is contacted with the first solvent, which may include resuspending, submerging in whole or in part the biological material in the solvent.

The term "cleared solution" or "clear solution" are intended to refer to the solution of "supramolecular assembly(ies)" and molecular mixes obtained after removing the dried mildly homogenized bulk multicellular biological material through known separation means (e.g., centrifugation, decantation, aspiration, sieving, etc.) followed by filtration (e.g., microfiltration and ultrafiltration) process for clearing from the solution of first solvent.

The term "microfiltration" is intended to mean the physical-filtration process where a fluid is passed through a micrometer (micron) pore-sized from about 0.1 μm to about 1 μm, or from about 0.1 μm to about 0.8 μm, or from about 0.1 μm to about 0.5 μm, or about 0.1 μm to about 0.45 μm, or about 0.1 μm to about 0.2 μm.

The term "ultrafiltration" refers to the membrane filtration process in which forces like pressure or concentration gradients lead to a separation through a semipermeable membrane. Suspended solids and solutes of high molecular weight are retained in the so-called retentate, while water and low molecular weight solutes pass through the membrane in the permeate (filtrate). This separation process is used in industry and research for purifying and concentrating macromolecular ($10^3$-$10^6$ Da) solutions, especially protein solutions.

The term "saturation capacity" is intended to refer to the level of water content in the bulk multicellular biological material from a biological entity when the pores of the bulk multicellular biological material are filled with water. In embodiment, when the water content is 75%, the pores are 75% filled, while when the water content is 100%, the pores are 100% filled (i.e., they are fully saturated), Saturation capacity may therefore be from about 75% to about 100%, or from about 80% to about 100%, or from about 85% to about 100%, from about 90% to about 100%, from about 95% to about 100%.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

Figure 10:
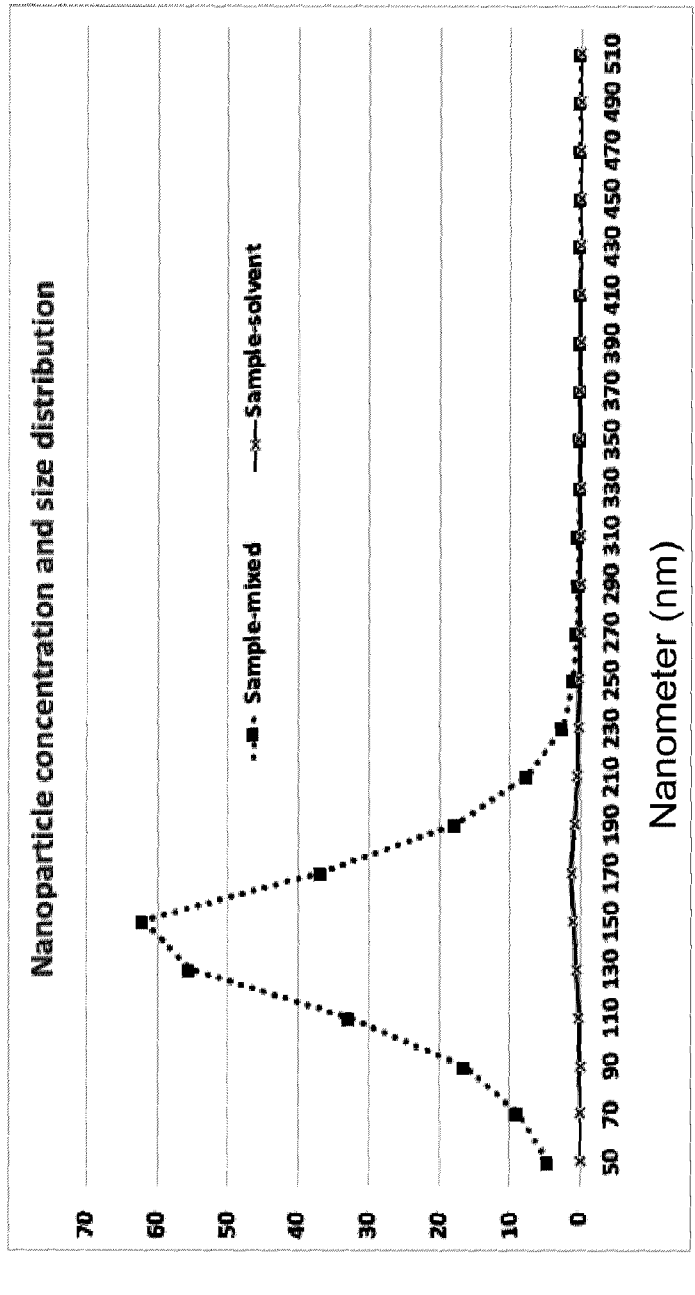
FIG. 10 shows a graph of particle size distributions in nanometer (nm) and concentration of nanoparticle generated from a mixture of dried plant parts described in example 5.

12B shows an electron microscopy photograph of nanoparticle generated from the sample shown in FIG. 10, using the process of the invention.

Figure 13:
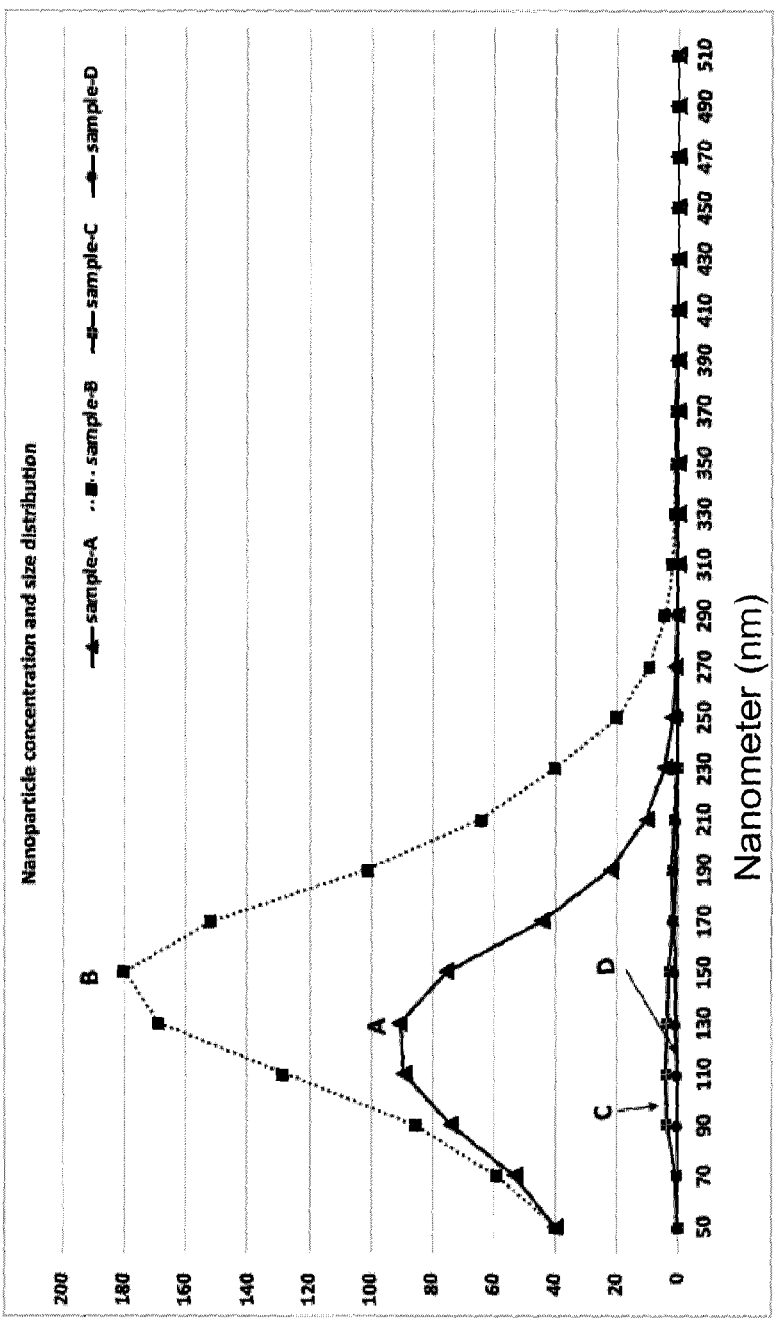

FIG. 13 shows a graph of particle size distributions in nanometer (nm) and concentration for 4 samples obtained from *Cannabis indica* leaves as detailed in example 6. In this example Sample-A and Sample-B represent examples of the process of the invention, whereas Sample-C represent a sample obtained without the steps of water saturation, freeze-thawing and negative pressure-release (steps 2 to 6 of FIG. 1) of the process of the present invention and sample-D represents the solvent only without biological materials.

Figure 14:
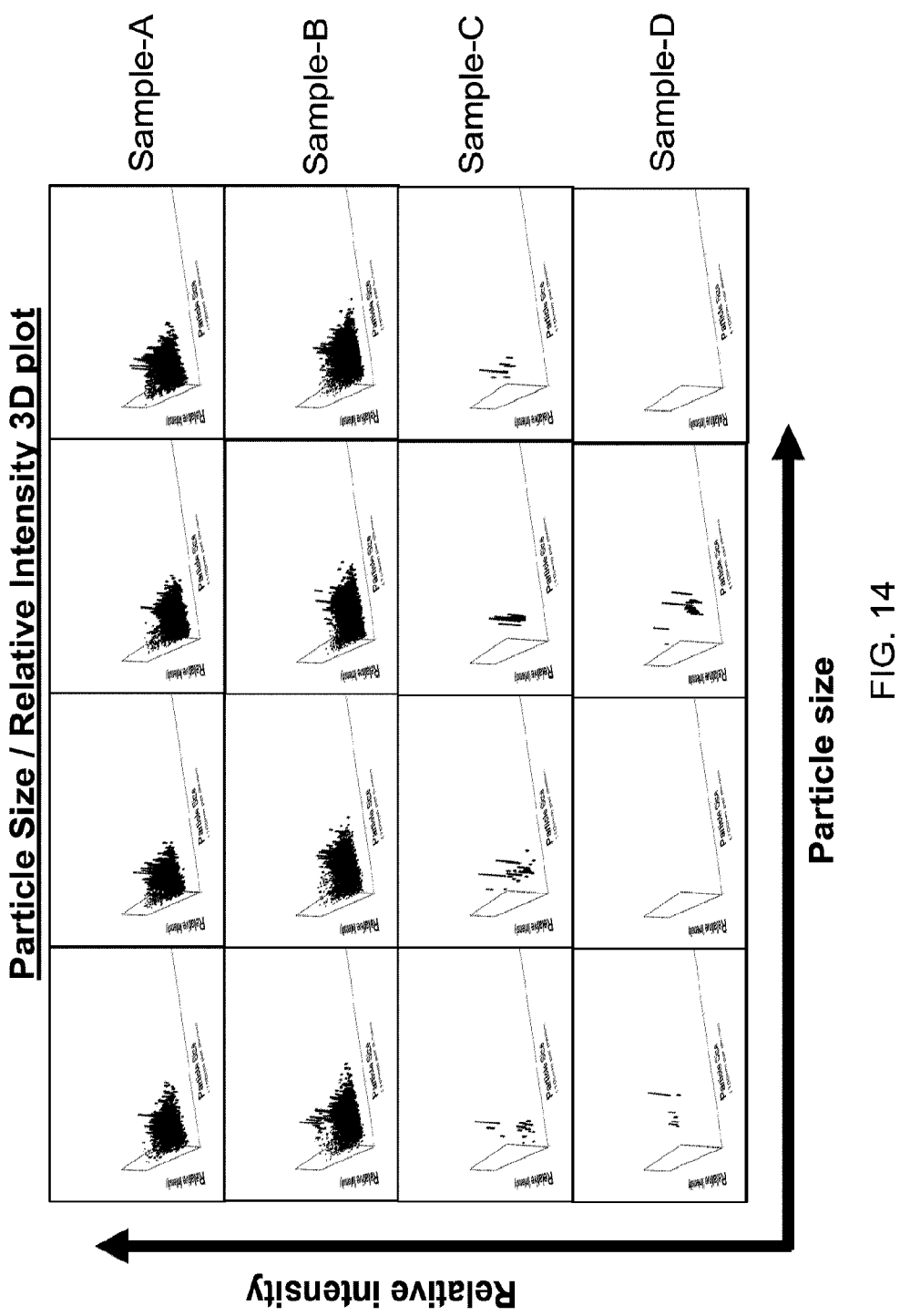

FIG. 14 illustrates a NanoSight™ generated Particle Size/Relative Intensity 3D plot from four independent aliquots of samples obtained from *Cannabis indica* leaves as detailed in example 6.

Figure 15A:
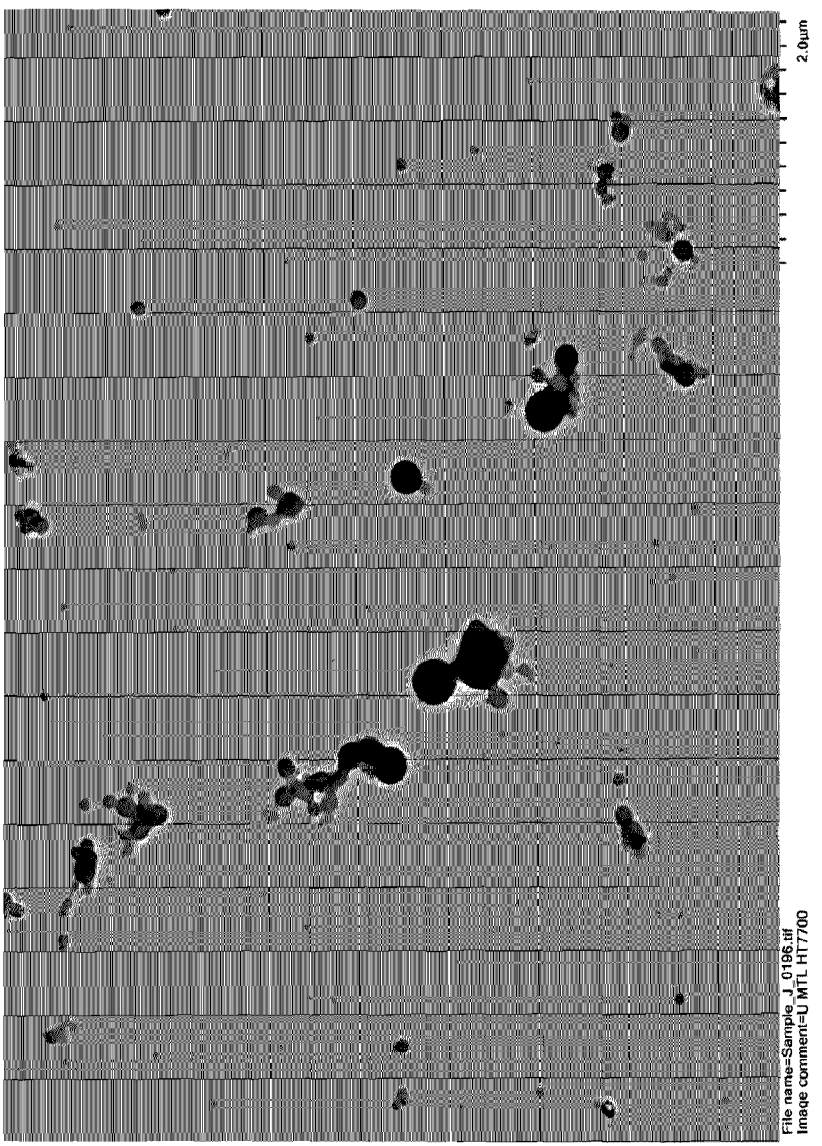

FIG. 15A shows an electron microscopy photograph of nanoparticle generated from *Cannabis indica* leaves using the process of the invention.

Figure 15B:
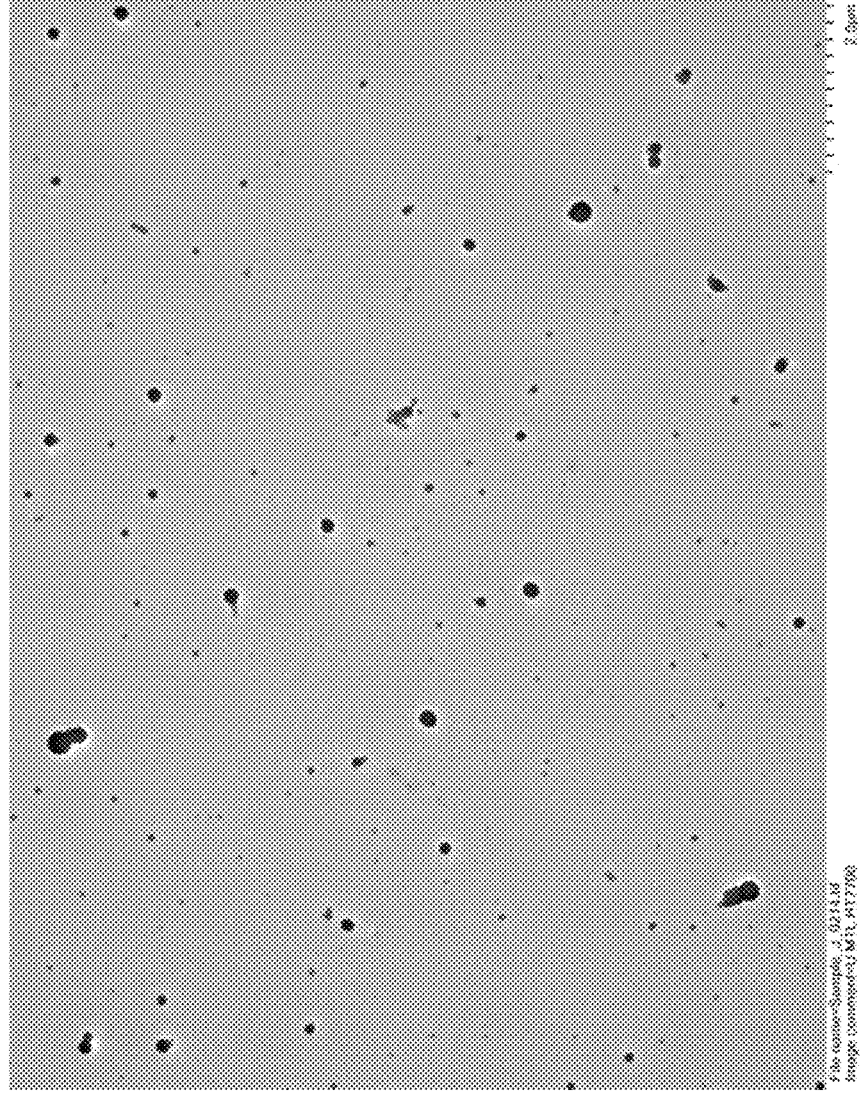

FIG. 15B shows an electron microscopy photograph of nanoparticle generated from *Cannabis indica* leaves using the process of the invention.

Figure 16:
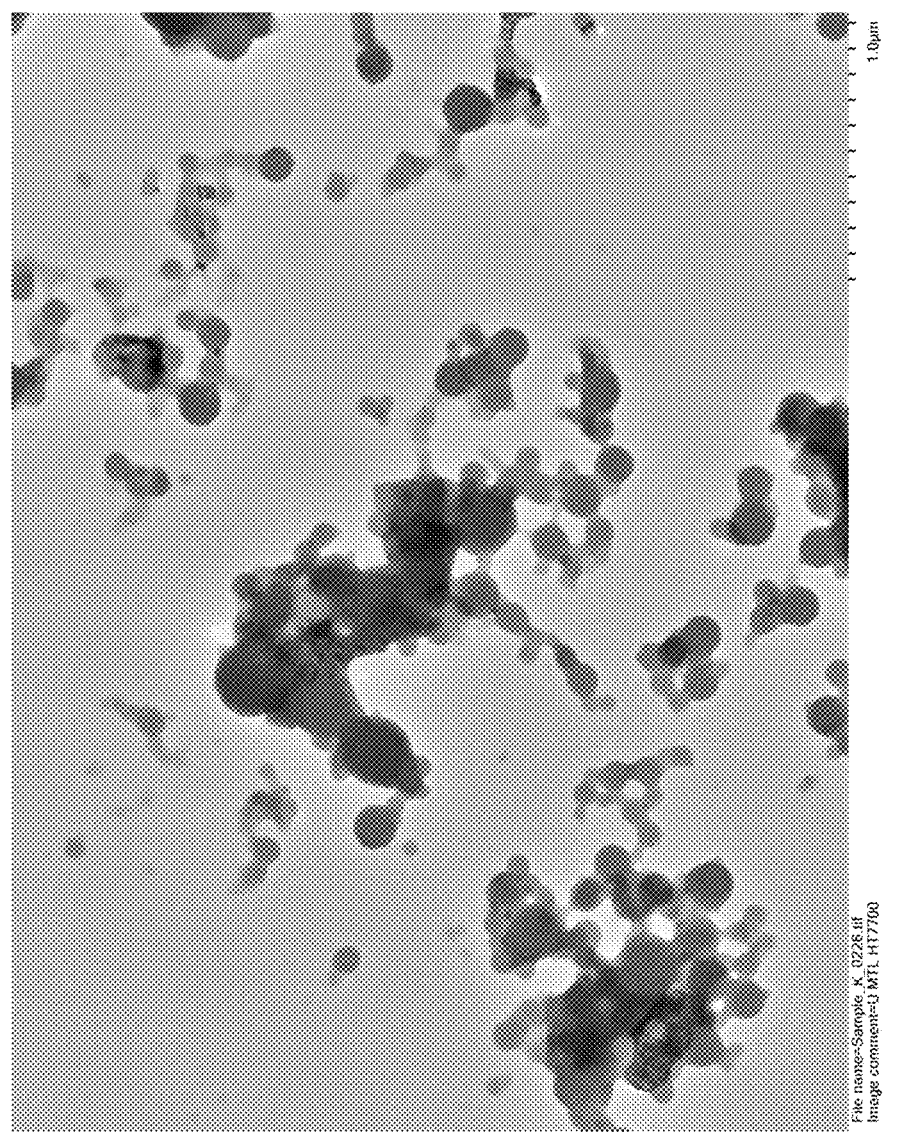

FIG. 16 shows another electron microscopy photograph of nanoparticle generated from *Cannabis indica* leaves using the process of the invention.

Figure 17:
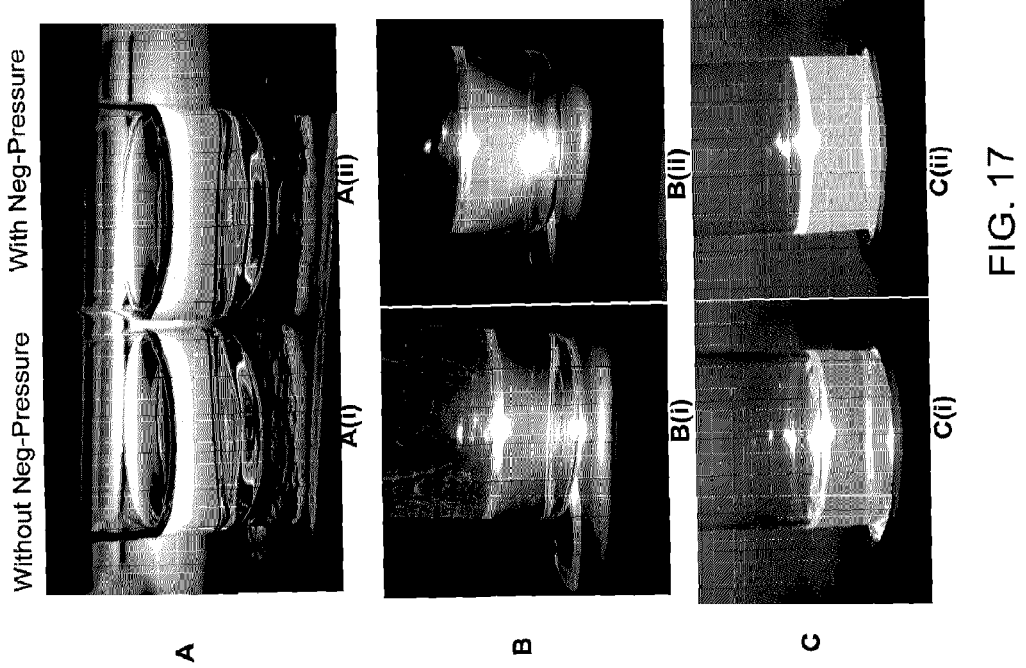

FIG. 17A illustrates a photograph of the solutions obtained after (i) a process of the present invention where no negative pressure—release was applied and (ii) a process of the present invention where negative pressure—release was applied. See example 7.

FIG. 17B illustrates a photograph of the solutions obtained after (i) a process of the present invention where no negative pressure—release was applied and (ii) a process of the present invention where negative pressure—release was applied. See example 7.

FIG. 17C illustrates a photograph of the solutions obtained after (i) a process of the present invention where no negative pressure—release was applied and (ii) a process of the present invention where negative pressure—release was applied. See example 7.

Figure 18:
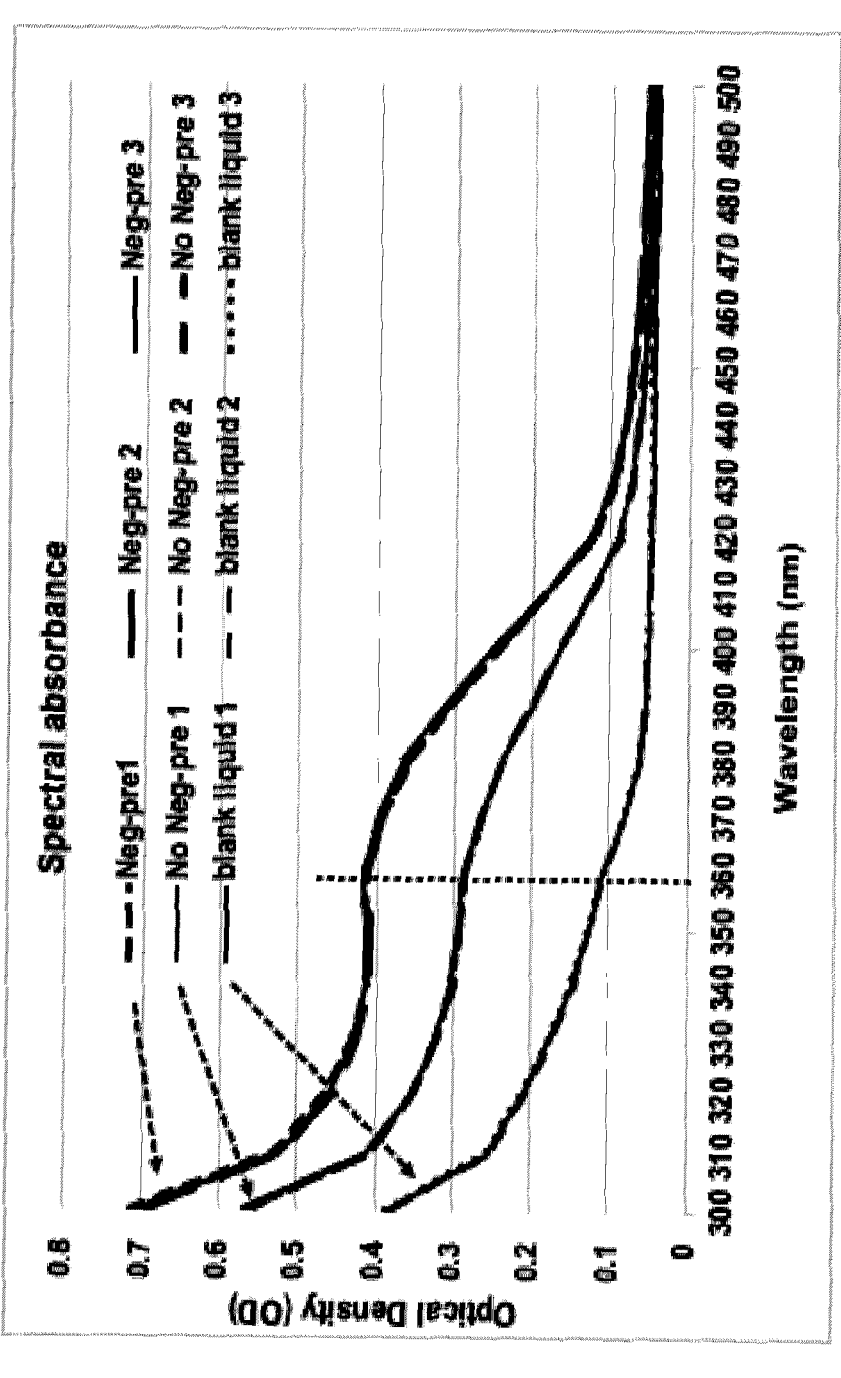

FIG. 18 illustrates an absorption spectral graph to identify maximum absorption peak(s) of the material in the liquid over the background liquid of the samples illustrated in FIGS. 17A-C of example 7.

Figure 19:
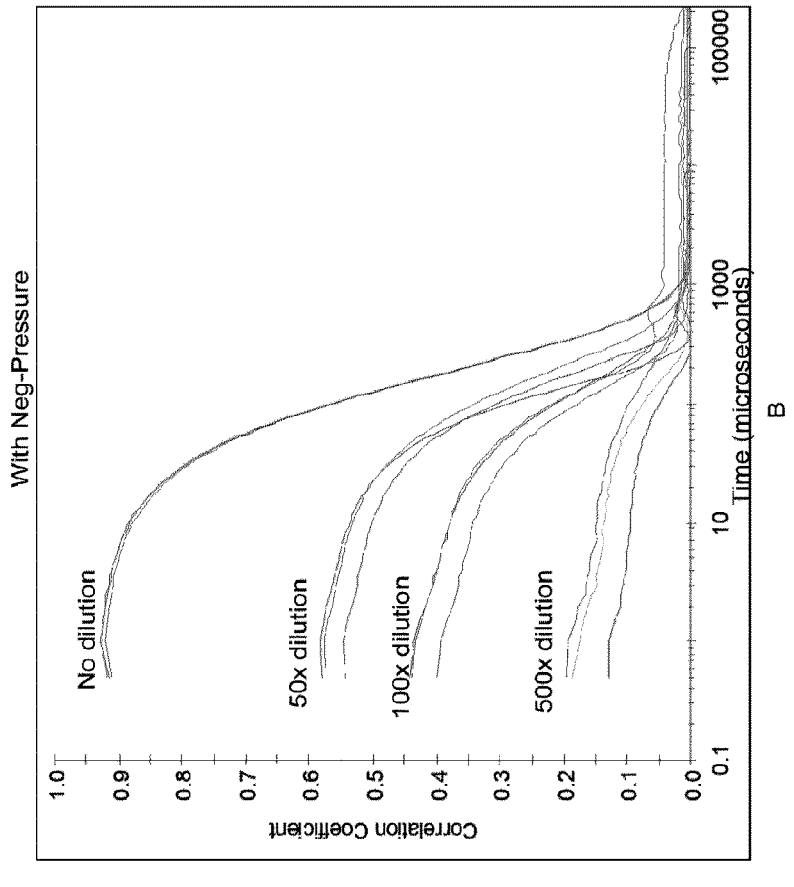
Figure 19:
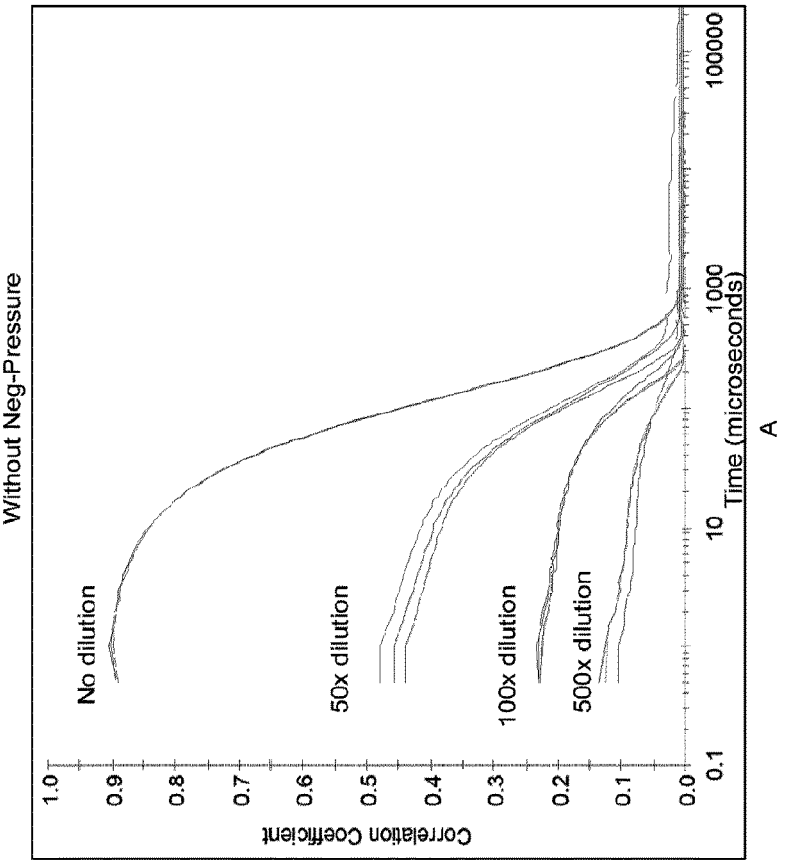

FIG. 19A illustrates a correlation coefficient of the particles measured on ZetaSizer-Nano™ using the integrated digital correlator software to measure signal decay time (microseconds) to baseline, for the samples illustrated in FIGS. 17A-C of example 7.

FIG. 19B illustrates a correlation coefficient of the particles measured on ZetaSizer-Nano™ using the integrated digital correlator software to measure signal decay time (microseconds) to baseline, for the samples illustrated in FIGS. 17A-C of example 7.

Figure 20:
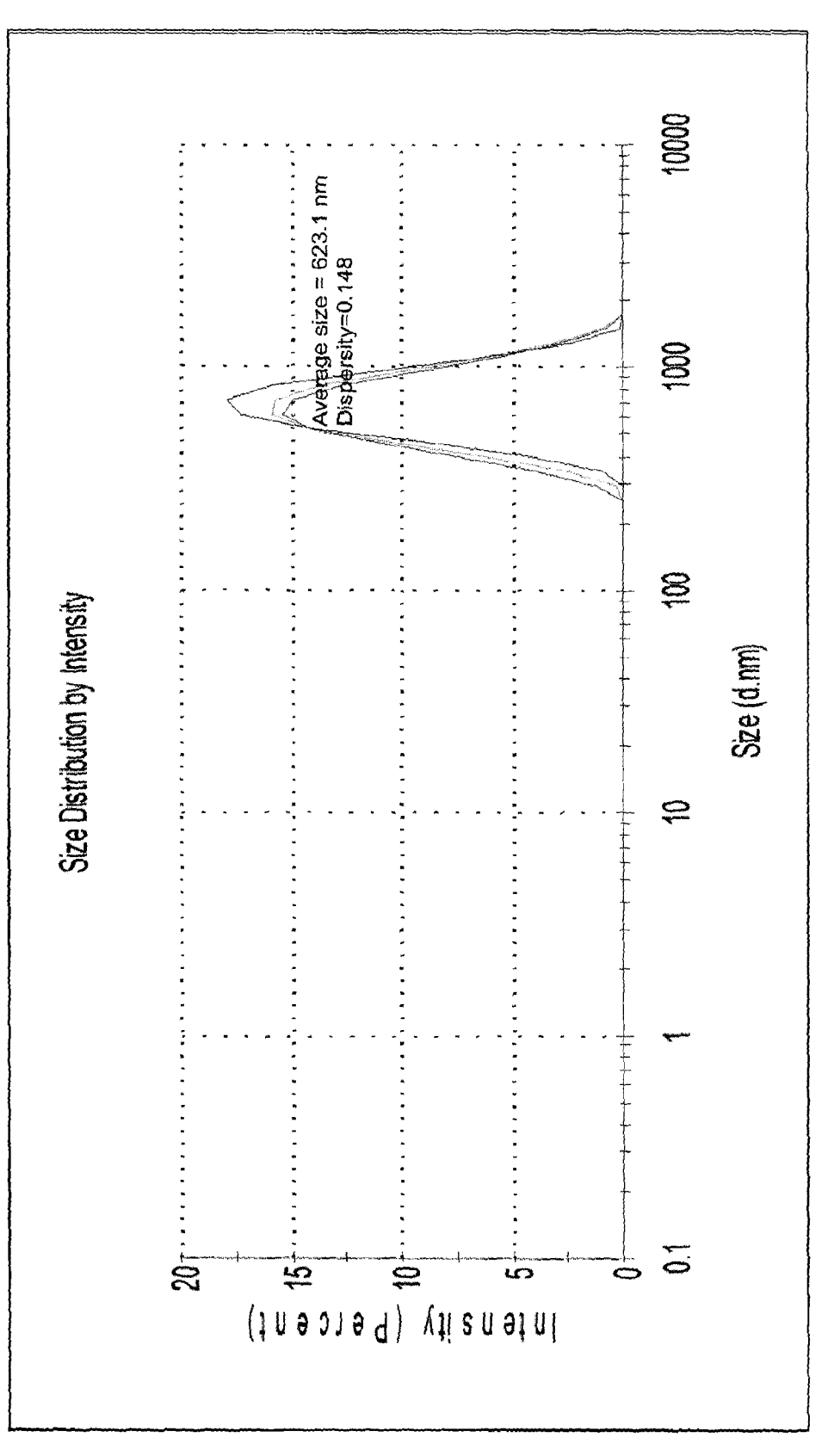

FIG. 20 illustrates a size distribution of the particles measured by intensity on ZetaSizer-Nation™ using the integrated digital correlator software to measure average size and dispersity of example 8.

DESCRIPTION OF THE INVENTION

The invention detailed here presents a unique process and composition thereof for production of submicrometric nanoparticles using whole biological material as principal constituent. The processes and compositions detailed herein result in the extraction of the supramolecular and molecular mixes from the whole biological material. The present disclosure details processes for the formation of high concentrations of supramolecular assembly and molecular mixes, which act as ready-supply of nucleation seed and materials that are induced to grow as submicrometric particles having a dispersity ≤0.3, and between about 0.05 and about 0.3. Conducive physicochemical conditions are created to facilitate growth and stabilization conditions of those supramolecular and molecular assemblies to form biological organic nanoparticles having a dispersity ≤0.3 and between about 0.05 and about 0.3. The process of the present invention includes steps of (a) mild homogenization by freezing and thawing, (b) drying, (c) contacting with first solvent, followed by (d) negative pressure-solvent extraction, and (e) separation of the first solvent contacted bulk multicellular biological material from bulk multicellular biological material. The obtained solution is then (f) filtered and (g) aggregated by dilution and change of composition ratios of solvents with a second solvent different than the first solvent to facilitate growth and stabilization as submicrometric nanoparticle having a dispersity ≤0.3 production process.

The submicrometric particles of the present invention may be used to produce biodegradable nontoxic, non-allergic natural nanoparticle alternative to food-additives, beverage additives, and other edible products, cosmetic additives, supplements of known nutritional and medicinal qualities, aerosol-based delivery for topical, nasal and oral delivery applications, to enhance percutaneous and mucosal penetration of multiple applications, to provide gel-based delivery applications for multiple applications.

In some embodiment, the submicrometric particles of the present invention are produced for the formulation of edible products for quality enhancement and the stabilization for long term storage.

In some embodiment, the submicrometric particles of the present invention are produced for the purpose of manufacturing of nano-carrier composed of natural antioxidants or nano-carrier for nutrition-supports or nano-carrier of functional molecules, for example but not limited to, curcumins, terpenes, alkaloids and flavonoids. In some embodiment, the submicrometric particles are produced for the purpose of manufacturing of natural nanoparticles to enhance bioavailability of multiple applications. In other aspects of the invention, the submicrometric particles of the present invention are produced for the purpose of manufacturing of natural nanoparticles to enhance superior and very precise dosing capabilities of a specific ingredient as composite of the nanocarrier for multiple applications.

Mild Homogenization

According to an embodiment, there is disclosed a process for the production of biological submicrometric particles from a bulk multicellular biological material comprising the steps of:

(a) mild homogenization of the bulk multicellular biological material from a biological entity, comprising a water content of from about 75% to about 100% saturation capacity of the bulk multicellular biological material, comprising freeze-thaw of the bulk multicellular biological material, comprising at least two cycles of (a-i) and (a-ii):

(a-i) freezing at a temperature of from about –4° C. to about –40° C. for a time sufficient to freeze the bulk multicellular biological material; and (a-ii) thawing at a temperature of from about 10° C. to about 50° C. for a time sufficient to thaw the bulk multicellular biological material;

to obtain a mildly homogenized bulk multicellular biological material,

According to an embodiment, the bulk multicellular biological material from a biological entity comprises a water content of from about 75% to about 100% saturation capacity of the bulk multicellular biological material. Saturation capacity may therefore be from about 75% to about 100%, or from about 80% to about 100%, or from about 85% to about 100%, from about 90% to about 100%, from about 95% to about 100%. To achieve the desired saturation capacity, the bulk multicellular biological material may be incubated in a previous step (a') in an aqueous solution, such as distilled water for example, until the desire saturation to a water content of from about 75% to about 100% saturation capacity. The time sufficient to achieve saturation density will vary according to the source and nature of the bulk multicellular biological material used in the process of the present invention. Incubation may be achieved by contacting the bulk multicellular biological material with the aqueous solution, for example by filling a suitable container with the aqueous solution containing the bulk multicellular biological material.

In embodiments, the mild homogenization comprises freeze-thaw of the bulk multicellular biological material for at least two cycles of (a-i) and (a-ii):

(a-i) freezing the bulk multicellular biological material to a temperature of from about –4° C. to about –90° C. for a time sufficient to freeze the bulk multicellular biological material; and (a-ii) thawing the bulk multicellular biological material to a temperature of from about 10° C. to about 50° C. for a time sufficient to thaw the bulk multicellular biological material.

In embodiments, in step (a-i), the freezing of the bulk multicellular biological material may be performed to a temperature of the bulk multicellular biological material from about –8° C. to about –10° C., or from about –8° C. to about –9° C., or from about –9° C. to about –10° C., or from about –10° C. to about –11° C., or from about –10° C. to about –12° C., or from about –10° C. to about –13° C., or from about –10° C. to about –14° C., or from about –10° C. to about –15° C., or from about –10° C. to about –16° C., or from about –10° C. to about –17° C., or from about –10° C. to about –18° C., or from about –10° C. to about –19° C., or from about –10° C. to about –20° C., or from about –20° C. to about –21° C., or from about –20° C. to about –22° C., or from about –20° C. to about –23° C., or from about –20° C. to about –24° C., or from about –20° C. to about –25° C., or from about –20° C. to about –26° C., or from about –20° C. to about –27° C., or from about –20° C. to about –28° C., or from about –20° C. to about –29° C., or from about –20° C. to about –30° C., or from about –30° C. to about –31° C., or from about –30° C. to about –32° C., or from about –30° C. to about –33° C., or from about –30° C. to about –34° C., or from about –30° C. to about –35° C., or from about –30° C. to about –36° C., or from about –30° C. to about –37° C., or from about –30° C. to about –38° C., or from about –30° C. to about –39° C., or from about –30° C. to about –40° C., –30° C. to about –50° C., –30° C. to about –60° C., –30° C. to about –70° C., –30° C. to about –80° C., –30° C. to about –90° C., –40° C. to about –50° C., –40° C. to about –60° C., –40° C. to about –70° C., –40° C. to about –80° C., –40° C. to about –90° C., –50° C. to about –60° C., –50° C. to about –70° C., –50° C. to about –80° C., –50° C. to about –90° C., –60° C. to about –70° C., –60° C. to about –80° C., –60° C. to about –90° C., 70° C. to about –80° C., –70° C. to about –90° C., –80° C. to about –90° C., or at least –1, –2, –3, –4, –5, –6, –7, –8, –9, –10, –11, –12, –13, –14, –15, –16, –17, –18, –19, –20, –21, –22, –23, –24, –25, –26, –27, –28, –29, –30, –31, –32, –33, –34, –35, –36, –37, –38, –39, –40, –41, –42, –43, –44, –45, –46, –47, –48, –49, –50, –51, –52, –53, –54, –55, –56, –57, –58, –59, –60, –61, –62, –63, –64, –65, –66, –67, –68, –69, –70, –71, –72, –73, –74, –75, –76, –77, –78, –79, –80, –81, –82, –83, –84, –85, –86, –87, –88, –89, –90° C.

In embodiment, the time sufficient to freeze the a multicellular biological material may be from about 1 minute to about 20 minutes, or from about 2 minutes to about 20 minutes, or from about 2 minutes to about 20 minutes, or from about 3 minutes to about 20 minutes, or from about 4 minutes to about 20 minutes, or from about 5 minutes to about 20 minutes, or from about 6 minutes to about 20 minutes, or from about 7 minutes to about 20 minutes, or from about 8 minutes to about 20 minutes, or from about 9 minutes to about 20 minutes, or from about 10 minutes to about 20 minutes, or from about 11 minutes to about 20 minutes, or from about 12 minutes to about 20 minutes, or from about 13 minutes to about 20 minutes, or from about 14 minutes to about 20 minutes, or from about 15 minutes to about 20 minutes, or from about 16 minutes to about 20 minutes, or from about 17 minutes to about 20 minutes, or from about 18 minutes to about 20 minutes, or from about 19 minutes to about 20 minutes, or from about 10 minutes to about 30 minutes, or from about 10 minutes to about 40 minutes, or from about 10 minutes to about 50 minutes, or from about 10 minutes to about 1 hour, or from about 10 minutes to about 2 hours, or from about 10 minutes to about 3 hours, or from about 10 minutes to about 4 hours, or from about 10 minutes to about 5 hours, or from about 10 minutes to about 5 hours, or from about 10 minutes to about 6 hours, or from about 10 minutes to about 7 hours, or from about 10 minutes to about 8 hours, or from about 10 minutes to about 9 hours, or from about 10 minutes to about 10 hours, or from about 10 minutes to about 11 hours, or from about 10 minutes to about 12 hours, or from about 10 minutes to about 13 hours, or from about 10 minutes to about 14 hours, or from about 10 minutes to about 15 hours, or from about 10 minutes to about 16 hours, or from about 10 minutes to about 17 hours, or from about 10 minutes to about 18 hours, or from about 10 minutes to about 19 hours, or from about 10 minutes to about 20 hours, or from about 10 minutes to about 21 hours, or from about 10 minutes to about 22 hours, or from about 10 minutes to about 23 hours, or from about 10 minutes to about 24 hours, from about 10 minutes to about 48 hours, or at least 1, 2, 3, 4, 5, 6, 7, 8, 9, 10, 20, 30, 40, 50, 60 minutes, or at least 1, 2, 3, 4, 5, 6, 6, 7, 8, 9, 10, 11, 12, 13, 14, 15, 16, 17, 18, 19, 20, 21, 22, 23 or 24 hours.

In embodiments, in step (a-ii), the thawing of the bulk multicellular biological material may be performed to a temperature of the bulk multicellular biological material from about 10° C. to about 85° C., or from about 10° C. to about 80° C., or from about 10° C. to about 70° C., or from about 10° C. to about 60° C., or from about 10° C. to about 50° C., or from about 10° C. to about 40° C., or from about 10° C. to about 30° C., or from about 10° C. to about 25° C., or from about 10° C. to about 20° C., or from about 20° C. to about 85° C., or from about 20° C. to about 80° C., or from about 20° C. to about 70° C., or from about 20° C. to about 60° C., or from about 20° C. to about 50° C., or from about 20° C. to about 40° C., or from about 20° C. to about 30° C., or from about 20° C. to about 25° C., or from about 25° C. to about 85° C., or from about 25° C. to about 80° C., or from about 25° C. to about 70° C., or from about 25° C. to about 60° C., or from about 25° C. to about 50° C., or from about 25° C. to about 40° C., or from about 25° C. to about 30° C., or from about 30° C. to about 85° C., or from about 30° C. to about 80° C., or from about 30° C. to about 70° C., or from about 30° C. to about 60° C., or from about 30° C. to about 50° C., or from about 30° C. to about 40° C., or from about 40° C. to about 85° C., or from about 40° C. to about 80° C., or from about 40° C. to about 70° C., or from about 40° C. to about 60° C., or from about 40° C. to about 50° C. or from about 50° C. to about 85° C., or from about 50° C. to about 80° C., or from about 50° C. to about 70° C., or from about 50° C. to about 60° C., or from about 60° C. to about 85° C., or from about 60° C. to about 80° C., or from about 60° C. to about 70° C., or from about 70° C. to about 85° C., or from about 70° C. to about 80° C., or from about 80° C. to about 85° C., or at least 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85° C. for a time sufficient to thaw the bulk multicellular biological material.

In embodiments, in step (a-ii), the thawing may be performed to a temperature of the the bulk multicellular biological material from about 65° C. to about 85° C.

In embodiments, the time sufficient to thaw the multicellular biological material is from about 5 minutes to about 10 minutes, or from about 5 minutes to about 20 minutes, or from about 5 minutes to about 30 minutes, or from about 5 minutes to about 45 minutes, or from about 5 minutes to 1 hour, or from about 5 minutes to 2 hours, or from about 5 minutes to 3 hours, or from about 5 minutes to 4 hours, or from about 10 minutes to about 20 minutes, or from about 10 minutes to about 30 minutes, or from about 10 minutes to about 45 minutes, or from about 10 minutes to 1 hour, or from about 10 minutes to 2 hours, or from about 10 minutes to 3 hours, or from about 10 minutes to 4 hours, or from about 20 minutes to about 30 minutes, or from about 20 minutes to about 45 minutes, or from about 20 minutes to 1 hour, or from about 20 minutes to 2 hours, or from about 20 minutes to 3 hours, or from about 20 minutes to 4 hours, or from about 30 minutes to about 45 minutes, or from about 30 minutes to 1 hour, or from about 30 minutes to 10 hours, or from about 30 minutes to 3 hours, or from about 30 minutes to 4 hours, or from about 45 minutes to 1 hour, or from about 45 minutes to 2 hours, or from about 45 minutes to 3 hours, or from about 45 minutes to 4 hours, or from about 1 hour to 2 hours, or from about 1 hour to 3 hours, or from about 1 hour to 4 hours, or from about 2 hours to 3 hours, or from about 2 hours to 4 hours, or from about 2 hours to 4 hours, or at least 5, 10, 20, 30, 45 minutes, or at least 1, 2, 3, or 4 hours.

In embodiments, during the process of the present invention, the mild homogenization comprises from about 2 to about 20, or from about 3 to about 20, or from about 4 to about 20, or from about 5 to about 20, or from about 6 to about 20, or from about 7 to about 20, or from about 8 to about 20, or from about 9 to about 20, or from about 10 to about 20, or from about 11 to about 20, or from about 12 to about 20, or from about 13 to about 20, or from about 14 to about 20, or from about 15 to about 20, or from about 16 to about 20, or from about 17 to about 20, or from about 18 to about 20, or from about 19 to about 20, or about 2 to about 19, or from about 3 to about 19, or from about 4 to about 19, or from about 5 to about 19, or from about 6 to about 19, or from about 7 to about 19, or from about 8 to about 19, or from about 9 to about 19, or from about 10 to about 19, or from about 11 to about 19, or from about 12 to about 19, or from about 13 to about 19, or from about 14 to about 19, or from about 15 to about 19, or from about 16 to about 19, or from about 17 to about 19, or from about 18 to about 19, or about 2 to about 18, or from about 3 to about 18, or from about 4 to about 18, or from about 5 to about 18, or from about 6 to about 18, or from about 7 to about 18, or from about 8 to about 18, or from about 9 to about 18, or from about 10 to about 18, or from about 11 to about 18, or from about 12 to about 18, or from about 13 to about 18, or from about 14 to about 18, or from about 15 to about 18, or from about 16 to about 18, or from about 17 to about 18, or about 2 to about 17, or from about 3 to about 17, or from about 4 to about 17, or from about 5 to about 17, or from about 6 to about 17, or from about 7 to about 17, or from about 8 to about 17, or from about 9 to about 17, or from about 10 to about 17, or from about 11 to about 17, or from about 12 to about 17, or from about 13 to about 17, or from about 14 to about 17, or from about 15 to about 17, or from about 16 to about 17, or about 2 to about 16, or from about 3 to about 16, or from about 4 to about 16, or from about 5 to about 16, or from about 6 to about 16, or from about 7 to about 16, or from about 8 to about 16, or from about 9 to about 16, or from about 10 to about 16, or from about 11 to about 16, or from about 12 to about 16, or from about 13 to about 16, or from about 14 to about 16, or from about 15 to about 16, or about 2 to about 15, or from about 3 to about 15, or from about 4 to about 15, or from about 5 to about 15, or from about 6 to about 15, or from about 7 to about 15, or from about 8 to about 15, or from about 9 to about 15, or from about 10 to about 15, or from about 11 to about 15, or from about 12 to about 15, or from about 13 to about 15, or from about 14 to about 15, or about 2 to about 14, or from about 3 to about 14, or from about 4 to about 14, or from about 5 to about 14, or from about 6 to about 14, or from about 7 to about 14, or from about 8 to about 14, or from about 9 to about 14, or from about 10 to about 14, or from about 11 to about 14, or from about 12 to about 14, or from about 13 to about 14, or about 2 to about 13, or from about 3 to about 13, or from about 4 to about 13, or from about 5 to about 13, or from about 6 to about 13, or from about 7 to about 13, or from about 8 to about 13, or from about 9 to about 13, or from about 10 to about 13, or from about 11 to about 13, or from about 12 to about 13, or about 2 to about 12, or from about 3 to about 12, or from about 4 to about 12, or from about 5 to about 12, or from about 6 to about 12, or from about 7 to about 12, or from about 8 to about 12, or from about 9 to about 12, or from about 10 to about 12, or from about 11 to about 12, or about 2 to about 11, or from about 3 to about 11, or from about 4 to about 11, or from about 5 to about 11, or from about 6 to about 11, or from about 7 to about 11, or from about 8 to about 11, or from about 9 to about 11, or from about 10 to about 11, or about 2 to about 10, or from about 3 to about 10, or from about 4 to about 10, or from about 5 to about 10, or from about 6 to about 10, or from about 7 to about 10, or from about 8 to about 10, or from about 9 to about 10, or about 2 to about 9, or from about 3 to about 9, or from about 4 to about 9, or from about 5 to about 9, or from about 6 to about 9, or from about 7 to about 9, or from about 8 to about 9, or about 2 to about 8, or from about 3 to about 8, or from about 4 to about 8, or from about 5 to about 8, or from about 6 to about 8, or from about 7 to about 8, or about 2 to about 7, or from about 3 to about 7, or from about 4 to about 7, or from about 5 to about 7, or from about 6 to about 7, or about 2 to about 6, or from about 3 to about 6, or from about 4 to about 6, or from about 5 to about 6, or about 2 to about 5, or from about 3 to about 5, or from about 4 to about 5, or about 2 to about 4, or from about 3 to about 4, or about 2 to about 3, or 1, 2, 3, 4, 5, 6, 7, 8, 9, 10, 11, 12, 13, 14, 15, 16, 17, 18, 19, or 20 cycles of (a-i) and (a-ii).

In some embodiment, the freezing and thawing periods may be a plurality of time sufficient to either freeze or thaw, according to cyclic variabilities. For example, in one embodiment, freezing may be for 30 minutes followed by 5 minutes of thawing and repeated for 3 cycles. In another example of this embodiment, freezing may be for 3 hours followed by 30 minutes of thawing and repeated for 5 cycles.

Drying

In embodiments, the process of the present invention comprises step (b) of drying of the mildly homogenized bulk multicellular biological material at a temperature of from about 30° C. to 300° C. This step is performed for a time sufficient to obtain a dried mildly homogenized bulk multicellular biological material comprising a water content of less than or equal to 4% ($\leq 4\%$), or from about 0.1% to about 4%, or from about 0.1% to about 3%, or from about 0.1% to about 2%, or from about 0.1% to about 1%, or from about 0.1% to about 0.5%, or from about 0.5% to about 4%, or from about 0.5% to about 3%, or from about 0.5% to about 2%, or from about 0.5% to about 1%, or from about 1% to about 4%, or from about 1% to about 3%, or from about 1% to about 2%, or from about 2% to about 4%, or from about 2% to about 3%, or from about 3% to about 4%, or at least about 4, 3, 2, 1, 0.5, or 0.1% of the dry weight of the bulk multicellular biological material.

The drying temperature may be from about 30° C. to about 300° C., or from about 40° C. to about 300° C., or from about 50° C. to about 300° C., or from about 60° C. to about 300° C., or from about 70° C. to about 300° C. or from about 80° C. to about 300° C., or from about 90° C. to about 300° C., or from about 100° C. to about 300° C., or from about 150° C. to about 300° C., or from about 200° C. to about 300° C., or from about 250° C. to about 300° C., or 30° C. to about 250° C., or from about 40° C. to about 250° C., or from about 50° C. to about 250° C., or from about 60° C. to about 250° C., or from about 70° C. to about 250° C., or from about 80° C. to about 250° C., or from about 90° C. to about 250° C., or from about 100° C. to about 250° C., or from about 150° C. to about 250° C., or from about 200° C. to about 250° C., or 30° C. to about 200° C., or from about 40° C. to about 200° C., or from about 50° C. to about 200° C., or from about 60° C. to about 200° C. or from about 70° C. to about 200° C., or from about 80° C. to about 200° C., or from about 90° C. to about 200° C., or from about 100° C. to about 200° C., or from about 150° C. to about 200° C., or 30° C. to about 150° C., or from about 40° C. to about 150° C., or from about 50° C. to about 150° C., or from about 60° C. to about 150° C., or from about 70° C. to about 150° C., or from about 80° C. to about 150° C., or from about 90° C. to about 150° C., or from about 100° C. to about 150° C., or 30° C. to about 100° C., or from about 40° C. to about 100° C., or from about 50° C. to about 100° C., or from about 60° C. to about 100° C., or from about 70° C. to about 100° C., or from about 80° C. to about 100° C., or from about 90° C. to about 100° C., or 30° C. to about 90° C., or from about 40° C. to about 90° C., or from about 50° C. to about 90° C., or from about 60° C. to about 90° C., or from about 70° C. to about 90° C., or from about 80° C. to about 90° C., or 30° C. to about 80° C., or from about 40° C. to about 80° C., or from about 50° C. to about 80° C., or from about 60° C. to about 80° C., or from about 70° C. to about 80° C., or 30° C. to about 70° C., or from about 40° C. to about 70° C., or from about 50° C. to about 70° C., or from about 60° C. to about 70° C., or 30° C. to about 60° C., or from about 40° C. to about 60° C., or from about 50° C. to about 60° C., 30° C. to about 50° C., or from about 40° C. to about 50° C., or 30° C. to about 40° C., or at least about 30, 40, 50, 60, 70, 80, 90, 100, 110, 120, 130, 140, 150, 160, 170, 180, 190, 200, 210, 220, 230, 240, 250, 260, 270, 280, 290, or 300° C.

In some embodiment, the drying process involves a multiplicity of temperatures, either provided as constant, variable or gradient. For example, in one embodiment, the drying is at constant 130° C. for 15 minutes. In another example the drying starts at 85° C. for 20 minutes followed by 110° C. for 10 minutes. In another example, the drying may start at 55° C. and end at 110° C. with a rate temperature increase of 1° C. per minute.

In other aspects of the invention, the drying process may be in a container in presence of continuous circular air flow or a directional air flow. In some embodiment, the drying process may be performed in a container in presence of flow of ether gases for example $N_2$, $CO_2$, argon, helium and air as continuous circular or directional flow.

In embodiments, the time sufficient to obtain a dried mildly homogenized bulk multicellular biological material may be from about 5 minutes to about 10 minutes, or from about 5 minutes to about 15 minutes, or from about 5 minutes to about 20 minutes, or from about 5 minutes to about 25 minutes, or from about 5 minutes to about 30 minutes, or 5 minutes to about 1 hour, or from about 10 minutes to about 15 minutes, or from about 10 minutes to about 20 minutes, or from about 10 minutes to about 25 minutes, or from about 10 minutes to about 30 minutes, or 10 minutes to about 1 hour, or from about 15 minutes to about 20 minutes, or from about 15 minutes to about 25 minutes, or from about 15 minutes to about 30 minutes, or 15 minutes to about 1 hour, or from about 20 minutes to about 25 minutes, or from about 20 minutes to about 30 minutes, or 20 minutes to about 1 hour, or from about 25 minutes to about 30 minutes, or 25 minutes to about 1 hour, or 30 minutes to about 1 hour, or at least about 5, 10, 15, 20, 25, 30 minutes, or at least about 1 hour.

Resuspension in Solvent(s)

In embodiments, the process of the present invention comprises step (c) of contacting the dried mildly homogenized bulk multicellular biological material with a first solvent, to obtain a solvent contacted dried mildly homogenized bulk multicellular biological material. As used herein, the term "contacting" refer to the action of physically touching the dried mildly homogenized bulk multicellular biological material. For example, with respect to the present invention, the biological material is contacted with the first solvent, which may include resuspending, submerging in whole or in part the biological material in the first solvent. Examples of first solvent include but are not limited to food additive solvents like water, acetic acid, hexene, ethanol, isopropanol, citric acid, ethyl acetate, glycerol, glycerol acetates, propylene glycol, acetone, benzyl alcohol, 1,3-butylene glycol, 1,3-butylene glycol, glyceryl triacetate, glyceryl tributyrate, hexane, methyl ethyl ketone, methylene chloride, monoglycerides and diglycerides, monoglyceride citrate, triethyl citrate and combinations thereof. According to another embodiment, the first solvent may be a mixture of multiple solvents. According to yet another embodiment, the mixture of multiple solvents may comprise each of these multiple solvents according to multiple volumetric percentage of total first solvent used. Volumetric percentages include those such as from about 1% to about 10%, or from about 1% to about 20%, or from about 1% to about 30%, or from about 1% to about 40%, or from about 1% to about 50%, or from about 1% to about 60%, or from about 1% to about 70%, or from about 1% to about 80%, or from about 1% to about 90%, or from about 1% to about 99%, or from about 10% to about 20%, or from about 10% to about 30%, or from about 10% to about 40%, or from about 10% to about 50%, or from about 10% to about 60%, or from about 10% to about 70%, or from about 10% to about 80%, or from about 10% to about 90%, or from about 10% to about 99%, or from about 20% to about 30%, or from about 20% to about 40%, or from about 20% to about 50%, or from about 20% to about 60%, or from about 20% to about 70%, or from about 20% to about 80%, or from about 20% to about 90%, or from about 20% to about 99%, or from about 30% to about 40%, or from about 30% to about 50%, or from about 30% to about 60%, or from about 30% to about 70%, or from about 30% to about 80%, or from about 30% to about 90%, or from about 30% to about 99%, or from about 40% to about 50%, or from about 40% to about 60%, or from about 40% to about 70%, or from about 40% to about 80%, or from about 40% to about 90%, or from about 40% to about 99%, or from about 50% to about 60%, or from about 50% to about 70%, or from about 50% to about 80%, or from about 50% to about 90%, or from about 50% to about 99%, or from about 60% to about 70%, or from about 60% to about 80%, or from about 60% to about 90%, or from about 60% to about 99%, or from about 70% to about 80%, or from about 70% to about 90%, or from about 70% to about 99%, or from about 80% to about 90%, or from about 80% to about 99%, or from about 90% to about 99%, or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%. In embodiments, when the first solvent is used as a mixture of multiple solvents, the solvents may be miscible solvents.

Negative Pressure-Solvent Extraction

In embodiments, the process of the present invention comprises step (d) negative pressure-solvent extraction of the first solvent contacted dried mildly homogenized bulk multicellular biological material. This step comprises at least 2 cycles of (d-i) and (d-ii):
  (d-i) negative pressure treatment of the solvent contacted dried mildly homogenized bulk multicellular biological material; and (d-ii) return to atmospheric pressure of the solvent contacted dried mildly homogenized bulk multicellular biological material.

Step (d) is performed for a time sufficient to permeate the first solvent through, and further homogenize the solvent contacted dried mildly homogenized bulk multicellular biological material.

In embodiments, the negative pressure treatment is at from about −1.38 kPa to about −13.79 kPa (−0.2 psi to about −2 psi), from about −1.38 kPa to about −27.58 kPa (−0.2 psi to about −4 psi), or from about −1.38 kPa to about −68.95 kPa (−0.2 psi to about −10 psi), or from about −1.38 kPa to about −206.84 kPa (−0.2 psi to about −30 psi), or from about −3.45 kPa to about −13.79 kPa (−0.5 psi to about −2 psi), from about −3.45 kPa to about −27.58 kPa (−0.5 psi to about −4 psi), or from about −3.45 kPa to about −68.95 kPa (−0.5 psi to about −10 psi), or from about −3.45 kPa to about −206.84 kPa (−0.5 psi to about −30 psi), or from about −13.79 kPa to about −27.58 kPa (−2 psi to about −4 psi), or from about −13.79 kPa to about −68.95 kPa (−2 psi to about −10 psi), or from about −13.79 kPa to about −206.84 kPa (−2 psi to about −30 psi), or from about −27.58 kPa to about −68.95 kPa (−4 psi to about −10 psi), or from about −27.58 kPa to about −206.84 kPa (−4 psi to about −30 psi), or from about −206.84 kPa (−10 psi to about −30 psi), or at least −1.38, −3.45, −13.79, −27.58, −68.95, or −206.84 kPa.

In embodiments, the negative pressure treatment may be for about 0.5 second to about 5 seconds, or for about 1 second to about 5 seconds, or from about 2 second to about 5 seconds, or from about 3 second to about 5 seconds, or from about 4 second to about 5 seconds, or for about 0.5 second to about 4 seconds, or from about 1 second to about 4 seconds, or from about 2 second to about 4 seconds, or from about 3 second to about 4 seconds, or for about 0.5 second to about 3 seconds, or from about 1 second to about 3 seconds, or from about 2 second to about 3 seconds, or for about 0.5 second to about 2 seconds, or from about 1 second to about 2 seconds, or for about 0.5 second to about 1 second, or at least 0.5, 1, 2, 3, 4, or 5 seconds.

According to some embodiments, the return to atmospheric pressure is for about 0.01 second to about 0.02 second, or for about 0.01 second to about 0.03 second, or for about 0.01 second to about 0.04 second, or for about 0.01 second to about 0.05 second, or for about 0.01 second to about 0.06 seconds, or for about 0.01 second to about 0.07 seconds, or for about 0.01 second to about 0.08 second, or for about 0.01 second to about 0.09 second, or for about 0.01 second to about 0.1 second, or for about 0.01 second to about 0.11 second, or for about 0.01 second to about 0.12 second, or for about 0.01 second to about 0.13 second, or for about 0.01 second to about 0.14 second, or for about 0.01 second to about 0.15 second, or for about 0.01 second to about 0.16 second, or for about 0.01 second to about 0.17 second, or for about 0.01 second to about 0.18 second, or for about 0.01 second to about 0.19 second.

In embodiments, the time sufficient to permeate the first solvent through is from about 3 to about 200, or from about 4 to about 200, or from about 5 to about 200, or from about 6 to about 200, or from about 7 to about 200, or from about 8 to about 200, or from about 9 to about 200, or from about 10 to about 200, or from about 20 to about 200, or from about 30 to about 200, or from about 40 to about 200, or from about 50 to about 200, or from about 60 to about 200, or from about 70 to about 200, or from about 80 to about 200, or from about 90 to about 200, or from about 100 to about 200, or from about 125 to about 200, or from about 150 to about 200, or from about 175 to about 200, or 3 to about 175, or from about 4 to about 175, or from about 5 to about 175, or from about 6 to about 175, or from about 7 to about 175, or from about 8 to about 175, or from about 9 to about 175, or from about 10 to about 175, or from about 20 to about 175, or from about 30 to about 175, or from about 40 to about 175, or from about 50 to about 175, or from about 60 to about 175, or from about 70 to about 175, or from about 80 to about 175, or from about 90 to about 175, or from about 100 to about 175, or from about 125 to about 175, or from about 150 to about 175, or 3 to about 150, or from about 4 to about 150, or from about 5 to about 150, or from about 6 to about 150, or from about 7 to about 150, or from about 8 to about 150, or from about 9 to about 150, or from about 10 to about 150, or from about 20 to about 150, or from about 30 to about 150, or from about 40 to about 150, or from about 50 to about 150, or from about 60 to about 150, or from about 70 to about 150, or from about 80 to about 150, or from about 90 to about 150, or from about 100 to about 150, or from about 125 to about 150, or 3 to about 125, or from about 4 to about 125, or from about 5 to about 125, or from about 6 to about 125, or from about 7 to about 125, or from about 8 to about 125, or from about 9 to about 125, or from about 10 to about 125, or from about 20 to about 125, or from about 30 to about 125, or from about 40 to about 125, or from about 50 to about 125, or from about 60 to about 125, or from about 70 to about 125, or from about 80 to about 125, or from about 90 to about 125, or from about 100 to about 125, or 3 to about 100, or from about 4 to about 100, or from about 5 to about 100, or from about 6 to about 100, or from about 7 to about 100, or from about 8 to about 100, or from about 9 to about 100, or from about 10 to about 100, or from about 20 to about 100, or from about 30 to about 100, or from about 40 to about 100, or from about 50 to about 100, or from about 60 to about 100, or from about 70 to about 100, or from about 80 to about 100, or from about 90 to about 100, or 3 to about 90, or from about 4 to about 90, or from about 5 to about 90, or from about 6 to about 90, or from about 7 to about 90, or from about 8 to about 90, or from about 9 to about 90, or from about 10 to about 90, or from about 20 to about 90, or from about 30 to about 90, or from about 40 to about 90, or from about 50 to about 90, or from about 60 to about 90, or from about 70 to about 90, or from about 80 to about 90, or 3 to about 80, or from about 4 to about 80, or from about 5 to about 80, or from about 6 to about 80, or from about 7 to about 80, or from about 8 to about 80, or from about 9 to about 80, or from about 10 to about 80, or from about 20 to about 80, or from about 30 to about 80, or from about 40 to about 80, or from about 50 to about 80, or from about 60 to about 80, or from about 70 to about 80, or 3 to about 70, or from about 4 to about 70, or from about 5 to about 70, or from about 6 to about 70, or from about 7 to about 70, or from about 8 to about 70, or from about 9 to about 70, or from about 10 to about 70, or from about 20 to about 70, or from about 30 to about 70, or from about 40 to about 70, or from about 50 to about 70, or from about 60 to about 70, or 3 to about 60, or from about 4 to about 60, or from about 5 to about 60, or from about 6 to about 60, or from about 7 to about 60, or from about 8 to about 60, or from about 9 to about 60, or from about 10 to about 60, or from about 20 to about 60, or from about 30 to about 60, or from about 40 to about 60, or from about 50 to about 60, or 3 to about 50, or from about 4 to about 50, or from about 5 to about 50, or from about 6 to about 50, or from about 7 to about 50, or from about 8 to about 50, or from about 9 to about 50, or from about 10 to about 50, or from about 20 to about 50, or from about 30 to about 50, or from about 40 to about 50, or 3 to about 40, or from about 4 to about 40, or from about 5 to about 40, or from about 6 to about 40, or from about 7 to about 40, or from about 8 to about 40, or from about 9 to about 40, or from about 10 to about 40, or from about 20 to about 40, or from about 30 to about 40, or 3 to about 30, or from about 4 to about 30, or from about 5 to about 30, or from about 6 to about 30, or from about 7 to about 30, or from about 8 to about 30, or from about 9 to about 30, or from about 10 to about 30, or from about 20 to about 30, or 3 to about 20, or from about 4 to about 20, or from about 5 to about 20, or from about 6 to about 20, or from about 7 to about 20, or from about 8 to about 20, or from about 9 to about 20, or from about 10 to about 20, or 3 to about 10, or from about 4 to about 10, or from about 5 to about 10, or from about 6 to about 10, or from about 7 to about 10, or from about 8 to about 10, or from about 9 to about 10, or 3 to about 9, or from about 4 to about 9, or from about 5 to about 9, or from about 6 to about 9, or from about 7 to about 9, or from about 8 to about 9, or 3 to about 8, or from about 4 to about 8, or from about 5 to about 8, or from about 6 to about 8, or from about 7 to about 8, or 3 to about 7, or from about 4 to about 7, or from about 5 to about 7, or from about 6 to about 7, or 3 to about 6, or from about 4 to about 6, or from about 5 to about 6, or 3 to about 5, or from about 4 to about 5, or 3 to about 4, or at least 3, 4, 5, 6, 7, 8, 9, 10, 20, 30, 40, 50, 60, 70, 80, 90, 100, 125, 150, 175, or 200 cycles of (d-i) and (d-ii).

According to another embodiment, the step (d) may be performed at temperatures ranging from about $-20°$ C. to about $70°$ C., or from about $-10°$ C. to about $70°$ C., or from about $-5°$ C. to about $70°$ C., or from about $-4°$ C. to about $70°$ C., or from about $-3°$ C. to about $70°$ C., or from about $-2°$ C. to about $70°$ C., or from about $-1°$ C. to about $70°$ C., or from about $0°$ C. to about $70°$ C., or from about $1°$ C. to about $70°$ C., or from about $2°$ C. to about $70°$ C., or from about $3°$ C. to about $70°$ C., or from about $4°$ C. to about $70°$ C., or from about $5°$ C. to about $70°$ C., or from about $10°$ C. to about $70°$ C., or from about $20°$ C. to about $70°$ C., or from about $30°$ C. to about $70°$ C., or from about $40°$ C. to about $70°$ C. or from about $50°$ C. to about $70°$ C., or from about $60°$ C. to about $70°$ C., or from about $-20°$ C. to about $60°$ C., or from about $-10°$ C. to about $60°$ C., or from about $-5°$ C. to about $60°$ C., or from about $-4°$ C. to about $60°$ C., or from about $-3°$ C. to about $60°$ C., or from about $-2°$ C. to about $60°$ C., or from about $-1°$ C. to about $60°$ C., or from about $0°$ C. to about $60°$ C., or from about $1°$ C. to about $60°$ C., or from about $2°$ C. to about $60°$ C., or from about $3°$ C. to about $60°$ C., or from about $4°$ C. to about $60°$ C., or from about $5°$ C. to about $60°$ C., or from about $10°$ C. to about $60°$ C., or from about $20°$ C. to about $60°$ C., or from about $30°$ C. to about $60°$ C., or from about $40°$ C. to about $60°$ C., or from about $50°$ C. to about $60°$ C., or from about $-20°$ C. to about $50°$ C., or from about $-10°$ C. to about $50°$ C., or from about $-5°$ C. to about $50°$ C., or from about $-4°$ C. to about $50°$ C., or from about $-3°$ C. to about $50°$ C., or from about $-2°$ C. to about $50°$ C., or from about $-1°$ C. to about $50°$ C., or from about $0°$ C. to about $50°$ C., or from about $1°$ C. to about $50°$ C., or from about $2°$ C. to about $50°$ C., or from about $3°$ C. to about $50°$ C., or from about $4°$ C. to about $50°$ C., or from about $5°$ C. to about $50°$ C., or from about $10°$ C. to about $50°$ C., or from about $20°$ C. to about $50°$ C., or from about $30°$ C. to about $50°$ C., or from about $40°$ C. to about $50°$ C., or from about $-20°$ C. to about $40°$ C., or from about $-10°$ C. to about $40°$ C., or from about $-5°$ C. to about $40°$ C., or from about $-4°$ C. to about $40°$ C., or from about $-3°$ C. to about $40°$ C., or from about $-2°$ C. to about $40°$ C., or from about $-1°$ C. to about $40°$ C., or from about 0° C. to about 40° C., or from about 1° C. to about 40° C., or from about 2° C. to about 40° C., or from about 3° C. to about 40° C., or from about 4° C. to about 40° C., or from about 5° C. to about 40° C., or from about 10° C. to about 40° C., or from about 20° C. to about 40° C., or from about 30° C. to about 40° C., or from about −20° C. to about 40° C., or from about −10° C. to about 40° C., or from about −5° C. to about 40° C., or from about −4° C. to about 40° C., or from about −3° C. to about 40° C., or from about −2° C. to about 40° C., or from about −1° C. to about 40° C., or from about 0° C. to about 40° C., or from about 1° C. to about 40° C., or from about 2° C. to about 40° C., or from about 3° C. to about 40° C., or from about 4° C. to about 40° C., or from about 5° C. to about 40° C., or from about 10° C. to about 40° C., or from about 20° C. to about 40° C., or from about −20° C. to about 30° C., or from about −10° C. to about 30° C., or from about −5° C. to about 30° C., or from about −4° C. to about 30° C., or from about −3° C. to about 30° C., or from about −2° C. to about 30° C., or from about −1° C. to about 30° C., or from about 0° C. to about 30° C., or from about 1° C. to about 30° C., or from about 2° C. to about 30° C., or from about 3° C. to about 30° C., or from about 4° C. to about 30° C., or from about 5° C. to about 30° C., or from about 10° C. to about 30° C., or from about −20° C. to about 20° C., or from about −10° C. to about 20° C., or from about −5° C. to about 20° C., or from about −4° C. to about 20° C., or from about −3° C. to about 20° C., or from about −2° C. to about 20° C., or from about −1° C. to about 20° C., or from about 0° C. to about 20° C., or from about 1° C. to about 20° C., or from about 2° C. to about 20° C., or from about 3° C. to about 20° C., or from about 4° C. to about 20° C., or from about 5° C. to about 20° C., or from about −20° C. to about 10° C., or from about −10° C. to about 10° C., or from about −5° C. to about 10° C., or from about −4° C. to about 10° C., or from about −3° C. to about 10° C., or from about −2° C. to about 10° C., or from about −1° C. to about 10° C., or from about 0° C. to about 10° C., or from about 1° C. to about 10° C., or from about 2° C. to about 10° C., or from about 3° C. to about 10° C., or from about 4° C. to about 10° C., or from about −20° C. to about 5° C., or from about −10° C. to about 5° C., or from about −5° C. to about 5° C., or from about −4° C. to about 5° C., or from about −3° C. to about 5° C., or from about −2° C. to about 5° C., or from about −1° C. to about 5° C., or from about 0° C. to about 5° C., or from about 1° C. to about 5° C., or from about 2° C. to about 5° C., or from about 3° C. to about 5° C., or from about −20° C. to about 4° C., or from about −10° C. to about 4° C., or from about −5° C. to about 4° C., or from about −4° C. to about 4° C., or from about −3° C. to about 4° C., or from about −2° C. to about 4° C., or from about −1° C. to about 4° C., or from about 0° C. to about 4° C., or from about 1° C. to about 4° C., or from about 2° C. to about 4° C., or from about −20° C. to about 3° C., or from about −10° C. to about 3° C., or from about −5° C. to about 3° C., or from about −4° C. to about 3° C., or from about −3° C. to about 3° C., or from about −2° C. to about 3° C., or from about −1° C. to about 3° C., or from about 0° C. to about 3° C., or from about 1° C. to about 3° C., or from about −20° C. to about 2° C., or from about −10° C. to about 2° C., or from about −5° C. to about 2° C., or from about −4° C. to about 2° C., or from about −3° C. to about 2° C., or from about −2° C. to about 2° C., or from about −1° C. to about 2° C., or from about 0° C. to about 2° C., or from about −20° C. to about 1° C., or from about −10° C. to about 1° C., or from about −5° C. to about 1° C., or from about −4° C. to about 1° C., or from about −3° C. to about 1° C., or from about −2° C. to about 1° C., or from about −1° C. to about 1° C., or from about −20° C. to about 0° C., or from about −10° C. to about 0° C., or from about −5° C. to about 0° C., or from about −4° C. to about 0° C., or from about −3° C. to about 0° C., or from about −2° C. to about 0° C., or from about −20° C. to about −1° C., or from about −10° C. to about −1° C., or from about −5° C. to about −1° C., or from about −4° C. to about −1° C., or from about −3° C. to about −1° C., or from about −20° C. to about −2° C., or from about −10° C. to about −2° C., or from about −5° C. to about −2° C., or from about −4° C. to about −2° C., or from about −20° C. to about −3° C., or from about −10° C. to about −3° C., or from about −5° C. to about −3° C., or from about −4° C. to about −3° C., or from about −20° C. to about −4° C., or from about −10° C. to about −4° C., or from about −5° C. to about −4° C., or from about −20° C. to about −5° C., or from about −10° C. to about −5° C., or from about −20° C. to about −10° C., or at least about −20, −10, −5, −4, −3, −2, −1, 0, 1, 2, 3, 4, 5, 10, 20, 30, 40, 50, 60, or 70° C.

Separation

In embodiments, the process of the present Invention comprises a step (e) of separating the first solvent contacted dried mildly homogenized bulk multicellular biological material from the first solvent, to recover a solution of supramolecular assemblies and molecular mixes. Separation may be achieved by any means known in the art such as e.g., centrifugation, decantation, aspiration, sieving, pumping, flowing and the combinations thereof.

Filtration

In embodiments, the process of the present invention comprises a step (f) filtration the solution of supramolecular assembles and molecular mixes obtained from step (e), for removal of remaining fragments of the dried mildly homogenized bulk multicellular biological material and provide a cleared solution of supramolecular assemblies and molecular mixes. In embodiments, the filtration is microfiltration, ultrafiltration, or a combination thereof.

In embodiments, the microfiltration is achieved with a filter having pore size in the micrometer (moron) pore sized from about 0.1 μm to about 1 μm, or from about 0.1 μm to about 0.9 μm, or from about 0.1 μm to about 0.8 μm, or from about 0.1 μm to about 0.7 μm, or from about 0.1 μm to about 0.6 μm, or from about 0.1 μm to about 0.5 μm, or about 0.1 μm to about 0.45 μm, or from about 0.1 μm to about 0.4 μm, or from about 0.1 μm to about 0.3 μm, or about 0.1 μm to about 0.22 μm, or about 0.1 μm to about 0.2 μm, 0.2 μm to about 1 μm, or from about 0.2 μm to about 0.9 μm, or from about 0.2 μm to about 0.8 μm, or from about 0.2 μm to about 0.7 μm, or from about 0.2 μm to about 0.6 μm, or from about 0.2 μm to about 0.5 μm, or about 0.2 μm to about 0.45 μm, or from about 0.2 μm to about 0.4 μm, or from about 0.2 μm to about 0.3 μm, or about 0.2 μm to about 0.22 μm, or 0.22 μm to about 1 μm, or from about 0.22 μm to about 0.9 μm, or from about 0.22 μm to about 0.8 μm, or from about 0.22 μm to about 0.7 μm, or from about 0.22 μm to about 0.6 μm, or from about 0.22 μm to about 0.5 μm, or about 0.22 μm to about 0.45 μm, or from about 0.22 μm to about 0.4 μm, or from about 0.22 μm to about 0.3 μm, 0.3 μm to about 1 μm, or from about 0.3 μm to about 0.9 μm, or from about 0.3 μm to about 0.8 μm, or from about 0.3 μm to about 0.7 μm, or from about 0.3 μm to about 0.6 μm, or from about 0.3 μm to about 0.5 μm, or about 0.3 μm to about 0.45 μm, or from about 0.3 μm to about 0.4 μm, or 0.4 μm to about 1 μm, or from about 0.4 μm to about 0.9 μm, or from about 0.4 μm to about 0.8 μm, or from about 0.4 μm to about 0.7 μm, or from about 0.4 μm to about 0.6 μm, or from about 0.4 μm to about 0.5 μm, or about 0.4 μm to about 0.45 μm, or 0.45 μm to about 1 μm, or from about 0.45 μm to about 0.9 μm, or from about 0.45 μm to about 0.8 μm, or from about 0.45 μm to about 0.7 μm, or from about 0.45 μm to about 0.6 μm, or from about 0.45 μm to about 0.5 μm, or 0.5 μm to about 1 μm, or from about 0.5 μm to about 0.9 μm, or from about 0.5 μm to about 0.8 μm, or from about 0.5 μm to about 0.7 μm, or from about 0.5 μm to about 0.6 μm, or 0.6 μm to about 1 μm, or from about 0.6 μm to about 0.9 μm, or from about 0.6 μm to about 0.8 μm, or from about 0.6 μm to about 0.7 μm, 0.7 μm to about 1 μm, or from about 0.7 μm to about 0.9 μm, or from about 0.7 μm to about 0.8 μm, or 0.8 μm to about 1 μm, or from about 0.8 μm to about 0.9 μm, or 0.8 μm to about 1 μm, or at least about 0.1, 0.2, 0.22, 0.3, 0.4, 0.45, 0.5, 0.6, 0.7, 0.8, 0.9, or 1 μm.

In embodiments, the ultrafiltration is the membrane filtration process in which forces like pressure or concentration gradients lead to a separation through a semipermeable membrane. Suspended solids and solutes of high molecular weight are retained in the so-called retentate, while water and low molecular weight solutes pass through the membrane in the permeate (filtrate). This separation process is used in industry and research for purifying and concentrating macromolecular ($10^3$-$10^6$, or $10^4$-$10^6$, $10^5$-$10^5$, $10^3$-$10^5$, or $10^4$-$10^5$, $10^4$-$10^6$, $10^4$-$10^5$ Da) solutions, especially protein solutions. In certain aspects of the invention, the ultrafiltration is achieved with a suitable ceramic filter, a metallic filter, a membrane filter or hollow fiber membrane filter. According to an embodiment, the membrane microfiltration filter may be for example a 0.1 μm membrane filter. According to an embodiment, the membrane filter may be in the configuration of dead-end flow or cross-flow or spiral-wound flow or multi-membrane assembly flow or the combination thereof.

Homogenous Size Submicrometric Particles Formation

In embodiments, the process of the present invention comprises a step (g) of self-aggregation of the supramolecular assemblies and molecular mixes, to obtain aggregated biological submicrometric particles of a size population having a dispersity ≤0.3. By mixing the cleared solution of supramolecular assemblies and molecular mixes of first solvent of step (f) with a second solvent, different than the first solvent.

In embodiments, the second solvent is different than the first solvent. The second solvent may be water, acetic acid, hexene, ethanol, isopropanol, citric acid, ethyl acetate, glycerol, glycerol acetates, propylene glycol, acetone, benzyl alcohol, 1,3-butylene glycol, 1,3-butylene glycol, glyceryl triacetate, glyceryl tributyrate, hexane, methyl ethyl ketone, methylene chloride, monoglycerides and diglycerides, monoglyceride citrate, triethyl citrate and combinations thereof.

In embodiments, the second solvent is used in amounts and/or ratios where it is completely mixable with the first solvent. In embodiments, the second solvent may be a mixture of one or more solvents. In embodiments, the mixture of second solvent, when it is used in any or certain amounts and/or ratios, is completely mixable with the first solvent. For example, ethyl acetate dissolves only 8.7 g in 100 g of water, and more than 8.7 g will not be dissolved and will form like an oil layer. Likewise, more than 8.7 g of ethyl acetate is miscible with 50% w/w ethanol (i.e., 50% w/w ethanol+50% w/w water) because ethanol and ethyl acetate are complexly miscible. See example 8 (FIG. 20). Therefore, amounts of second solvent(s) that are not completely miscible together or completely miscible with the first solvents are not encompassed within embodiments. In embodiments, the mixture of second solvent may be an aqueous mixture of solvent, where one component is water. In embodiments, the second solvent may comprise additives molecules (see below). In embodiments, the second solvent is a solvent that is suitable for formation of the aggregated biological submicrometric particles are formed with size population having a dispersity ≤0.3.

In embodiments, the self-aggregation may be performed by mechanical turbulence, by mixing the solution of the supramolecular assemblies and molecular mixes in the first solvent with a second solvent. For example, mechanical turbulence may be induced by circular flow, directional flow or combinations thereof.

In embodiments, the self-aggregation may be performed by mixing the solution of supramolecular assemblies and molecular mixes in the first solvent with a second solvent with a volumetric ratio of from about 1:3 to about 1:4, or from about 1:3 to about 1:5, or from about 1:3 to about 1:10, or from about 1:3 to about 1:20, or from about 1:3 to about 1:50, or from about 1:3 to about 1:100, or from about 1:4 to about 1:5, or from about 1:4 to about 1:5, or from about 1:4 to about 1:10, or from about 1:4 to about 1:20, or from about 1:4 to about 1:50, or from about 1:4 to about 1:100, or from about 1:5 to about 1:10, or from about 1:5 to about 1:20 or from about 1:5 to about 1:50 or from about 1:5 to about 1:100, or from about 1:10 to about 1:20, or from about 1:10 to about 1:50, or from about 1:10 to about 1:100, or from about 1:20 to about 1:50, or from about 1:20 to about 1:100, and from about 1:50 to about 1:100, or at least 1:3, 1:5, 1:10, 1120, 1:50, or 1:100.

In embodiments, the self-aggregation may be performed to produce a population of nanoparticles having a dispersity ≤0.3 by changing ratio of constituents of the cleared solution with mixing of a second solvent where the second solvent is water with or without additives. For example, where first solvent contain 2% water in its constituents and second solvent is water with or without additives, and the self-aggregation may be performed by mixing the solution of supramolecular assemblies and molecular mixes of first solvent with a second water solvent with a volumetric ratio of from about 1:3 to about 1:4, or from about 1:3 to about 1:5, or from about 1:3 to about 1:10, or from about 1:3 to about 1:20, or from about 1:3 to about 1:50, or from about 1:3 to about 1:100, or from about 1:4 to about 1:5, or from about 1:4 to about 1:5, or from about 1:4 to about 1:10, or from about 1:4 to about 1:20, or from about 1:4 to about 1:50, or from about 1:4 to about 1:100, or from about 1:5 to about 1:10, or from about 1:5 to about 1:20 or from about 1:5 to about 1:50 or from about 1:5 to about 1:100, or from about 1:10 to about 1:20, or from about 1:10 to about 1:50, or from about 1:10 to about 1:100, or from about 1:20 to about 1:50, or from about 1:20 to about 1:100, and from about 1:50 to about 1:100, or at least 1:3, 1:5, 1:10, 1:20, 1:50, or 1:100.

According to an embodiment, the second solvent may be at a pH of from about 3.0 to about 10.5, or from about 3.0 to about 10.0, or from about 3.0 to about 9.0, or from about 3.0 to about 8.0, or from about 3.0 to about 7.0, or from about 3.0 to about 6.0, or from about 3.0 to about 5.0, or from about 3.0 to about 4.0, or from about 4.0 to about 10.5, or from about 4.0 to about 10.0, or from about 4.0 to about 9.0, or from about 4.0 to about 8.0, or from about 4.0 to about 7.0, or from about 4.0 to about 6.0, or from about 4.0 to about 5.0, or from about 5.0 to about 10.5, or from about 5.0 to about 10.0, or from about 5.0 to about 9.0, or from about 5.0 to about 8.0, or from about 5.0 to about 7.0, or from about 5.0 to about 6.0, or from about 6.0 to about 10.5, or from about 6.0 to about 10.0, or from about 6.0 to about 9.0, or from about 6.0 to about 8.0, or from about 6.0 to about 7.0, or from about 7.0 to about 10.5, or from about 7.0 to about 10.0, or from about 7.0 to about 9.0, or from about 7.0 to about 8.0, or from about 8.0 to about 10.5, or from about 8.0 to about 10.0, or from about 8.0 to about 9.0, or from about 9.0 to about 10.5, or from about 9.0 to about 10.0, or from about 10.0 to about 10.5, or at least about 3.0, 4.0, 5.0, 6.0, 7.0, 8.0, 9.0, 10.0, or 10.5.

In embodiments, the second solvent may be buffered with a physiologically compatible salt, a buffering agent and mixture thereof. Exemplary buffering agents include, but are not limited to, citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, etc., and/or combinations thereof.

In embodiments, the second solvent may comprise additive molecules (or additives). These molecules may be natural and synthetic molecules. According to art embodiment, the additive molecule may be added for the purpose of controlling and stabilizing the size of particles produced so that they do not form precipitate, coagulate or flocculate during storage and maintain the desired dispersity ≤0.3. According to an embodiment the additive may be a polymeric molecule, such as for example polysaccharides, proteins and biocompatible polymers like polyethylene glycol (PEG) or their derivatives thereof. For example, and according to an embodiment, the additive may be a polymeric molecule of at least 1 kDa. For example, according to an embodiment the polysaccharides may be cellulose, chitin, starch, glycogen, glycosaminoglycans, chitosan, alginate, fucoidan, carrageenan, amylose, amylopectin, glucans, mannans and chemical derivatives thereof, and combinations thereof. As used herein, chemical derivatives are intended to mean methylation, ethylation, butylation, propylation, sylylation, acylation, acetylation, alkylation, esterification, thiolation, hydroxylation, animation, amidation of the polysaccharides, proteins, and biocompatible polymers. For example, according to an embodiment the proteins may be casein, albumin, globulins, edestin, glycoproteins, lipoproteins and their derivatives, and combinations thereof. In an aspect of the invention, each of the additive molecule added to the second solvent may be present in concentrations from about 0.01% to about 1% w/w of the composition. In an embodiment, the additives from the second solvent may incorporate into the nanoparticles formed during the process of the present invention.

According to yet another embodiment, the mixture of multiple solvents may comprise each of these multiple solvents according to multiple volumetric percentage of total second solvent used, Volumetric percentages include those such as from about 1% to about 10%, or from about 1% to about 20%, or from about 1% to about 30%, or from about 1% to about 40%, or from about 1% to about 50%, or from about 1% to about 60%, or from about 1% to about 70%, or from about 1% to about 80%, or from about 1% to about 90%, or from about 1% to about 99%, or from about 10% to about 20%, or from about 10% to about 30%, or from about 10% to about 40%, or from about 10% to about 50%, or from about 10% to about 60%, or from about 10% to about 70%, or from about 10% to about 80%, or from about 10% to about 90%, or from about 10% to about 99%, or from about 20% to about 30%, or from about 20% to about 40%, or from about 20% to about 50%, or from about 20% to about 60%, or from about 20% to about 70%, or from about 20% to about 80%, or from about 20% to about 90%, or from about 20% to about 99%, or from about 30% to about 40%, or from about 30% to about 50%, or from about 30% to about 60%, or from about 30% to about 70%, or from about 30% to about 80%, or from about 30% to about 90%, or from about 30% to about 99%, or from about 40% to about 50%, or from about 40% to about 60%, or from about 40% to about 70%, or from about 40% to about 80%, or from about 40% to about 90%, or from about 40% to about 99%, or from about 50% to about 60%, or from about 50% to about 70%, or from about 50% to about 80%, or from about 50% to about 90%, or from about 50% to about 99%, or from about 60% to about 70%, or from about 60% to about 80%, or from about 60% to about 90%, or from about 60% to about 99%, or from about 70% to about 80%, or from about 70% to about 90%, or from about 70% to about 99%, or from about 80% to about 90%, or from about 80% to about 99%, or from about 90% to about 99%, or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%. In embodiments, when the second solvent is used as a mixture of multiple solvents, the solvents may be miscible solvents. In some embodiment, when a first solvent and a second solvent are used, the first and second solvents may be completely miscible with one another.

In accordance with another embodiment, the second solvent may contain additive molecules for their incorporation into the composition of the submicrometric particles having a size dispersity ≤0.3, and from about 0.05 to about 0.3. produced. In embodiments, the additive molecules may vary in sizes from 0.01 kilo Dalton to 1.0 mega Dalton.

For example, the additive molecules included in the second solvents may be micronutrients, natural dyes, synthetic dye, for the purpose of incorporating into the composition of the particles produced. In accordance with other embodiments, additive molecules included in the second solvent may contain natural and synthetic molecules for the purpose of stabilizing the particles produced so that they do not form aggregates during storage.

In other aspects of the invention, additive molecules of the solvents may contain natural and synthetic molecules for the purpose of stabilizing the particles produced.

In another embodiment, the produced submicrometric particles are collected using various methods of ultrafiltration, centrifugation, precipitations, evaporation, buffer-exchange and other methods known in art. For example, according to an embodiment the ultrafiltration or microfiltration is achieved with a ceramic filter, a metallic filter, a membrane filter or hollow fiber membrane which may be in the configuration of dead-end flow or cross-flow or tangential flow filtration, spiral-wound flow or multi-membrane assembly flow or a combination thereof. For example, according to an embodiment the precipitation is achieved by centrifugal force more than or equal to 7500 g, for 1 minute at a temperature of 25° C. For example, according to an embodiment the evaporation may be achieved by hot air drying, room temperature drying, freeze drying, vacuum freeze drying, vacuum microwave drying, and combinations thereof. For example, according to another embodiment the buffer-exchange may be achieved by diafiltration, dialysis, reverse osmosis, gel filtration and combination thereof.

The embodiments of the invention are detailed in this section. Specific terminologies are used for clarity and description of the invention but not intend to limit the specifics of the selected terminologies. Without parting from the scope of the invention a skilled person in the relevant field of art will recognize other synonymous terminology can be employed and other configurations, process or components developed can be used. The embodiments of the present disclosure presented here are not intended to limit the broad aspects of the invention but considered as exemplifications of the principles of the invention. All references, including publications, patent applications, and patents cited herein are hereby incorporated by reference to the same extent as if each had been incorporated individually.

According to another embodiment, there is disclosed a composition comprising the biological submicrometric particles of the present invention and a suitable carrier. According to an embodiment, the suitable carrier may be a pharmaceutically acceptable carrier.

In other aspects of the invention, the submicrometric particles produced for the purpose of manufacturing of natural nanoparticles to enhance superior and very precise dosing capabilities of a specific ingredient as composite of the the nanocarrier for multiple applications.

EXAMPLE 1

Example Process 1

Figure 1:
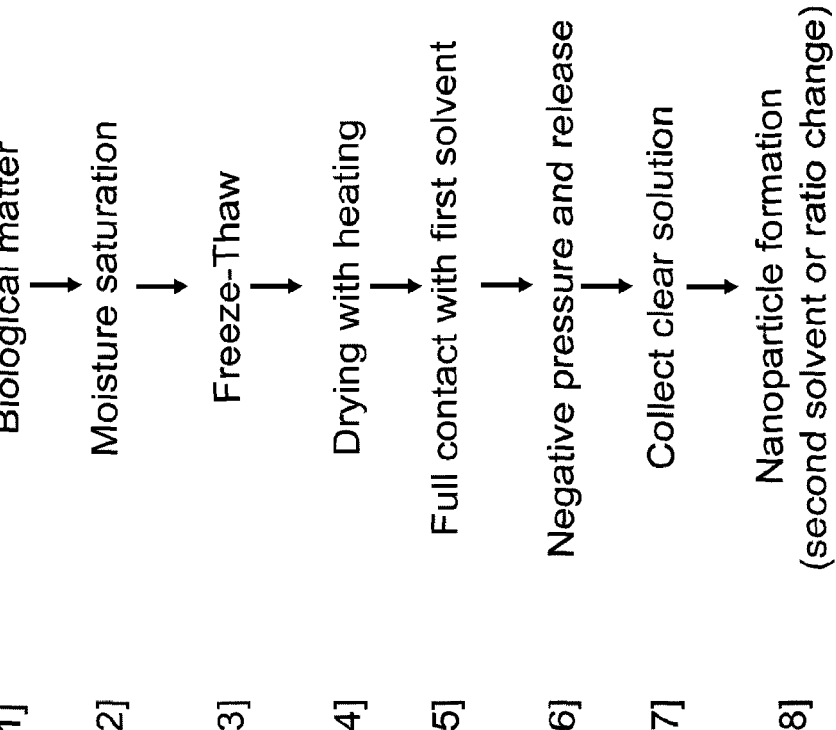
FIG. 1 illustrates a schematic drawing of the process and composition of the invention as flow chart

Now referring to FIG. 1 which is a general representation of the process of the present invention, in which:

[1] represents the biomass or bulk biological material used as the starting material.

[2] represents a step where the water content of the bulk biological material is adjusted to 70 to 100%) (w/w).

[3] represents the freeze-thaw process.

[4] represents the heat drying step of the process, where (i) water content is withdrawn or evaporated, (ii) possibly heat simultaneously stabilize the bulk biological material structure.

[5] is the step of contacting the bulk biological material with a first solvent, which means submerging the above bulk biological material in a first solvent in a vessel, where all portions, parts and fragments of the bulk biological material are contacted with the first solvent. The container may be made of hard matter and be equipped with connection to vacuum suction generator suitable to be used in the next step detailed below. An air layer of various proportion may be maintained between the submerged biomass in the first solvent and the connection to vacuum suction generator.

[6] is the step of applying two or more cycles of negative pressure followed by a quick release to normal atmospheric pressure.

[7] is a step of collection of the molecular mixes and supramolecular assemblies from the biomass that are suspended and/or dissolved in the first solvent. The bulk biological material remaining is separated from this collected solution.

[8] is a step of induction the submicrometric nanoparticle formation from the collected molecular mixtures and supramolecular assemblies originated from the bulk biological material.

EXAMPLE 2

Example Process 2

Figure 2A:
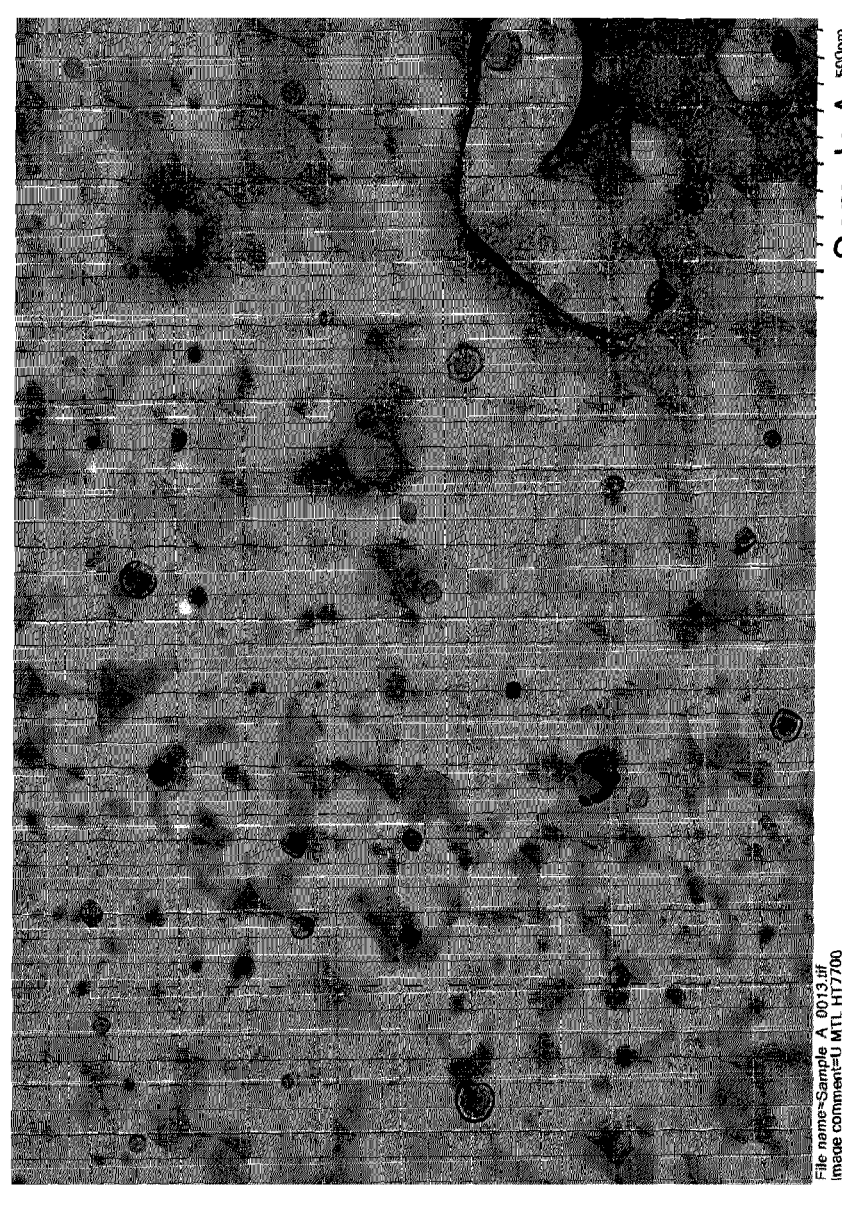
FIG. 2A shows an electron microscopy photograph of molecular mixes and supramolecular assemblies extracted from Holy basil from the process of the present invention, in a first solvent before the nanoparticle formation/aggregation step of the process.

Now referring to FIGS. 2A and B which are electron microscopy (obtained using a Hitachi HT7700 apparatus) photographs of molecular mixes and supramolecular assemblies obtained in the first solvent (Step 7, FIG. 1) are shown.

Sample A: in this example and according to one embodiment, 7.8 grams of dried plant biomass (leaves of Holy basil or Tulsi or *Ocimum tenuiflorum*, purchased from a Canadian organic supplier) are contacted with distilled water in a closed container to saturate (Step 2, FIG. 1), followed by freezing at −18° C. for approximately for 1.0 hour and thawed subsequently for 30 minutes at 20° C. (Step 3, FIG. 1). The same freeze-thaw cycles are repeated for two consecutive times followed by hot air drying (Step 4, FIG. 1) in an oven at 65° C. for 15 minutes. The biomass is transferred to a polypropylene 60-ml-syringe barrel and 12 ml of first solvent (in this example 95% w/w ethanol, 5% w/w water) is added to submerge the whole biomass (Step 5, FIG. 1). The Luer-lock stopper and two-way Luer-lock connectors are used to create negative pressure inside the syringe barrel by pulling the plunger, holding for approximately 2 seconds and quickly releasing the negative pressure (Step 6, FIG. 1). The latter negative pressure-release cycle is repeated for 3 to 100 times. The total time of contact with the first solvent for the whole negative pressure-release cycles is less than 10 minutes. The negative pressure is approximately −3.0 psi inside the syringe barrel. The liquid (approximately 8 ml) is gently collected and is filtered through 0.45 μm syringe filter followed by further filtering with 0.1 μm syringe filter (Step 7, FIG. 1). A 3 μl sample of latter clear solution is placed on Formvar Carbon Film 400 mesh Copper (Electron Microscopy Sciences) for electron microscopy and molecular mixes and supramolecular assemblies is observed.

Sample B: the same amount of biomass and same volume of the first solvent is used as for the example of sample A but without the steps of water saturation, freeze-thawing and negative pressure-release where steps 2 to 4 and step 6 (of FIG. 1) of the process are withdrawn but steps 1, 5 and 7 are performed as a control experiment. In this example the samples are incubated for the same time for full contact as for the example of sample A (step 5 of FIG. 1) (less than 10 minutes) and the same first solvent (approximately 8 ml) is gently collected. The liquid is filtered through a 0.45 μm syringe filter followed by further filtering with a 0.1 μm syringe filter (Step 7, FIG. 1). A 3 μl sample of latter clear solution is placed on Formvar Carbon Film 400 mesh Copper (Electron Microscopy Sciences) for electron microscopy and less molecular mixes and supramolecular assemblies is observed in comparison to Sample A.

In conclusion, the process where the steps of water saturation, freeze-thawing, drying and negative pressure-release (steps 2 to 4 and step 6 of FIG. 1) is applied unexpectedly generates significantly more molecular mixes and supramolecular assemblies than the process without.

Figure 2B:
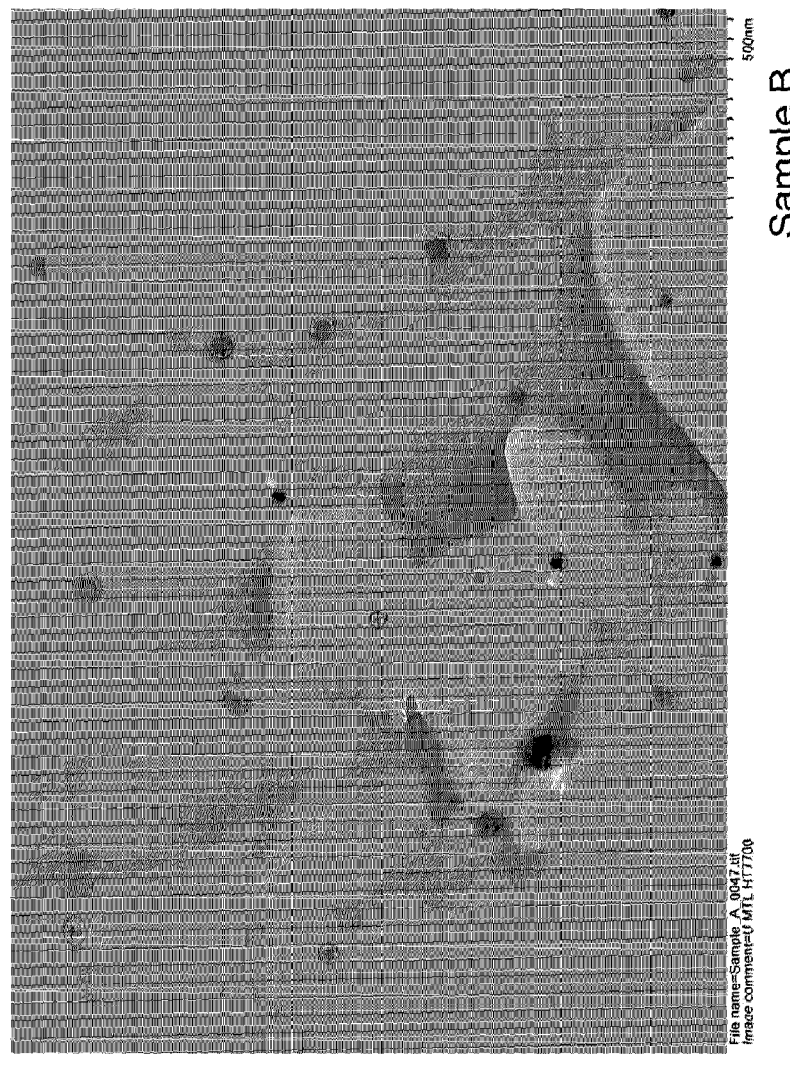
FIG. 2B shows an electron microscopy photograph of molecular mixes and supramolecular assemblies extracted from Holy basil without the steps of water saturation, freeze-thawing and negative pressure-release (steps 2 to 6 of FIG. 1) of the process of the present invention, in a first solvent before the nanoparticle formation/aggregation step of the process.
Figure 3A:
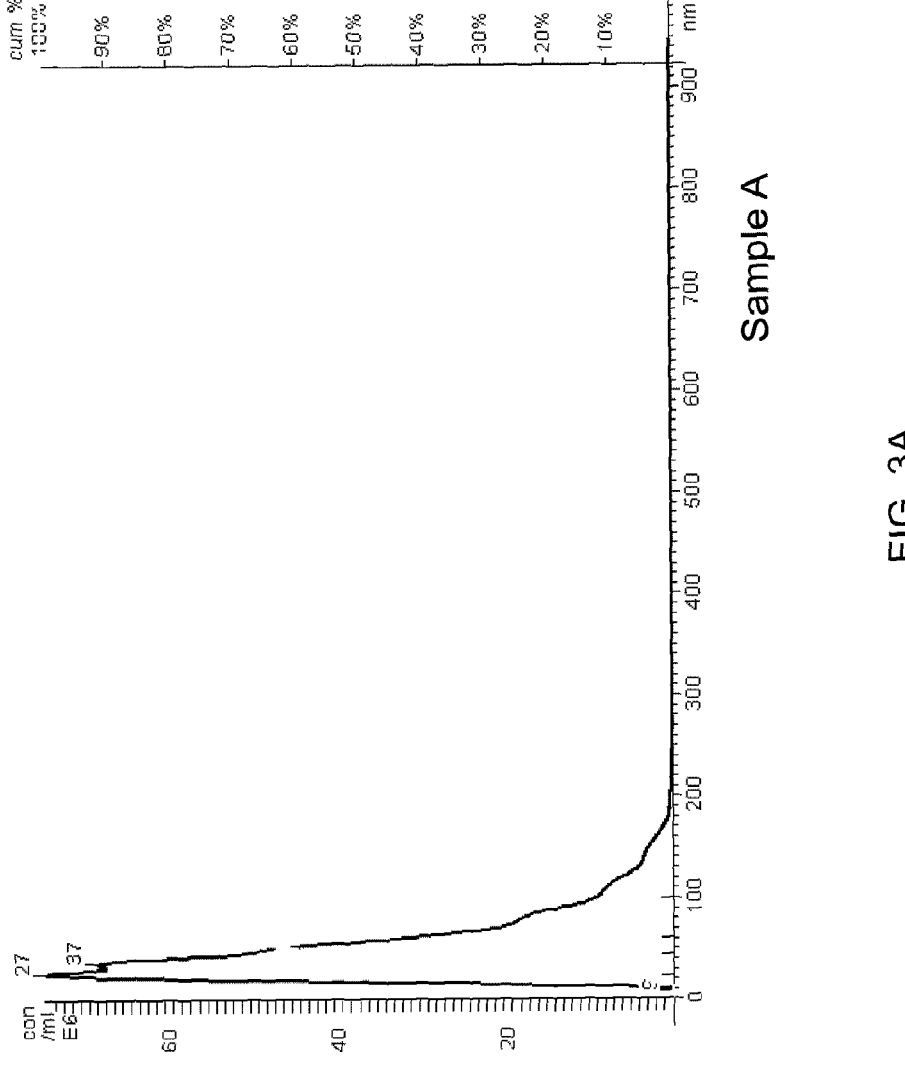
FIG. 3A illustrates a NanoSight™ generated graph of nanoparticle size distributions in nanometer (nm) and concentration from the sample shown in FIG. 2A after the homogeneous size nanoparticle formation/aggregation step of the process, prepared from the process of the invention.
Figure 3B:
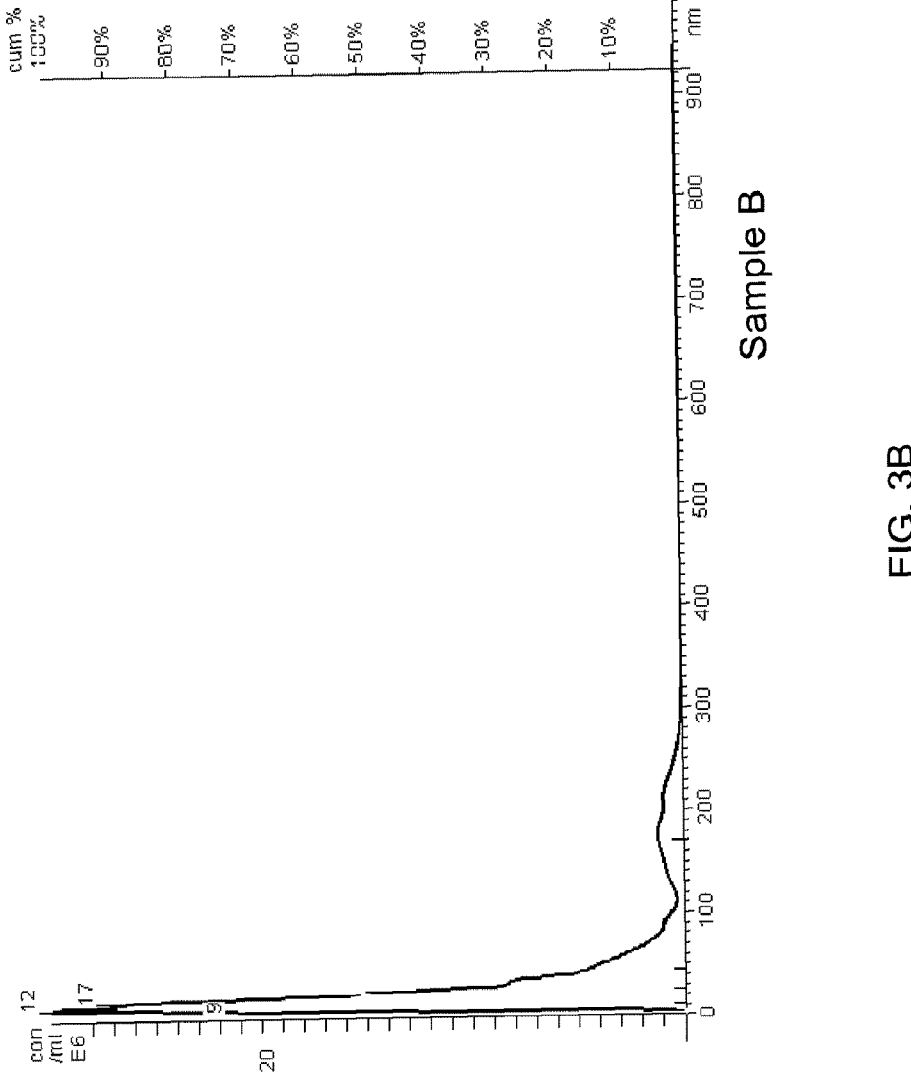
FIG. 3B illustrates a NanoSight™ generated graph of nanoparticle size distributions in nanometer (nm) and concentration from the sample shown in FIG. 2B after same second solvent treatment mentioned for homogeneous size nanoparticle formation/aggregation step of FIG. 3A, which was not prepared from the process of the invention.

Now referring to FIGS. 3A and B which illustrate Nano-Sight™ generated graphs of nanoparticle size distributions in nanometer (nm) and concentration from the sample shown in FIG. 2A after nanoparticle formation/aggregation step (step 8 of FIG. 1) of the process, prepared from the process of the invention or from the sample shown in FIG. 2B after same second solvent treatment mentioned for the nanoparticle formation/aggregation step of FIG. 3A, which is not prepared from the process of the invention.

Sample A: one milliliter of the resultant clear liquid from FIG. 2A (sample A) is diluted in distilled water to change its constituents' ratio to 1:10 to induce nanoparticle formation to a total final volume of 11 ml followed by Nanoparticle Tracking Analysis (NTA).

Sample B: one milliliter of the resultant clear liquid from FIG. 2B (sample B) is diluted in distilled water to change its constituents' ratio to 1:10 to induce nanoparticle formation to a total final volume of 11 ml followed by NTA.

Figure 4:
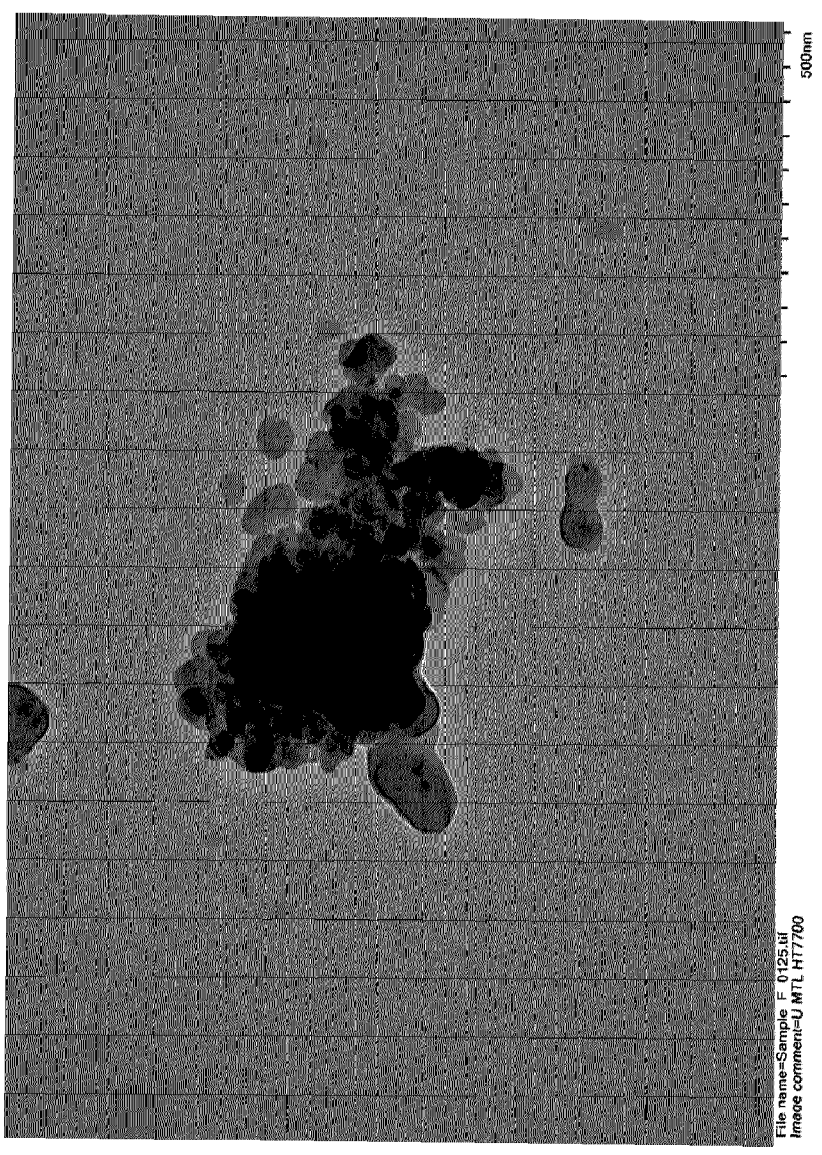
FIG. 4 shows an electron microscopy photograph of nanoparticle generated using the process of the invention, from holy basil as the source of bulk biological material.

Now referring to FIG. 4, which Is an electron microscopy photograph of nanoparticles generated. A 3 µl sample of nanoparticle suspension (FIG. 3A, sample A) is placed on Formvar Carbon Film 400 mesh Copper for electron microscopy.

Figure 5A:
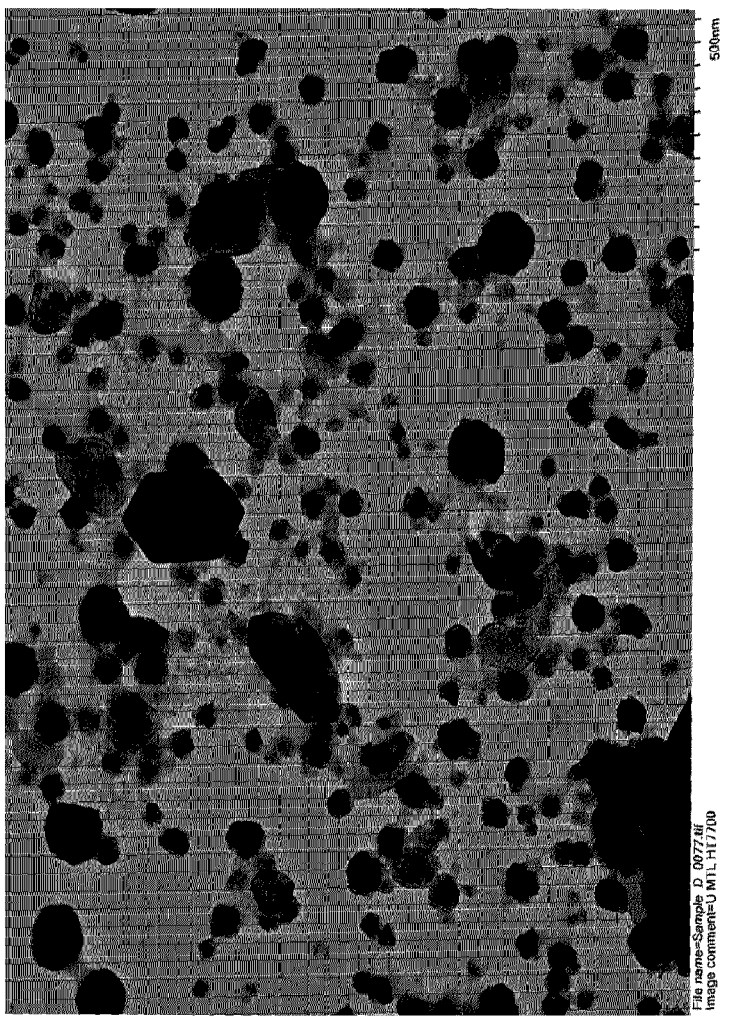
FIG. 5A shows an elect-on microscopy photograph of molecular mixes and supramolecular assemblies extracted from ginger from the process of the present invention, in a first solvent before the nanoparticle formation/aggregation step of the process.

Now referring to FIGS. 5A and B, which are Electron microscopy photographs of molecular mixes and supramolecular assemblies obtained in the first solvent (Step 7, FIG. 1).

Sample A: in this example and according to one embodiment, 10 grams of dried plant biomass (dried ginger root slices or *Zingiber officinale*, purchased from a Canadian organic supplier) are contacted with distilled water in a closed container to saturate (Step 2, FIG. 1), followed by freezing at −18° C. for approximately for 2.0 hour and thawed subsequently for 30 minutes at 20° C. (Step 3, FIG. 1) followed by hot air drying (Step 4, FIG. 1) in an oven at 75° C. for 20 minutes. The biomass is transferred to a polypropylene 60-ml-syringe barrel and 12 ml of the first solvent (in this example 95% w/w ethanol, 5% w/w water) are added to submerge the whole biomass (Step 5, FIG. 1). The Luer-lock stopper and two-way Luer-lock connectors are used to create negative pressure inside the syringe barrel by pulling the plunger, holding for approximately 2 seconds and quickly releasing the negative pressure (Step 6, FIG. 1). The negative pressure-release cycle is repeated for 3 to 100 times. The total time of contact with the first solvent for the whole negative pressure-release cycles is less than 5 minutes. The negative pressure is approximately −3.0 psi inside the syringe barrel. The liquid (approximately 5 ml) is gently collected and is filtered through a 0.45 µm syringe filter followed by further filtering with a 0.1 µm syringe filter (Step 7, FIG. 1). A 3 µl sample of latter clear solution is placed on Formvar Carbon Film 400 mesh Copper for electron microscopy and molecular mixes and supramolecular assemblies is observed.

Sample B: the same amount of biomass and the same volume of the first solvent is used as for the example of sample A but without the steps of water saturation, freeze-thawing and negative pressure-release where steps 2 to 4 and step 6 (of FIG. 1) of the process are withdrawn but steps 1, 5 and 7 are performed as control experiment. In this example the incubated for the same time for full contact as for the example of sample A (step 5 of FIG. 1) (less than 5 minutes) and the liquid (approximately 5 ml) is gently collected. The liquid is filtered through a 0.45 µm syringe filter followed by further filtering with a 0.1 µm syringe filter (Step 7, FIG. 1). A 3 µl sample of latter clear solution is placed on Formvar Carbon Film 400 mesh Copper (Electron Microscopy Sciences) for electron microscopy and less molecular mixes and supramolecular assemblies is observed in comparison to Sample A.

In conclusion, the process of the present invention where the steps of water saturation, freeze-thawing, drying and negative pressure-release (steps 2 to 4 and step 6 of FIG. 1) is applied unexpectedly generated significantly more molecular mixes and supramolecular assemblies than the process without.

Figure 5B:
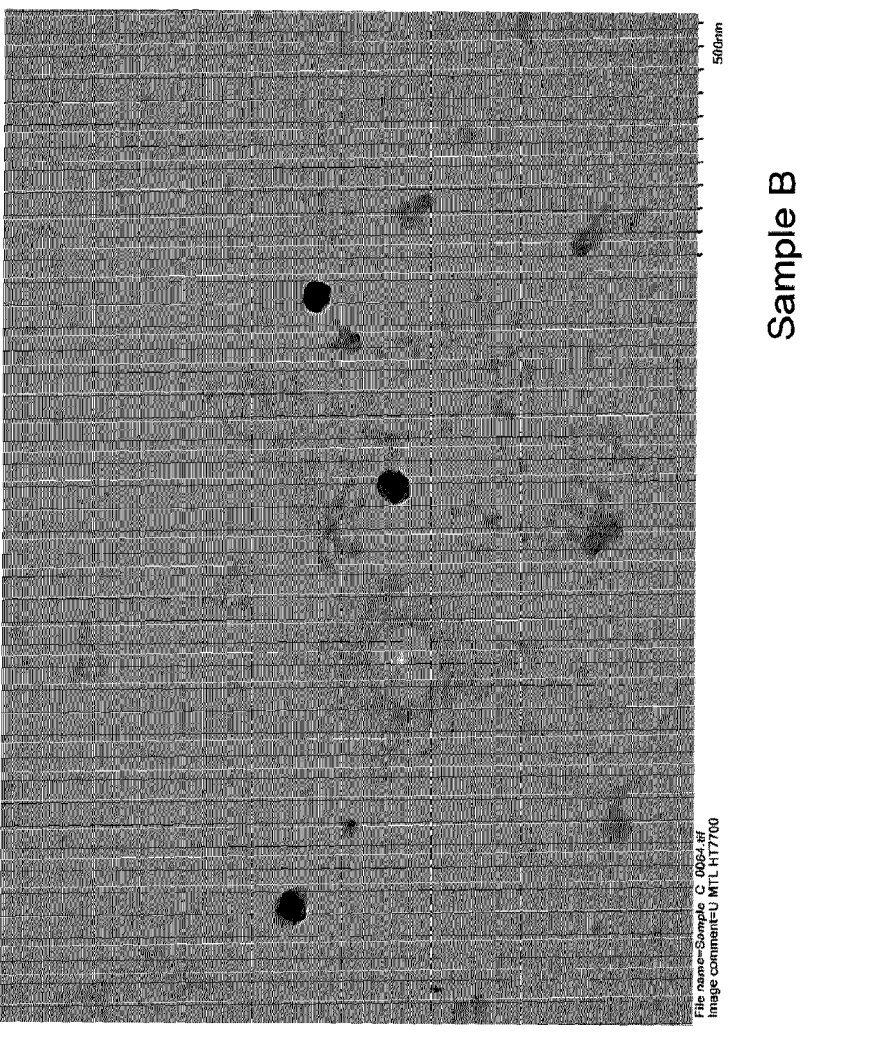
FIG. 5B shows an electron microscopy photograph of molecular mixes and supramolecular assemblies extracted from ginger without the steps of water saturation, freeze-thawing and negative pressure-release (steps 2 to 6 of FIG. 1) of the present invention, in a first solvent before the nanoparticle formation/aggregation step of the process.
Figure 6A:
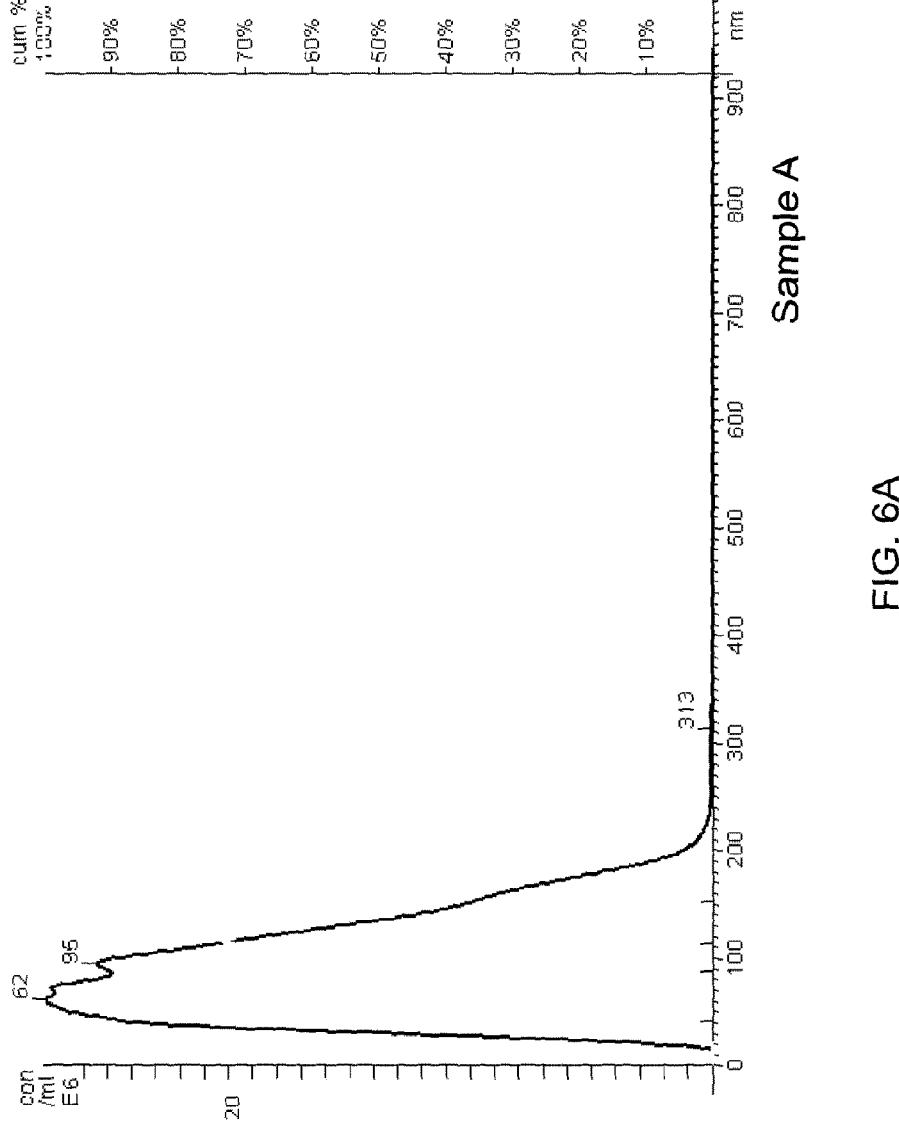
FIG. 6A illustrates a NanoSight™ generated graph of nanoparticle size distributions in nanometer (nm) and concentration from the sample shown in FIG. 5A after the homogeneous size nanoparticle formation/aggregation step of the process, prepared from the process of the invention.
Figure 6B:
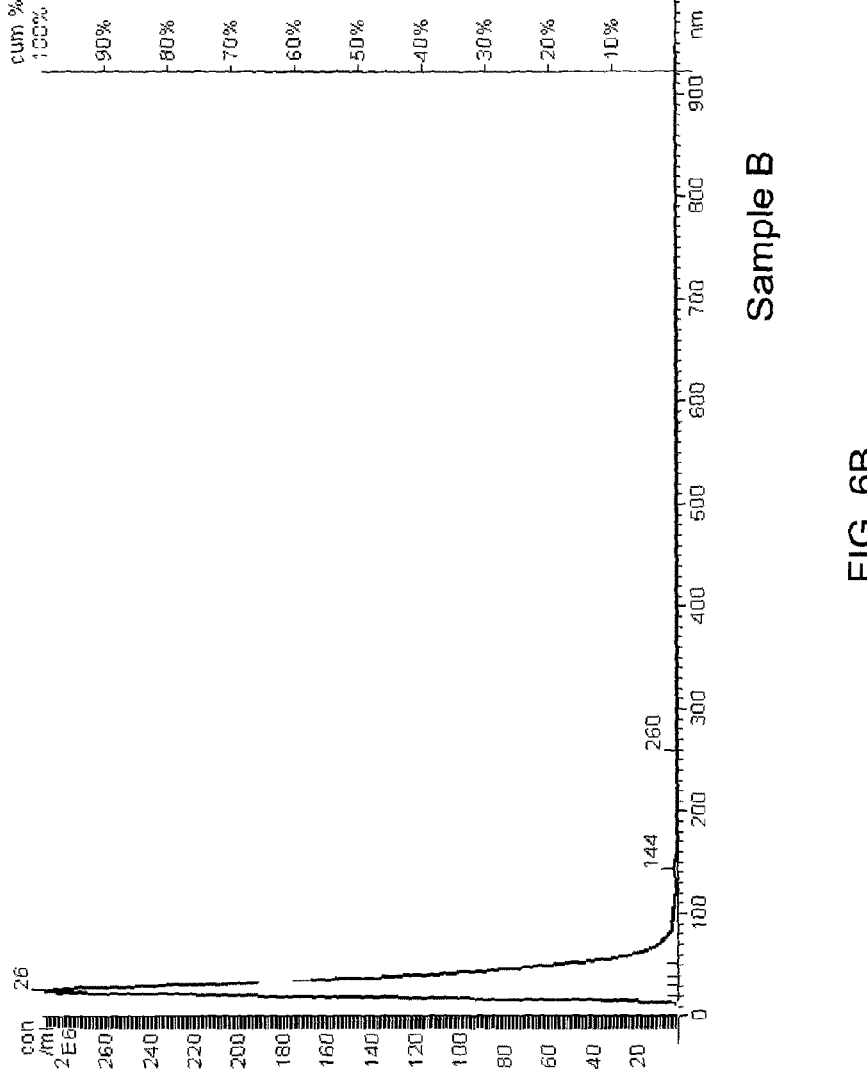
FIG. 6B illustrates a NanoSight™ generated graph of nanoparticle size distributions in nanometer (nm) and concentration from the sample shown in FIG. 5B after the same second solvent treatment mentioned for homogeneous size nanoparticle formation/aggregation step of FIG. 6A, which was not prepared from the process of the invention.

Now referring to FIGS. 6A and B, which illustrate Nano-Sight™ generated graphs of nanoparticle size distributions in nanometer (nm) and concentration from the sample shown in FIG. 5A after nanoparticle formation/aggregation step of the process, prepared from the process of the invention or from the sample shown in FIG. 5B after the same second solvent treatment mentioned for the nanoparticle formation/aggregation step of FIG. 6A, which is not prepared from the process of the invention.

Sample A: one milliliter of the resultant clear liquid from FIG. 5A (sample A) is diluted in distilled water to change its constituents' ratio to 1:10 to induce nanoparticle formation to a total final volume of 11 ml followed by NTA.

Sample B: one milliliter of the resultant clear liquid from the FIG. 5B (sample B) is diluted in distilled water to change its constituents' ratio to 1:10 to induce nanoparticle formation to a total final volume of 11 ml followed by NTA.

In conclusion, the process of the present invention where steps of water saturation, freeze-thawing and negative pressure-release (steps 2 to 4 and step 6 of FIG. 1) is applied unexpectedly generated significantly more nanoparticle formation/aggregation than the process without.

Figure 7:
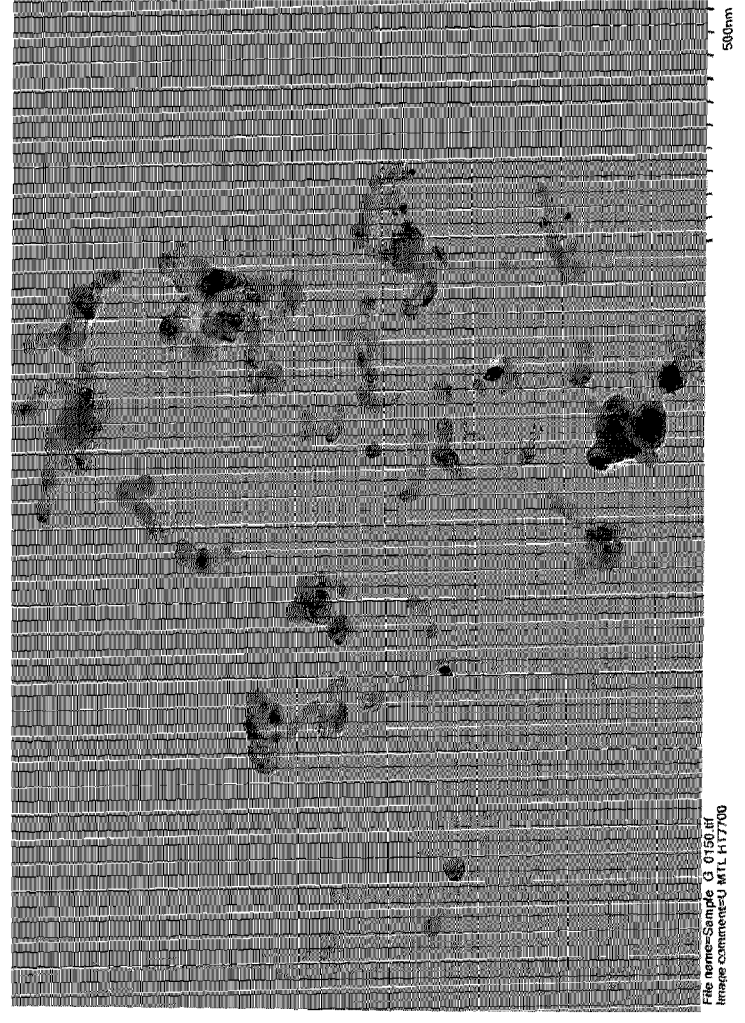
FIG. 7 shows an electron microscopy photograph of nanoparticle generated using the process of the invention.

Now referring to FIG. 7, which is an electron microscopy photograph of nanoparticle generated using the process of the invention. A 3 µl sample of nanoparticle suspension (FIG. 6A, sample A) is placed on Formvar Carbon Film 400 mesh Copper for electron microscopy.

EXAMPLE 4

Example Process 4

Figure 8:
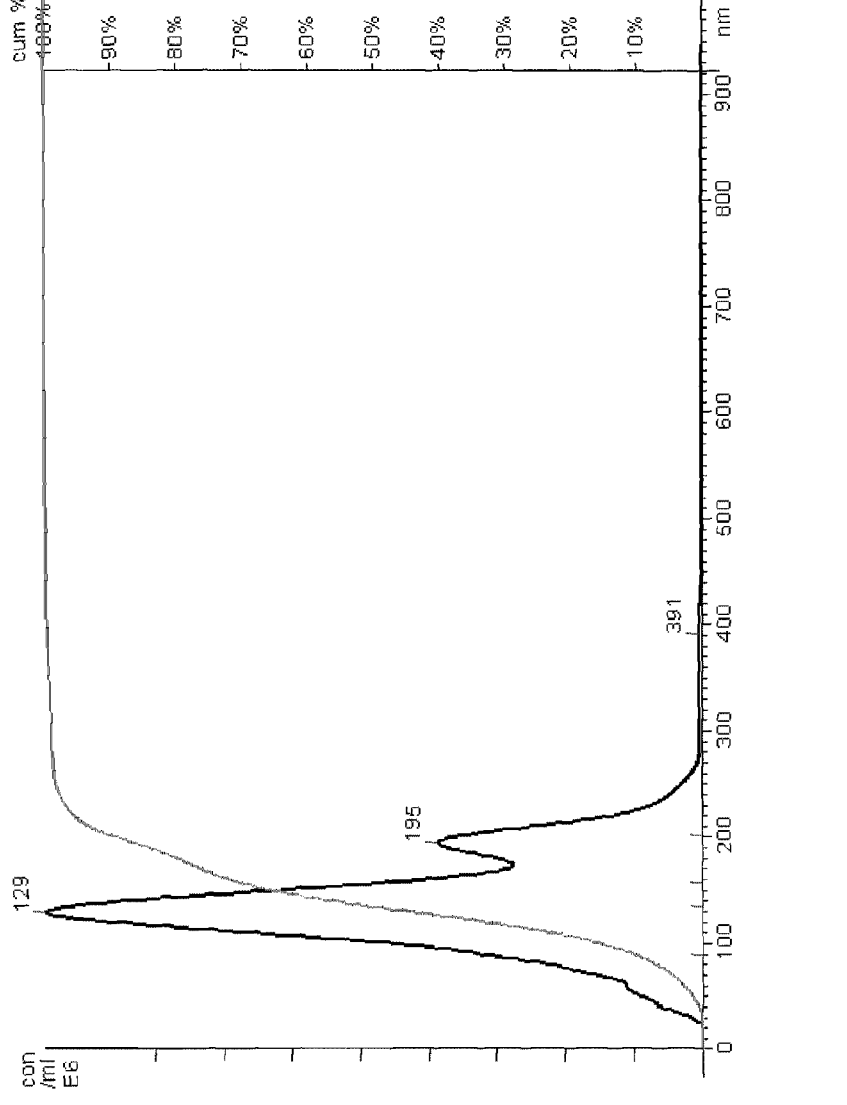
FIG. 8 illustrates a NanoSight™ generated graph of nanoparticle size distributions in nanometer (nm) and concentration from the sample shown in FIGS. 9A and 9B, prepared from the process of the invention. The pale line represents the cumulative undersize distribution percentage (CUM %) which refers to the percentage of particles (right vertical axis of the figure) and corresponding size (the x-axis).

Now referring to FIG. 8, which is a NanoSight™ generated graph of nanoparticle size distributions in nanometer (nm) and concentration from the sample shown in FIG. 7, prepared from the process of the invention.

In this example and according to one embodiment, 10.3 grams of dried plant biomass (dried turmeric root thin slices or *Curcuma longa* purchased from a Canadian organic supplier) are contacted with distilled water in a closed container to saturate the sample (Step 2, FIG. 1), followed by freezing at −18° C. for approximately for 3.0 hour and thawed subsequently for 45 minutes at 20° C. (Step 3, FIG. 1) followed by hot air drying (Step 4, FIG. 1) in an oven at 65° C. for 20 minutes. The biomass is transfer to a polypropylene 60-ml-syringe barrel and 10 ml of the first solvent (in this example 95% w/w ethanol, 5% w/w water) is added to submerge the whole biomass (Step 5, FIG. 1). The Luer-lock stopper and two-way Luer-lock connectors are used to create negative pressure inside the syringe barrel by pulling the plunger, holding for approximately 3.0 seconds and quickly releasing the negative pressure (Step 6, FIG. 1). The latter negative pressure-release cycle is repeated for 3 to 10 times. The total time of contact with the first solvent for the whole negative pressure-release cycles is less than 10 minutes. The negative pressure is approximately 3.0 psi inside the syringe barrel. The liquid (approximately 8 ml) is gently collected and is filtered through a 0.45 μm syringe filter followed by further filtering with a 0.1 μm syringe filter (Step 7, FIG. 1). One milliliter of the resultant clear liquid from the above is diluted in distilled water to change its constituents' ratio to 1:10 to induce nanoparticle formation to a total final volume of 11 ml (step 8 of FIG. 1). The latter nanoparticle suspension is diluted 1000 times with water and analyzed by NTA.

Figure 9A:
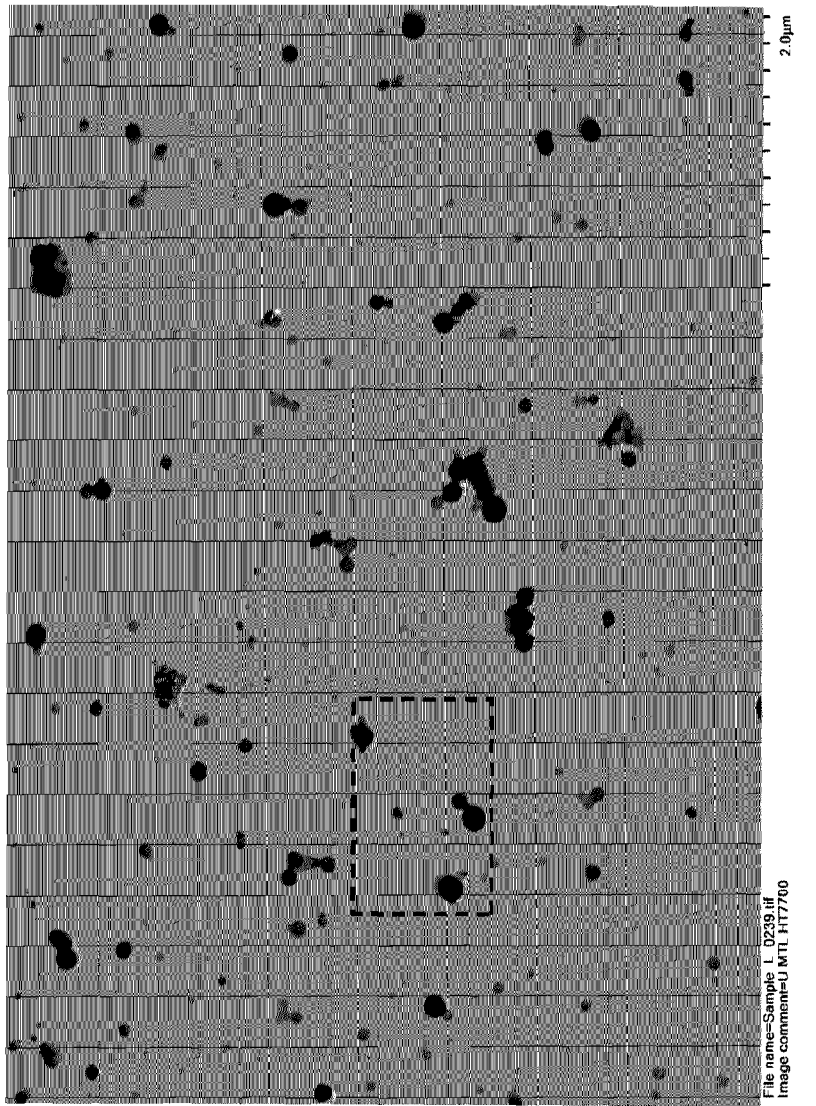
FIG. 9A shows an electron microscopy photograph of nanoparticle generated from turmeric root using the process of the invention. Stippled lines show magnified segment shown in FIG. 9B.
Figure 9B:
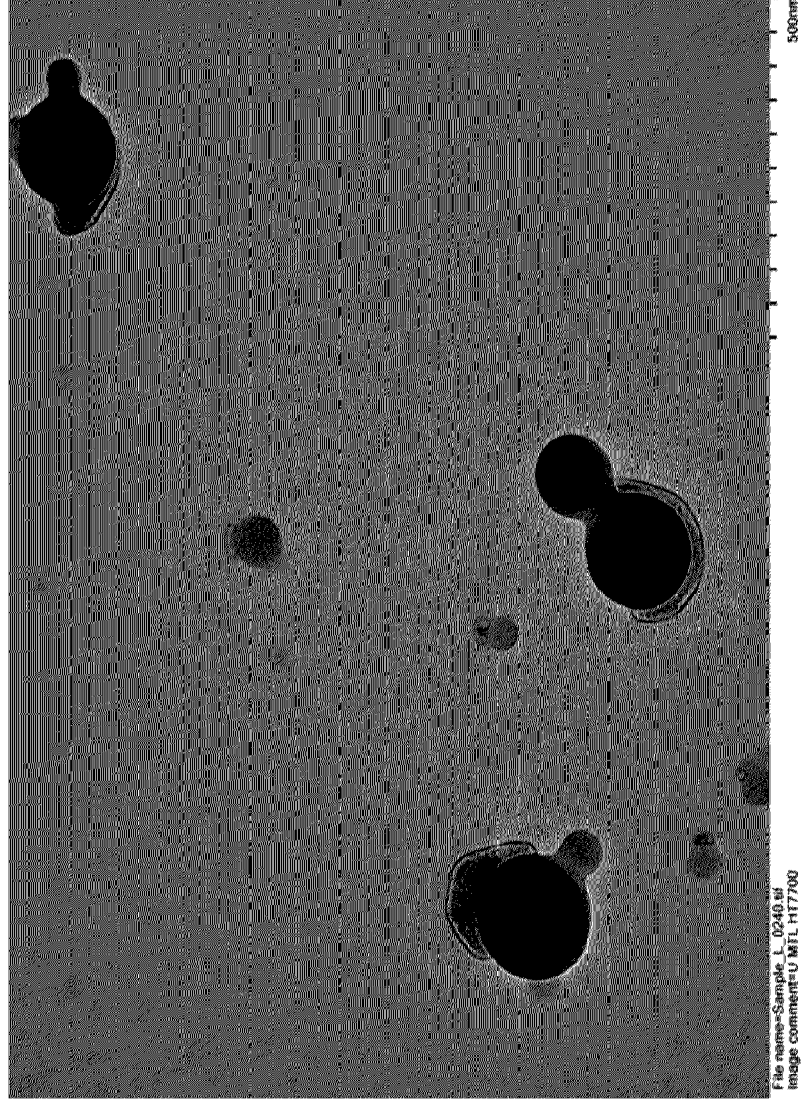
FIG. 9B shows a magnification of the electron microscopy photograph of nanoparticle generated from turmeric root using the process of the invention shown in FIG. 9A.

Now referring to FIGS. 9A and B, which are electron microscopy photographs of turmeric nanoparticle generated from turmeric root. A 3 μl sample of nanoparticle suspension from the turmeric nanoparticles is placed on Formvar Carbon Film 400 mesh Copper for electron microscopy.

EXAMPLE 5

Example Process 5

Now referring to FIG. 10 which shows a graph of particle size distributions in nanometer (nm) and concentration of nanoparticle generated from a mixture of dried plant parts (purchased from a Canadian organic supplier). The Nanoparticle Tracking Analysis was performed using NanoSight™ and their software of Version 2.3 Build 0011 RC1. Four technical replicates of samples and solvent each are analyzed and their averages are plotted in this graph.

In this example and according to one embodiment the following dried plant parts (called herein 'sample-mixed') are used at the following weight (grams) portions to prepare the mix [8 grams of Anise Seed Whole (*Pimpinella anisum*), 8 grams of Ashwagandha Root (*Withania somnifera*), 2.5 grams of cinnamon bark (*Cinnamomum verum*), 1 gram of Dandelion Leaf (*Taraxacum officinale*), 1 gram of *Echinacea Angustifolia* leaves (*Echinacea Angustifolia*), 5 grams of Ginger Root (*Zingiber officinale*), 10 grams of Canadian Ginseng Root (*Panax quinquefolius*), 3.5 grams of Gotu Kola leaves (*Centella asiatica*), 2.25 grams of Gymnema Leaf (*Gymnema sylvestre*), 1 gram of Holy Basil leaves (*Ocimum tenuiflorum*), 2.25 grams of red hibiscus flower (*Hibiscus rasa-sinensis*), 5 grams of Nettle leaves (*Urtica dioica*), 11.5 grams of Mushrooms Chaga (*Inonotus obliquus*), 1 gram of Oregano Leaf (*Orignium vulgare*), 8 grams of Peppermint Leaf (*Mentha piperita*), 18 grams of Turmeric Root (*Curcuma longa*), 1 gram of Yarrow Flowers (*Achillea millefolium*) and 11 grams of Green Tea (*Camellia sinensis*)].

All the plant materials are supplied as coarsely cut in pieces of dimensions of greater than about 0.1 cm to less than 0.5 cm. One 5 grams portion of the above mixture of plant biomass is added with distilled water to saturate at room temperature, followed by freezing at −12° C. and thawed subsequently at 22° C. followed by hot air drying in an oven at 121° C. for 25 minutes. The biomass is transferred to a polypropylene 60-ml-syringe and 10 ml of the first solvent (95% w/w ethanol, 5% w/w water) is added to cover the mixed biomass. The Luer-lock stopper and two-way Luer-lock connectors are used to create negative pressure inside the syringe by quickly pulling the plunger and release the negative pressure for multiple times. The negative pressure created is between −2 to 3 psi. The liquid (approximately 8 ml) is gently collected and is filtered through a 0.45 μm syringe filter followed by further filtering with a 0.1 μm syringe filter. 2.2 ml of the resultant liquid are diluted in 10 ml of distilled water containing 0.9% sodium chloride (weight/volume) to induce nanoparticle formation and NTA is performed subsequently. Similarly, a control ("Sample-solvent") is prepared by diluting 2.2 ml of the first solvent in 10 ml of distilled water containing 0.9% sodium chloride as a second solvent (weight/volume) and used for NTA. The size of the submicrometric nanoparticle population observed with peak at approximately 150 nm and a dispersity 0.19.

Figure 11:
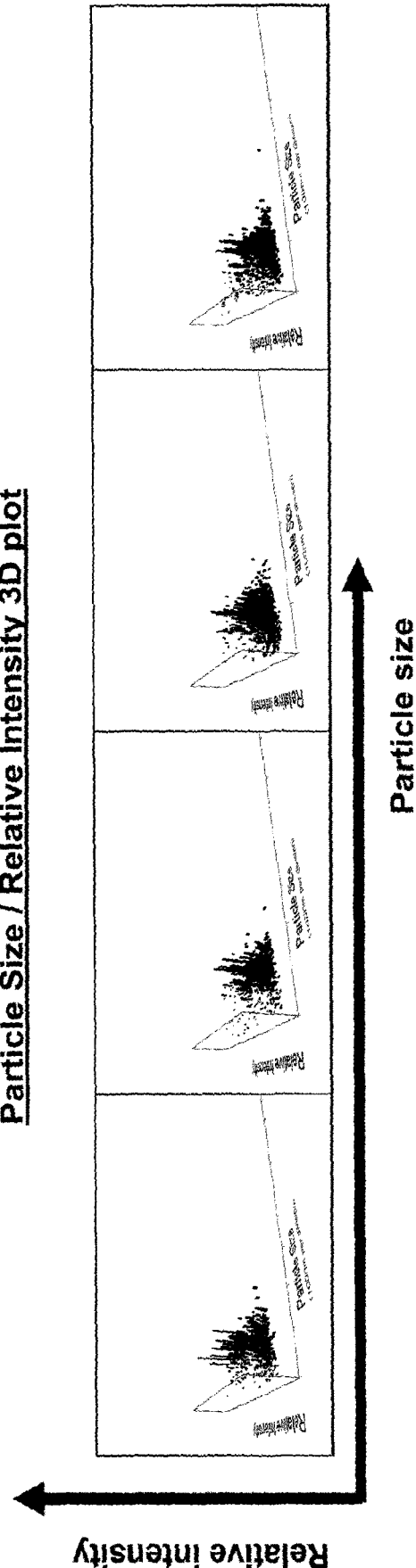
FIG. 11 illustrates a NanoSight™ generated Particle Size/Relative Intensity 3D plot of samples from four independent aliquots of nanoparticle generated from a mixture of dried plant parts described in example 5.

Now referring to FIG. 11, which illustrates NanoSight™ generated Particle Size/Relative Intensity 3D plot of samples from four independent aliquots of samples of FIG. 10A after diluting 100 times with distilled water.

Figure 12A:
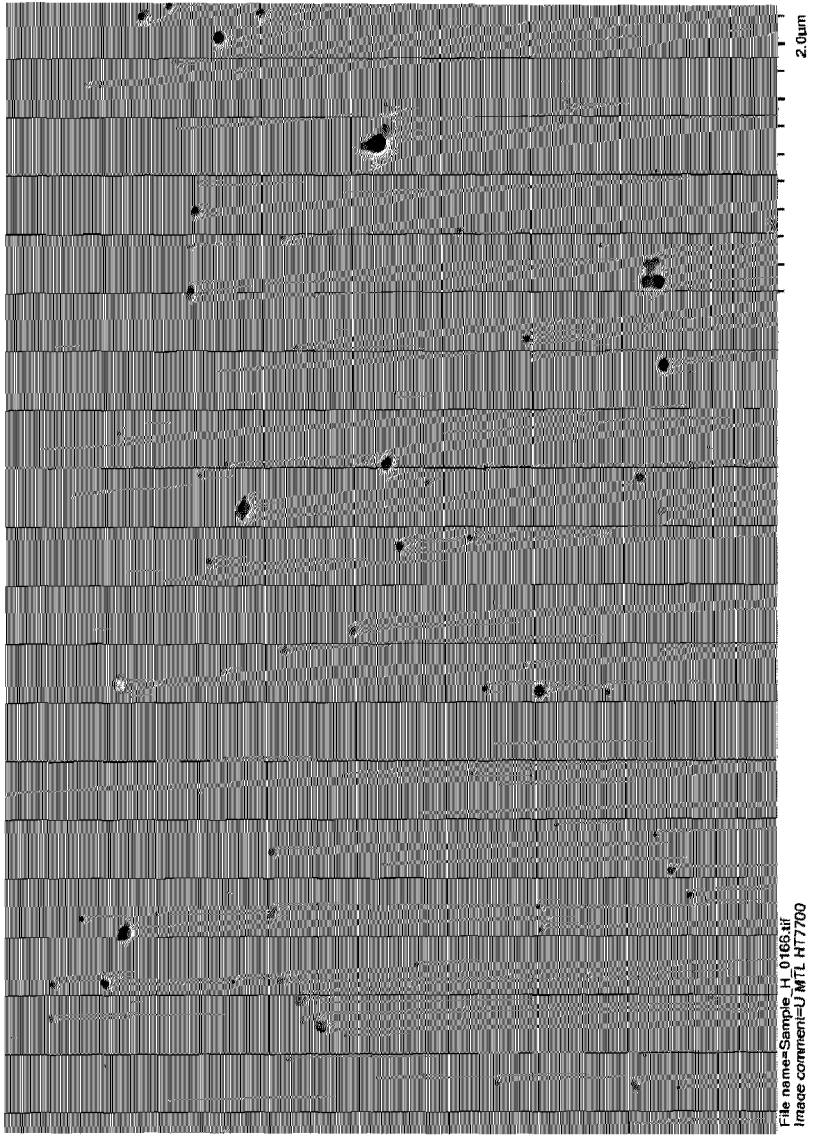
FIG. 12A shows an electron microscopy photograph of nanoparticle generated from the sample shown in FIG. 10, using the process of the invention.
Figure 12B:
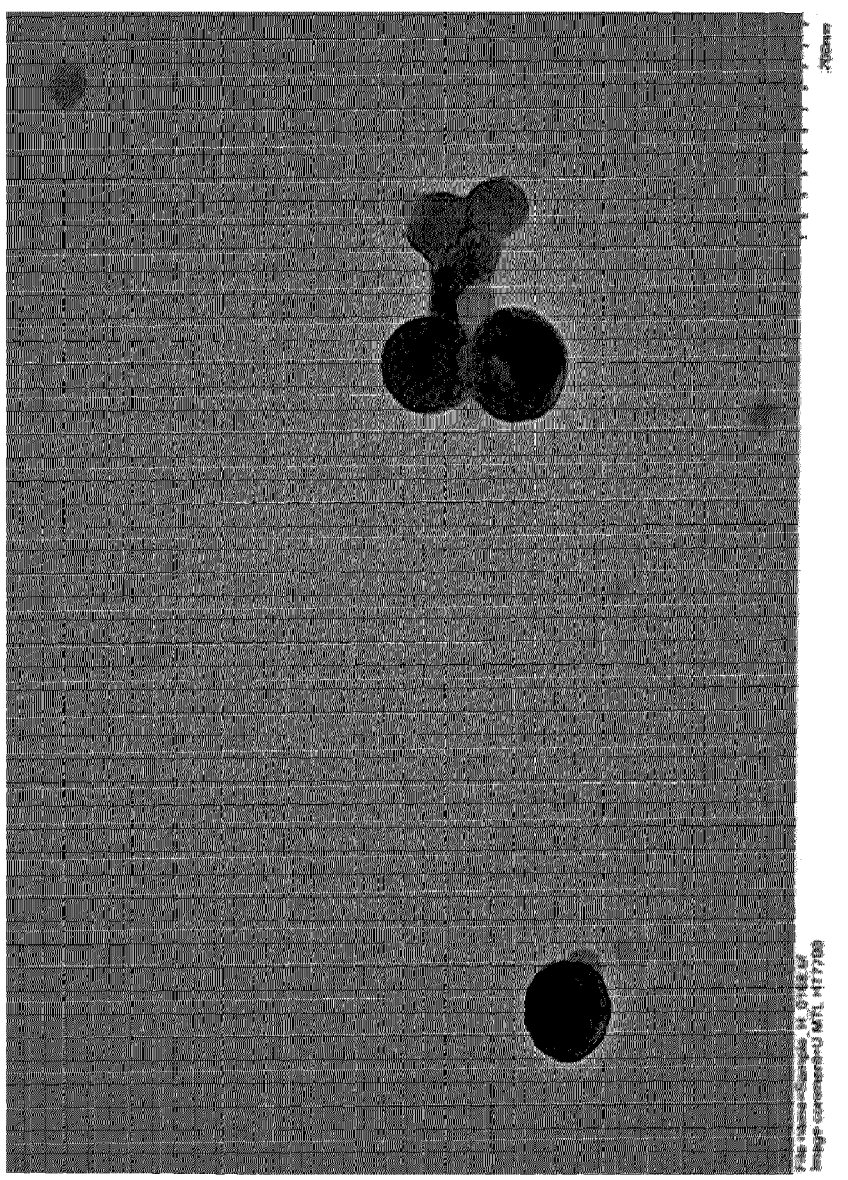

Now referring to FIGS. 12A and B, which are electron microscopy photographs of the nanoparticle generated from FIG. 10. A 3 μl sample of nanoparticle suspension from the turmeric nanoparticles is placed on Formvar Carbon Film 400 mesh Copper for electron microscopy.

EXAMPLE 6

Example Process 6

Now referring to FIG. 13, which is a graph of particle size distributions in nanometer (nm) and concentration for 4 samples obtained from *Cannabis indica* leaves. The Nanoparticle Tracking Analysis (NTA) is performed using NanoSight™ and their software of Version 2.3 Build 0011 RC1. Four independent aliquots of samples are used for NTA and their average is plotted in this graph.

Sample A: in this example and according to one embodiment, 2 grams of dried plant biomass (apical leaf/flower, approximately 1 cm×1 cm×0.5 cm in sizes of *Cannabis indica*, purchased from Cannabis-NB store) are contacted with distilled water to saturate, followed by freezing at −8° C. and thawed subsequently at 18-20° C. for 20 minutes followed by hot air drying in an oven at 130° C. for 15 minutes. The biomass is transferred to a polypropylene 30-ml-syringe and 10 ml of the first solvent (in this example 95% w/w ethanol, 5% w/w water) is added to submerge all the biomass. The Luer-lock stopper and two-way Luer-lock connectors are used to create negative pressure inside the syringe barrel by pulling the plunger, holding for 3 seconds and suddenly releasing the negative pressure for multiple times. The negative pressure is approximately −4.0 psi inside the barrel. The liquid (approximately 9 ml) is gently collected and is filtered through a 0.45 μm syringe filter followed by further filtering with a 0.1 μm syringe filter. One milliliter of the resultant clear liquid is diluted in distilled water to change its constituents' ratio to 1:10 to induce nanoparticle formation to a total final volume of 11 ml followed by NTA, to obtain nanoparticle having a dispersity ≤0.3.

Sample B: the same procedure as above is used. A 1000 μl part of above resultant clear liquid from the biomass is mixed with a 200 μl part of soybean lecithin dissolved in 95% ethanol, according to another embodiment. The soybean lecithin is prepared by adding 10 ml of 95% ethanol onto 1 gram of soybean lecithin stirring with a magnetic bar for 2 hours, filtering through a 0.45-micron syringe filter followed by further filtering through a 0.1-micron syringe filter, A total of 1200 μl mixture of the above is diluted to 10 ml of distilled water for the induction of homogeneous size nanoparticles to a final volume of 11.2 ml and NTA is performed.

Sample C: the same amount of biomass of leaf/flower is used as for the example of sample A but without the steps of water saturation, freeze-thaw and negative pressure-release (steps 2 to 4 and step 6 of FIG. 1 are not performed). Here, also 10 ml of the first solvent (95% ethanol, 5% water) is added to cover the whole biomass and incubated for the same time (step 5 of FIG. 1) as for the example of sample A (2 minutes) and the liquid (approximately 9 ml) is gently collected. The liquid is filtered through a 0.45-micron syringe filter followed by further filtering with a 0.1-micron syringe filter (step 7 of FIG. 1). One milliliter of the resultant liquid is diluted in distilled water, the same way as for the example of sample A to change its constituents' ratio to 1:10 to induce nanoparticle formation (step 9 of FIG. 1) to the final volume of 11 ml. The latter liquid is used for NTA.

Sample D: the first solvent (95% w/w ethanol, 5% w/w water) is filtered through a 0.45 μm syringe filter followed by further filtering with a 0.1 μm syringe filter. One milliliter of the above liquid is diluted in distilled water, the same way as for the example of sample A, B or C to change its constituents' ratio to 1:10 to a final volume of 11 ml and analyzed by NTA.

Now referring to FIG. 14, which illustrates a NanoSight generated Particle Size/Relative Intensity 3D plot of four independent aliquots of samples obtained from *Cannabis indica* leaves as detailed in example 6.

Now referring to FIGS. 15A and B, which are electron microscopy photographs of the nanoparticles generated for FIG. 13 Sample A. A 3 μl sample of nanoparticle suspension from the nanoparticles is placed on Formvar Carbon Film 400 mesh Copper for electron microscopy.

Now referring to FIG. 16, which is an electron microscopy photograph of the nanoparticles generated for FIG. 13 Sample B. A 3 μl sample of nanoparticle suspension from the nanoparticles were placed on Formvar Carbon Film 400 mesh Copper for electron microscopy.

EXAMPLE 7

Example Process 7

In this example fresh ginger root (step 1 of FIG. 1) is washed and chopped approximately at 1 cm×1 cm×0.5 from larger pieces 100% moisture saturated in distilled water (step 2 of FIG. 1). Approximately 100 grams of root was chopped and immediately frozen at −18° C. for approximately for 2.5 hour and thawed subsequently for 30 minutes at 20° C., for three consecutive cycles of freeze-thaw (step 3 of FIG. 1), This is followed by hot air drying in an oven at 190° F. (87.7° C.) for 40 minutes until dry (step 4 of FIG. 1). Two samples of 6.0 grams of dried ginger roots are added to two 50-ml polypropylene syringe barrel and the biomass is gently compressed to the end of the barrel using the plunger.

In one barrel, 10 ml of a first solvent (95% w/w ethanol, 5% w/w water) is drawn in the syringe to submerge all the biomass. The Luer-lock stopper is used seal and maintain the first solvent in contact with the biomass for 2 minutes (step 5 of FIG. 1). No negative pressure inside the syringe barrel was applied such that no negative pressure and release cycle is performed in this sample (step 6 of FIG. 1). The liquid is gently collected (approximately 7.8 ml) and filtered through a 0.2 μm syringe filter (step 7 of FIG. 1). One milliliter of the above filtered first solvent is diluted in 5 ml of distilled water to change its constituents' ratio to 1:5 to induce nanoparticle formation (step 8 of FIG. 1). The final aqueous liquid part is designated as "blank liquid" where the nanoparticles were suspended.

In the second barrel, 10 ml of first solvent-1 (95% w/w ethanol, 5% w/w water) is drawn in the syringe to submerge all the biomass (step 5 of FIG. 1). The Luer-lock stopper is used to air seal the syringe-barrel and negative pressure inside the syringe barrel is applied by pulling of the plunger, holding for approximately 2 seconds and quickly releasing the negative pressure. This cycle was repeated for 3 to 100 times (step 6 of FIG. 1). The total contact time with the first solvent for the entire negative pressure-release cycles is 2 minutes. The negative pressure is approximately −3.0 to 4.0 psi inside the barrel. The liquid is gently collected (approximately 7.8 ml) and filtered through a 0.2 μm syringe filter (step 7 of FIG. 1). One milliliter of the above filtered first solvent is diluted in 5 ml of distilled water to change its constituents' ratio to 1:5 to induce nanoparticle formation (step 8 of FIG. 1). The final aqueous liquid part is designated as "blank liquid" where the nanoparticles were suspended.

Now referring to FIG. 17A, A(i) and A(ii) photograph of the solutions obtained after the process A(i) without and A(ii) with negative pressure (step 6 of FIG. 1) described above. Both the solutions were visibly clear with surrounding light.

Now referring to FIG. 17B, B(i) and B(ii): In these photographs the above solutions were illuminated from the bottom of the glass container using white LED (0.1 mm×0.1 mm) light in a dark room to find visual scattering properties of these two solutions generated as described with the process B(i) without and B(ii) with negative pressure (step 6 of FIG. 1). The intensity of scattered light was significantly more in the solution generated by process (ii).

Now referring to FIG. 17C, C(i) and C(ii): In these photographs the above solutions were illuminated from the bottom of the glass container using multiple white LED light round platform in a dark room to find visual scattering properties of these two solutions generated with the process C(i) without and C(ii) with negative pressure (step 6 of FIG. 1) described above.

Now referring to FIG. 18, which represent an absorption spectral graph to identify maximum absorption peak(s) of the material from FIGS. 17A-C in the liquid over the background liquid. The liquid media 'blank liquid' mentioned in FIG. 18 is one part first solvent (95% w/w ethanol, 5% w/w water) diluted in 5 parts of distilled water. UV-visible spectral scan is conducted and results from 300 nm to 500 nm are plotted to find the optical density of the matter present in the liquid without and with negative pressure-release cycle, designated as 'No Neg-Pre' and 'Neg-Pre' respectively. A peak at 360 nm was observed to differentiate the matter present in the liquid over the blank liquid. With negative pressure-release cycle the matter extracted form the biomass was significantly higher.

Now referring to FIGS. 19A and B which represent correlation coefficient of the particles measured on Zeta-Sizer-Nano™ (Malvern Panalytical) using their integrated digital correlator software to measure signal decay time (microseconds) to baseline. Smaller particle size accelerates faster correlation curve decay to baseline and correspond to faster diffusion rate of the particle. The particles are diluted to 50 times (50×), 100 times (100×) and 500 times (500×) using blank liquid [one part first solvent (95% w/w ethanol, 5% w/w water) diluted in 5 parts of distilled water]. In both the cases [A and B] signal decay time was similar (approximately 1000 microseconds, which means that the particle sizes are similar in both samples. Correlation coefficients of corresponding diluted samples for sample not subjected to negative pressure (FIG. 19A) was observed significantly lower than when compared with same dilutions of subjected to negative pressure (FIG. 19B), indication that sample subjected to negative pressure contain more suspended particles.

In conclusion, the process where negative pressure (step 6 of FIG. 1) is applied unexpectedly generate significantly more particles than the process without.

EXAMPLE 8

Example Process 8

Now referring to FIG. 20, which represent a size distribution of the particles measured (n=3) on ZetaSizer-Nano™ (Malvern Panalytical) and dispersity using their integrated digital correlator software.

In this example dried turmeric is used. The dried biomass is contacted with distilled water for 8 hours to reach 100% water saturation. All samples are frozen at −12° C. for approximately for 3 hour and thawed subsequently for 30 minutes at 20° C., and the same freeze-thaw cycles are repeated for three consecutive times (20 minutes freezing and 10 minutes thawing at room temperature). The freeze-thaw cycles are followed by hot air drying in an oven at 80° C. for 45 minutes until dry. Two grams of the dried biomass are added to 30-ml polypropylene syringe barrel and the biomass is gently compressed to the end of the barrel using the plunger and extracted with 5 ml of first solvent (ethyl acetate, 99%) with negative pressure approximately 27.5 to 34.5 negative kPa (4.0 to 5.0 negative psi). The liquid are gently collected and filtered through 0.45 μm followed by 0.1 μm syringe filters to produce a cleared solution. 500 μl of the above filtered first solvent is diluted in 10 ml of second solvent (mixture of 5 ml of 95% ethanol and 5 ml of distilled water).

EXAMPLE 9

Example Process 9

In this example dried lavender flower, fresh frozen wild blue berries, fresh ginger root, dried turmeric and fresh mint leaves are used. The fresh biomasses are 100% moisture saturated in distilled water and the dried bio masses are contacted with distilled water for 8 hours to reach 100% water saturation. All samples are frozen at −12° C. for approximately for 3 hour and thawed subsequently for 30 minutes at 20° C., and the same freeze-thaw cycles are repeated for three consecutive times (20 minutes freezing and 10 minutes thawing at room temperature), The freeze-thaw cycles are followed by hot air drying in an oven at 80° C.) for 45 minutes until dry for all samples except for the mint leaves, which were dry after 20 min. From the the dry samples, each of 5 grams of lavender flower, of 10.5 grams of blue berries, of 5.5 grams of ginger, of 6.0 grams of turmeric and of 2.0 gram of mint leaves, individually, are added to 50-ml polypropylene syringe barrel (5 in total) and the biomasses are gently compressed to the end of the barrel using the plunger and extracted with 10 ml (lavender flower, blue berries, ginger and turmeric) and 12 ml (mint leaves) of first solvent (95% w/w ethanol, 5% w/w water) respectively with negative pressure approximately −4.0 to 5.0 negative psi inside the barrels. The liquid are gently collected and filtered through 0.22 μm or 0.1 μm syringe filter (column B) to produce a cleared solution. One milliliter of the above filtered first solvent is diluted in 10 ml of either 0.01 M phosphate buffer (pH 7.4) or 0.01 M citrate buffer (pH 5.0) [as the second solvent, column C] to induce nanoparticle formation. As shown in Table 1 below, unexpectedly in most cases a size population of nanoparticles having a dispersity ≤0.3 are formed (column K), but with differences in particle sizes caused by the difference in pH (peak 1, column E). Particles are analysed on ZetaSizer-Nano™ (Malvern Panalytical) using their correlator software and polydispersity index (PDI, column K) are measured. PDI or dispersity ($Đ$) is a measure of degree of heterogeneity based on the size parameter of particles suspended in a liquid media where in the art that PDI value over 0.7 is considered particles suspended consist of mixture of multiple populations or highly heterogenous size particles in that liquid media, whereas PDI value less than 0.3 is considered particles suspended consist of mixture of one highly homogenous size population. As shown in Table 1 below, nanoparticles formed unexpectedly having PDI less than 0.22 (column K) and particle diameter less than 250 nm (column E, F, G) attribute to self-aggregated to a stable homogenous submicrometic particles population (column H), according to the process of the present invention.

TABLE 1

Nanoparticles characterization

| A | B | C | D | E | F | G | H | I | J | K | L | Row # |
|---|---|---|---|---|---|---|---|---|---|---|---|---|
| | | | | particle diameter in nm (intensity distribution) | | | Area of peaks as % of total (intensity distribution) | | | | Diffusion Coefficient | |
| | | | pH of | | | | | | | | | |
| Biomass | Filtration | Solvent - 2 | solvent - 2 | Peak 1 | Peak 2 | Peak 3 | Peak 1 | Peak 2 | Peak 3 | PDI | (m2/s) | Row # |
| Levander | 0.1 micron | 0.1x PBS | 7.4 | 446.4 | 0 | 0 | 100.0 | 0 | 0 | 0.748 | 0.430 | 1 |
| flower | 0.1 micron | 0.1x PBS | 7.4 | 583.5 | 0 | 0 | 100.0 | 0 | 0 | 0.744 | 0.327 | 2 |
| | 0.1 micron | 0.1x PBS | 7.4 | 519.8 | 0 | 0 | 100.0 | 0 | 0 | 0.992 | 0.241 | 3 |
| Wild | 0.1 micron | 0.01M Acetate | 5.0 | 217.9 | 0 | 0 | 100.0 | 0 | 0 | 0.207 | 2.830 | 4 |
| blueberry | 0.1 micron | 0.01M Acetate | 5.0 | 198.9 | 4526 | 0 | 97.8 | 2.2 | 0 | 0.204 | 2.890 | 5 |
| (Fresh | 0.1 micron | 0.01M Acetate | 5.0 | 193.8 | 4187 | 0 | 96.2 | 3.8 | 0 | 0.219 | 2.890 | 6 |
| frozen) | 0.1 micron | 0.01M Acetate | 5.0 | 129.0 | 0.0 | 0.0 | 100.0 | 0.0 | 0.0 | 0.143 | 4.500 | 7 |
| | 0.1 micron | 0.01M Acetate | 5.0 | 123.5 | 0.0 | 0.0 | 100.0 | 0.0 | 0.0 | 0.161 | 4.550 | 8 |
| | 0.1 micron | 0.01M Acetate | 5.0 | 122.7 | 4767.0 | 0.0 | 98.6 | 1.4 | 0.0 | 0.170 | 4.570 | 9 |
| | 0.22 micron | 0.01M Acetate | 5.0 | 134.4 | 0.0 | 0.0 | 100.0 | 0.0 | 0.0 | 0.200 | 4.630 | 10 |
| | 0.22 micron | 0.01M Acetate | 5.0 | 132.9 | 0.0 | 0.0 | 100.0 | 0.0 | 0.0 | 0.194 | 4.730 | 11 |
| | 0.22 micron | 0.01M Acetate | 5.0 | 131.4 | 21.3 | 0.0 | 99.7 | 0.3 | 0.0 | 0.191 | 4.670 | 12 |
| | 0.1 micron | 0.1x PBS | 7.4 | 427.2 | 0.0 | 0.0 | 100.0 | 0.0 | 0.0 | 1.000 | 0.102 | 13 |
| | 0.1 micron | 0.1x PBS | 7.4 | 1771.0 | 0.0 | 0.0 | 100.0 | 0.0 | 0.0 | 0.567 | 0.088 | 14 |
| | 0.1 micron | 0.1x PBS | 7.4 | 615.1 | 0.0 | 0.0 | 100.0 | 0.0 | 0.0 | 0.314 | 0.058 | 15 |

TABLE 1-continued

Nanoparticles characterization

| | | | | | | | | | | | | |
|---|---|---|---|---|---|---|---|---|---|---|---|---|
| | | | | Column # | | | | | | | | |
| | | | | E F G particle diameter in nm (intensity distribution) | | | H I J Area of peals as % of total (intensity distribution) | | | | L Diffusion Coefficient | |
| A | B | C | D pH of | | | | | | | K | | |
| Biomass | Filtration | Solvent - 2 | solvent - 2 | Peak 1 | Peak 2 | Peak 3 | Peak 1 | Peak 2 | Peak 3 | PDI | (m2/s) | Row # |
| | 0.22 micron | 0.1x PBS | 7.4 | 255.0 | 0.0 | 0.0 | 100.0 | 0.0 | 0.0 | 0.772 | 0.064 | 16 |
| | 0.22 micron | 0.1x PBS | 7.4 | 369.8 | 0.0 | 0.0 | 100.0 | 0.0 | 0.0 | 1.000 | 0.113 | 17 |
| | 0.22 micron | 0.1x PBS | 7.4 | 739.7 | 0.0 | 0.0 | 100.0 | 0.0 | 0.0 | 0.485 | 0.081 | 18 |
| Fresh | 0.1 micron | 0.01M Acetate | 5.0 | 128.3 | 0.0 | 0.0 | 100.0 | 0.0 | 0.0 | 0.192 | 4.820 | 19 |
| ginger | 0.1 micron | 0.01M Acetate | 5.0 | 129.8 | 0.0 | 0.0 | 100.0 | 0.0 | 0.0 | 0.214 | 4.870 | 20 |
| | 0.1 micron | 0.01M Acetate | 5.0 | 130.2 | 0.0 | 0.0 | 100.0 | 0.0 | 0.0 | 0.214 | 4.870 | 21 |
| | 0.22 micron | 0.01M Acetate | 5.0 | 103.0 | 20.3 | 0.0 | 98.7 | 1.3 | 0.0 | 0.175 | 5.870 | 22 |
| | 0.22 micron | 0.01M Acetate | 5.0 | 101.7 | 0.0 | 0.0 | 100.0 | 0.0 | 0.0 | 0.182 | 5.940 | 23 |
| | 0.22 micron | 0.01M Acetate | 5.0 | 103.5 | 0.0 | 0.0 | 100.0 | 0.0 | 0.0 | 0.183 | 5.930 | 24 |
| | 0.1 micron | 0.1x PBS | 7.4 | 191.0 | 0.0 | 0.0 | 100.0 | 0.0 | 0.0 | 0.152 | 3.100 | 25 |
| | 0.1 micron | 0.1x PBS | 7.4 | 183.9 | 0.0 | 0.0 | 100.0 | 0.0 | 0.0 | 0.139 | 3.160 | 26 |
| | 0.1 micron | 0.1x PBS | 7.4 | 188.5 | 0.0 | 0.0 | 100.0 | 0.0 | 0.0 | 0.169 | 3.170 | 27 |
| | 0.22 micron | 0.1x PBS | 7.4 | 169.7 | 0.0 | 0.0 | 100.0 | 0.0 | 0.0 | 0.159 | 3.520 | 28 |
| | 0.22 micron | 0.1x PBS | 7.4 | 162.7 | 0.0 | 0.0 | 100.0 | 0.0 | 0.0 | 0.153 | 3.590 | 29 |
| | 0.22 micron | 0.1x PBS | 7.4 | 164.8 | 0.0 | 0.0 | 100.0 | 0.0 | 0.0 | 0.150 | 3.570 | 30 |
| Turmeric | 0.1 micron | 0.1x PBS | 7.4 | 166.4 | 0 | 0 | 100.0 | 0 | 0 | 0.116 | 3.370 | 31 |
| | 0.1 micron | 0.1x PBS | 7.4 | 160.5 | 0 | 0 | 100.0 | 0 | 0 | 0.108 | 3.400 | 32 |
| | 0.1 micron | 0.1x PBS | 7.4 | 157.8 | 0 | 0 | 100.0 | 0 | 0 | 0.095 | 3.450 | 33 |
| | 0.1 micron | 0.01M Acetate | 5.0 | 228.0 | 0 | 0 | 100.0 | 0 | 0 | 0.074 | 2.370 | 34 |
| | 0.1 micron | 0.01M Acetate | 5.0 | 229.0 | 0 | 0 | 100.0 | 0 | 0 | 0.103 | 2.400 | 35 |
| | 0.1 micron | 0.01M Acetate | 5.0 | 224.5 | 0 | 0 | 100.0 | 0 | 0 | 0.082 | 2.400 | 36 |
| Fresh | 0.1 micron | 0.1x PBS | 7.4 | 177.9 | 0 | 0 | 100.0 | 0 | 0 | 0.121 | 3.200 | 37 |
| mint | 0.1 micron | 0.1x PBS | 7.4 | 176.9 | 0 | 0 | 100.0 | 0 | 0 | 0.124 | 3.220 | 38 |
| leaf | 0.1 micron | 0.1x PBS | 7.4 | 165.1 | 0 | 0 | 100.0 | 0 | 0 | 0.13 | 3.270 | 39 |
| | 0.1 micron | 0.01M Acetate | 5.0 | 123.9 | 0 | 0 | 100.0 | 0 | 0 | 0.192 | 4.960 | 40 |
| | 0.1 micron | 0.01M Acetate | 5.0 | 128.5 | 0 | 0 | 100.0 | 0 | 0 | 0.206 | 5.040 | 41 |
| | 0.1 micron | 0.01M Acetate | 5.0 | 127.3 | 0 | 0 | 100.0 | 0 | 0 | 0.199 | 5.010 | 42 |

While preferred embodiments have been described above and illustrated in the accompanying drawings, it will be evident to those skilled in the art that modifications may be made without departing from this disclosure. Such modifications are considered as possible variants comprised in the scope of the disclosure.

REFERENCES

1. Wang P, Liang Z, Kang B H. Electron tomography of plant organelles and the outlook for correlative microscopic approaches. New Phytol. 2019 September; 223 (4):1756-1761 doi:10.1111/nph.15882. Epub 2019 Jun. 11. PMID: 31058325.

2. Cai Q, Qiao L, Wang M, He B, Lin F M, Palmquist J, Huang S D, Jin H. Plants send small RNAs in extracellular vesicles to fungal pathogen to silence virulence genes. Science. 2018 Jun. 8; 360 (6393):1126-1129. doi: 10.1126/science.aar4142. Epub 2018 May 17. PMID: 29773668; PMCID: PMC6442475.

3. Ju S, Mu J, Dokland T, Zhuang X, Wang Q, Jiang H, Xiang X, Deng Z B, Wang B, Zhang L, Roth M, Welti R, Mobley J, Jun Y, Miller D, Zhang H G. Grape exosome-like nanoparticles induce intestinal stem cells and protect mice from DSS-induced colitis. Mol Ther. 2013 July; 21 (7):1345-57. doi:10.1038/mt.2013.64. Epub 2013 Jun. 11. PMID: 23752315; PMCID: PMC3702113.

4. Sharma M, Sharma R, Jain D K. Nanotechnology Based Approaches for Enhancing Oral Bioavailability of Poorly Water Soluble Antihypertensive Drugs. Scientifica (Cairo). 2016; 2016:8525679. doi:10.1155/2016/8525679. Epub 2016 Apr. 30, PMID: 27239378; PMCID: PMC4867069.

5. Sinjari B, Pizzicannella J, D'Aurora M, Zappacosta R, Gatta V, Fontana A, Trubiani O, Diomede F. Curcumin/Liposome Nanotechnology as Delivery Platform for Anti-inflammatory Activities via NFkB/ERK/pERK Pathway in Human Dental Pulp Treated With 2-HydroxyEthyl MethAcrylate (HEMA). Front Physiol. 2019 Jun. 11; 10:633. doi:10.3389/fphys.2019.00633. PMID: 31244665; PMCID: PMC6579913.

6. Toussaint B, Raffael B, Angers-Loustau A, Gilliland D, Kestens V, Petrillo M, Rio-Echevarria I M, Van den Eede G. Review of micro- and nanoplastic contamination in the food chain. Food Addit Contam Part A Chem Anal Control Expo Risk Assess. 2019 May; 36 (5):639-673. doi: 10.1080/19440049.2019.1583381. Epub 2019 Apr. 15. PMID: 30985273.

7. Fytianos G, Rahdar A, Kyzas G Z. Nanomaterials in Cosmetics: Recent Updates. Nanomaterials (Basel). 2020 May 20; 10 (5):979. doi:10.3390/nano10050979. PMID: 32443655; PMCID: PMC7279536.

The invention claimed is:

1. A process for the production of biological submicrometric particles from a bulk multicellular biological material from plants comprising the steps of:

(a) mild homogenization of said bulk multicellular biological material, comprising a water content of from about 75% to about 100% saturation capacity of said bulk multicellular biological material, comprising freeze-thaw of said bulk multicellular biological material, comprising at least two cycles of (a-i) and (a-ii):

(a-i) freezing said bulk multicellular biological material to a temperature of from about −4° C. to about −40°

C. for a time sufficient to freeze said bulk multicellular biological material; and (a-ii) thawing said bulk multicellular biological material to a temperature of from about 10° C. to about 50° C. for a time sufficient to thaw said bulk multicellular biological material;

to obtain a mildly homogenized bulk multicellular biological material, (b) drying of said mildly homogenized bulk multicellular biological material at a temperature of from about 30° C. to 300° C. for a time sufficient to obtain a dried mildly homogenized bulk multicellular biological material comprising a water content of 4% or less of the dry weight of said bulk multicellular biological material, (c) contacting said dried mildly homogenized bulk multicellular biological material with a first solvent, to obtain a first solvent contacted dried mildly homogenized bulk multicellular biological material, (d) negative pressure-solvent extraction of said first solvent contacted dried mildly homogenized bulk multicellular biological material comprising at least 2 cycles of (d-i) and (d-ii):

(d-i) negative pressure treatment of said first solvent contacted dried mildly homogenized bulk multicellular biological material; and (d-ii) return to atmospheric pressure of said first solvent contacted dried mildly homogenized bulk multicellular biological material;

for a time sufficient to permeate said first solvent through, and further homogenize said solvent contacted dried mildly homogenized bulk multicellular biological material, and (e) separation of said first solvent contacted dried mildly homogenized bulk multicellular biological material from said first solvent, to obtain a solution of supramolecular assemblies and molecular mixes wherein said first solvent is water, acetic acid, hexene, ethanol, isopropanol, citric acid, ethyl acetate, glycerol, glycerol acetates, glycol, acetone, benzyl alcohol, 1,3-butylene glycol, glyceryl triacetate, glyceryl tributyrate, hexane, methyl ethyl ketone, methylene chloride, monoglycerides and diglycerides, monoglyceride citrate, triethyl citrate, or combinations thereof.

2. The process of claim 1, further comprising step (a') before step (a):

(a') incubation of said bulk multicellular biological material in an aqueous solution for saturation to a water content of from about 75% to about 100% saturation capacity of said bulk multicellular biological material.

3. The process of claim 1, further comprising step (f):

(f) filtration of said solution of supramolecular assemblies and molecular mixes, wherein filtration is microfiltration, ultrafiltration, or combinations thereof, for removal of a remaining fragment of said dried mildly homogenized bulk multicellular biological material and provide a cleared solution of supramolecular assemblies and molecular mixes in the first solvent.

4. The process of claim 3, further comprising step (g):

(g) self-aggregation of said supramolecular assemblies and molecular mixes in the first solvent to obtain aggregated biological submicrometric particles of a size population having a dispersity ≤0.3 by mixing the cleared solution of said supramolecular assemblies and molecular mixes with a second solvent, different from said first solvent, and wherein said second solvent is water, acetic acid, hexene, ethanol, isopropanol, citric acid, ethyl acetate, glycerol, glycerol acetates, glycol, acetone, benzyl alcohol, 1,3-butylene glycol, glyceryl triacetate, glyceryl tributyrate, hexane, methyl ethyl ketone, methylene chloride, monoglycerides and diglycerides, monoglyceride citrate, triethyl citrate, or combinations thereof.

5. The process of claim 4, further comprising step (h):

(h) collection of said aggregated biological submicrometric particles of a size population having a dispersity ≤0.3, to obtain concentrated aggregated biological submicrometric particles of a size population having a dispersity ≤0.3.

6. The process of claim 1, wherein in step (a-i), said freezing is to a temperature of said bulk multicellular biological material of from about −8° C. to about −10° C., or from about −10° C. to about −20° C., or from about −20° C. to about −30° C., or from about −30° C. to about −40° C.

7. The process of claim 1, wherein said time sufficient to freeze said multicellular biological material is from about 10 minutes to about 24 hours.

8. The process of claim 1, wherein in step (a-ii), said thawing is to a temperature of said bulk multicellular biological material from about 25° C. to about 40° C.

9. The process of claim 1, wherein said time sufficient to thaw said multicellular biological material is from about 5 minutes to 4 hours.

10. The process of claim 1, wherein said mild homogenization comprises from about 2 to about 20 cycles of (a-i) and (a-ii).

11. The process of claim 1, wherein in step (b) drying of said mildly homogenized multicellular biological material is at a temperature of from about 90° C. to 150° C.

12. The process of claim 1, wherein a time sufficient to obtain a dried mildly homogenized multicellular biological material is from about 5 minutes to about 1 hour, or from about 5 minutes to about 30 minutes, or from about 5 minutes to about 25 minutes, or from about 5 minutes to about 20 minutes, or from about 5 minutes to about 15 minutes, or from about 5 minutes to about 10 minutes.

13. The process of claim 3, wherein filtration is with a filter having pore size of from about 0.1 μm to about 1 μm, or from about 0.1 μm to about 0.8 μm, or from about 0.1 μm to about 0.5 μm, or about 0.1 μm to about 0.45 μm, or about 0.1 μm to about 0.2 μm, and/or wherein filtration is with a filter configured for filtration of particles having $10^3$-$10^6$ Da.

14. The process of claim 4, wherein said aggregation is performed by mechanical turbulence of said first solvent or said second solvent, by mixing said solution of supramolecular assemblies in said first solvent with said second solvent to a ratio of from about 1:3 to 1:100.

15. The process of claim 4, wherein said first solvent or said second solvent is at a pH of from about 3.0 to about 10.5.

16. The process of claim 4, wherein said first solvent or said second solvent further comprises an additive molecule.

17. The process of claim 16, wherein said additive molecule is a polymeric molecule.

18. The process of claim 17, wherein said polymeric molecule is a polysaccharide, a protein, a biocompatible polymer, or a combination thereof.

19. The process of claim 18, wherein said polysaccharide is a cellulose, a chitin, a starch, a glycogen, a glycosaminoglycans, a chitosan, an alginate, a fucoidan, a carrageenan, an amylose, an amylopectin, a glucan, a mannans, chemical derivatives thereof and combinations thereof;

wherein said protein is a casein, an albumin, a globulin, an edestin, a glycoprotein, a lipoprotein, and chemical derivatives thereof and combinations thereof;

wherein said biocompatible polymer is a polyethylene glycol (PEG) or chemical derivatives thereof; and wherein chemical derivatives are methylation, ethylation, butylation, propylation, silylation, acylation, acetylation, alkylation, esterification, thiolation, hydroxylation, animation, amidation derivatives of said polysaccharide, protein, or biocompatible polymer.

20. The process of claim 1, wherein said negative pressure treatment is at from about −1.38 kPa to about −206.84 kPa (−0.2 psi to about −30 psi); and/or said negative pressure treatment is for about 0.5 second to about 5 seconds.

21. The process of claim 1, wherein in step (d), said time sufficient to permeate said first solvent through is from about 3 to about 200 cycles of (d-i) and (d-ii); and/or step (d) is performed at a temperature of about −20° C. to about 70° C.

22. The process of claim 1, wherein said first solvent is water, acetic acid, ethanol, isopropanol, citric acid, ethyl acetate, glycerol, acetone, 1,3-butylene glycol, hexane, or combinations thereof.

23. The process of claim 4, wherein said first solvent or said second solvent is water, acetic acid, ethanol, isopropanol, citric acid, ethyl acetate, glycerol, acetone, 1,3-butylene glycol hexane, or combinations thereof.

\*    \*    \*    \*    \*